United States Patent
Tour et al.

(10) Patent No.: US 12,087,933 B2
(45) Date of Patent: Sep. 10, 2024

(54) ANODES, CATHODES, AND SEPARATORS FOR BATTERIES AND METHODS TO MAKE AND USE SAME

(71) Applicant: WILLIAM MARSH RICE UNIVERSITY, Houston, TX (US)

(72) Inventors: James M. Tour, Bellaire, TX (US); Rodrigo Villegas Salvatierra, Houston, TX (US); Gladys Anahi Lopez Silva, Houston, TX (US)

(73) Assignee: William Marsh Rice University, Houston, TX (US)

( * ) Notice: Subject to any disclaimer, the term of this patent is extended or adjusted under 35 U.S.C. 154(b) by 163 days.

(21) Appl. No.: 16/328,669

(22) PCT Filed: Aug. 31, 2017

(86) PCT No.: PCT/US2017/049719
§ 371 (c)(1),
(2) Date: Feb. 26, 2019

(87) PCT Pub. No.: WO2018/045226
PCT Pub. Date: Mar. 8, 2018

(65) Prior Publication Data
US 2019/0181425 A1 Jun. 13, 2019

Related U.S. Application Data

(60) Provisional application No. 62/460,985, filed on Feb. 20, 2017, provisional application No. 62/381,782, filed on Aug. 31, 2016.

(51) Int. Cl.
*H01M 4/133* (2010.01)
*H01M 4/02* (2006.01)
(Continued)

(52) U.S. Cl.
CPC ......... *H01M 4/133* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS

| 4,416,960 A | 11/1983 | Eustace et al. |
| 5,426,006 A | 6/1995 | Delnick et al. |

(Continued)

FOREIGN PATENT DOCUMENTS

| CN | 102368561 A | 3/2012 |
| CN | 102906177 A | 1/2013 |

(Continued)

OTHER PUBLICATIONS

Machine translation of WO 2013/001693 A1 (Year: 2013).*
(Continued)

*Primary Examiner* — Robert S Carrico
(74) *Attorney, Agent, or Firm* — Dickinson Wright PLLC; Ross Spencer Garsson

(57) ABSTRACT

Anodes, cathodes, and separators for batteries (electrochemical energy storage devices). The anodes are Li metal anodes having lithiated carbon films (Li-MWCNT) (as dendrite suppressors and protective coatings for the Li metal anodes). The cathodes are sulfurized carbon cathodes. The separators are GNR-coated (or modified) separators. The invention includes each of these separately (as well as in combination both with each other and with other anodes, cathodes, and separators) and the methods of making each of these separately (and in combination). The invention further includes a battery that uses at least one of (a) the anode having a lithiated carbon film, (b) the sulfurized carbon
(Continued)

cathode, and (c) the GNR-modified separator in the anode/cathode/separator arrangement. For instance, a full battery can include the sulfurized carbon cathode in combination with the Li-MWCNT anode or a full battery can include the sulfurized carbon cathode in combination with other anodes (such as a GCNT-Li anode).

4 Claims, 42 Drawing Sheets

(51) Int. Cl.
  H01M 4/04       (2006.01)
  H01M 4/136      (2010.01)
  H01M 4/38       (2006.01)
  H01M 4/58       (2010.01)
  H01M 4/583      (2010.01)
  H01M 4/62       (2006.01)
  H01M 10/0525    (2010.01)
  H01M 50/451     (2021.01)

(52) U.S. Cl.
  CPC ............. H01M 4/136 (2013.01); H01M 4/38 (2013.01); H01M 4/58 (2013.01); H01M 4/583 (2013.01); H01M 4/625 (2013.01); H01M 10/0525 (2013.01); H01M 50/451 (2021.01); H01M 2004/028 (2013.01); Y02T 10/70 (2013.01)

(56) References Cited

U.S. PATENT DOCUMENTS

| | | |
|---|---|---|
| 6,326,104 B1 | 12/2001 | Caja et al. |
| 6,576,370 B1 | 6/2003 | Nakagiri et al. |
| 8,665,581 B2 | 3/2014 | Fleischer et al. |
| 8,709,373 B2 | 4/2014 | Hauge et al. |
| 9,096,437 B2 | 8/2015 | Tour et al. |
| 9,455,094 B2 | 9/2016 | Tour et al. |
| 9,882,241 B2 | 1/2018 | Singh et al. |
| 9,923,234 B2 | 3/2018 | Eitouni et al. |
| 10,044,064 B2 | 8/2018 | Eitouni et al. |
| 10,056,618 B2 | 8/2018 | Li et al. |
| 10,153,514 B2 | 12/2018 | Pratt et al. |
| 2003/0113624 A1 | 6/2003 | Kim et al. |
| 2003/0118908 A1 | 6/2003 | Ishikawa et al. |
| 2009/0053594 A1 | 2/2009 | Johnson et al. |
| 2009/0246625 A1* | 10/2009 | Lu ................. H01M 4/1393 977/734 |
| 2011/0183206 A1 | 7/2011 | Davis et al. |
| 2011/0262807 A1 | 10/2011 | Boren et al. |
| 2011/0318654 A1* | 12/2011 | Janssen ................ H01M 4/622 429/338 |
| 2012/0077084 A1 | 3/2012 | Christensen et al. |
| 2012/0171574 A1 | 7/2012 | Zhamu et al. |
| 2012/0231326 A1 | 9/2012 | Biswal et al. |
| 2013/0065050 A1 | 3/2013 | Chen et al. |
| 2013/0157128 A1 | 6/2013 | Solan et al. |
| 2013/0164626 A1 | 6/2013 | Manthiram et al. |
| 2013/0171502 A1 | 7/2013 | Chen et al. |
| 2013/0183547 A1 | 7/2013 | Kourtakis et al. |
| 2013/0196235 A1 | 8/2013 | Prieto et al. |
| 2013/0202961 A1 | 8/2013 | Hagen et al. |
| 2013/0220817 A1 | 8/2013 | Walker et al. |
| 2013/0224594 A1 | 8/2013 | Yushin et al. |
| 2013/0244097 A1* | 9/2013 | Leitner ................ H01M 4/1397 429/188 |
| 2013/0260246 A1 | 10/2013 | Chen et al. |
| 2014/0014030 A1 | 1/2014 | Tour et al. |
| 2014/0147738 A1 | 5/2014 | Chen et al. |
| 2014/0178688 A1 | 6/2014 | Tour et al. |
| 2014/0313636 A1* | 10/2014 | Tour ................ H01G 11/36 361/502 |
| 2014/0332731 A1 | 11/2014 | Ma et al. |
| 2015/0010788 A1 | 1/2015 | Aria et al. |
| 2015/0155549 A1 | 6/2015 | Moganty et al. |
| 2015/0236372 A1* | 8/2015 | Yushin ................ H01M 4/1397 429/126 |
| 2016/0240840 A1 | 8/2016 | He et al. |
| 2017/0194636 A1 | 7/2017 | Osada et al. |
| 2017/0352909 A1* | 12/2017 | Ainsworth .......... H01M 10/052 |
| 2018/0175379 A1 | 6/2018 | Tour et al. |
| 2018/0183041 A1 | 6/2018 | Tour et al. |
| 2018/0233784 A1 | 8/2018 | Zhamu et al. |
| 2018/0287121 A1* | 10/2018 | Kim .................... H01M 10/052 |
| 2018/0287162 A1 | 10/2018 | Tour et al. |
| 2019/0181425 A1 | 6/2019 | Tour et al. |

FOREIGN PATENT DOCUMENTS

| | | |
|---|---|---|
| CN | 103515646 A | 1/2014 |
| CN | 104362394 A | 2/2015 |
| CN | 105350054 A | 2/2016 |
| CN | 105789563 A | 7/2016 |
| JP | 2005294028 A | 10/2005 |
| WO | 2013001693 A1 | 1/2013 |
| WO | 2015084945 A1 | 6/2015 |
| WO | 2016201101 A1 | 12/2016 |
| WO | 2017011052 A2 | 1/2017 |
| WO | 2017034650 A2 | 3/2017 |
| WO | 2017062950 A1 | 4/2017 |
| WO | 2017120391 A1 | 7/2017 |
| WO | 2017164963 A2 | 9/2017 |
| WO | 2018045226 A1 | 3/2018 |

OTHER PUBLICATIONS

Officer Maruska Galatioto; International Search Report and Written Opinion; PCT/US2017/049719; date of mailing Oct. 20, 2017; 13 pages.

Armand, M. et al. "Building Better Batteries", Nature 2008, 451 (7179), 652-657 ("Armand 2008"), 6 pages.

Aurbach, D. et al. "A Short Review of Failure Mechanisms of Lithium Metal and Lithiated Graphite Anodes in Liquid Electrolyte Solutions" Solid State Ionics 2002, 148, 405-416 ("Aurbach 2002"), 12 pages.

Bai, P. et al. "Transition of Lithium Growth Mechanisms in Liquid Electrolytes" Energy Environ. Sci. 2016, 9, 3221-3229 ("Bai 2016"), 9 pages.

Basile, A. et al. "Stabilizing Lithium Metal Using Ionic Liquids for Long-Lived Batteries". Nature Comm. 2016, 7, 11794, 11 pages.

Bates, J. et al. "Fabrication and Characterization of Amorphous Lithium Electrolyte Thin Films and Rechargeable Thin-Film Batteries". J. Power Sources 1993, 43 (1-3), 103-110 ("Bates 1993"), 8 pages.

Bates, J. et al. "Thin-film Lithium and Lithium-Ion Batteries", Solid State Ionics 2000, 135, 33-45; 13 pages.

Besenhard, J. et al. "Inorganic Film-Forming Electrolyte Additives Improving the Cycling Behaviour of Metallic Lithium Electrodes and the Self-Discharge of Carbon-Lithium Electrodes". J. Power Sources 1993, 44 (1-3), 413-420 ("Besenhard 1993"), 8 pages.

Bouchet, R. "Batteries: A Stable Lithium Metal Interface". Nat. Nanotechnol. 2014, 9, 572-573 ("Bouchet 2014"), 2 pages.

Bouchet, R. et al. "Single-Ion BAB Triblock Copolymers as Highly Efficient Electrolytes for Lithium-Metal Batteries", Nature Mater. 2013, 12, 452; 6 pages.

Bruce, P. et al. "Li—O2 and Li—S Batteries with High Energy Storage", Nat. Mater. 2011, 11 (2), 172-172 ("Bruce 2011"). 12 pages.

Cavallo, C. et al. "A free-standing reduced graphene oxide aerogel as supporting electrode in a fluorine-free Li2S8 catholyte Li—S battery," Journal of Power Sources, Feb. 5, 2019, 7 pages.

Chebiam, R. et al. "Comparison of the chemical stability of the high energy density cathodes of lithium-ion batteries," Electrochemistry Communications 2001, 3 (11), 624-627. 4 pages.

Cheon, S. et al. "Rechargeable Lithium Sulfur Battery: II. Rate Capability and Cycle Characteristics," Journal of The Electrochemical Society 2003, 150 (6), A800-A805, 7 pages.

(56) References Cited

OTHER PUBLICATIONS

Claye, A. et al. "Solid-State Electrochemistry of the Li Single Wall Carbon Nanotube System". J. Electrochem. Soc. 2000, 147, 2845-2852 ("Claye 2000"), 9 pages.
Cohen, Y. et al. "Micromorphological Studies of Lithium Electrodes in Alkyl Carbonate Solutions Using in Situ Atomic Force Microscopy". J. Phys. Chem. B 2000, 104 (51), 12282-12291 ("Cohen 2000"), 10 pages.
Crowther, O. et al. "Effect of Electrolyte Composition on Lithium Dendrite Growth", J. Electrochem. Soc. 2008, 155, A806-A811 ("Crowther 2008"), 7 pages.
Ding, F. et al. "Dendrite-Free Lithium Deposition via Self-Healing Electrostatic Shield Mechanism", J. Am. Chem. Soc. 2013, 135 (11), 4450-4456 ("Ding II 2013"), 7 pages.
Ding, F. et al. "Effects of Carbonate Solvents and Lithium Salts on Morphology and Coulombic Efficiency of Lithium Electrode". J. Electrochem. Soc. 2013, 160 (10), A1894-A1901 ("Ding I 2013"), 9 pages.
Dresselhaus, M. et al. "Raman Spectroscopy on Isolated Single Wall Carbon Nanotubes". Carbon 2002, 40, 2043-2061 ("Dresselhaus 2002"), 19 pages.
Dunn, B. et al. "Electrical Energy Storage for the Grid: A Battery of Choices". Science (80). 2011, 334 (6058), 928-935 ("Dunn 2011"), 9 pages.
Ebbesen, T. et al. "Electrical Conductivity of Individual Carbon Nanotubes". Nature 1996, 382, 54-56 ("Ebbesen 1996"), 3 pages.
Evarts, E. "Lithium Batteries: To the Limits of Lithium". Nature 2015, 526, S93-S95 ("Evarts 2015") 4 pages.
Girishkumar, G. et al. "Lithium-Air Battery: Promise and Challenges". J. Phys. Chem. Lett. 2010, 1 (14), 2193-2203 ("Girishkumar 2010"); 11 pages.
Goodenough, J. et al., "The Li-Ion Rechargeable Battery: A Perspective". J. Am. Chem. Soc. 2013, 135 (4), 1167-1176 ("Goodenough 2013") 10 pages.
Hao, X. et al., "Ultrastrong Polyoxyzole Nanofiber Membranes for Dendrite-Proof and Heat-Resistant Battery Separators". Nano Lett. 2016, 16, 2981-2987 ("Hao 2016"), 7 pages.
Hirai, T. et al. "Effect of Additives on Lithium Cycling Efficiency". J. Electrochem. Soc. 1994, 141, 2300-2305 ("Hirai 1994"), 7 pages.
Holstiege, F. et al. "Pre-Lithiation Strategies for Rechargeable Energy Storage Technologies: Concepts, Promises and Challenges," Batteries, Jan. 23, 2018, 39 pages.
Hou, J. et al "Graphene-based electrochemical energy conversion and storage: fuel cells, supercapacitors and lithium ion batteries", Physical Chemistry Chemical Physics, vol. 13, No. 34, Jan. 1, 2011, pp. 15384-15402.; 19 pages.
Hutchins, M. "New chemistry promises better lithium sulfur batteries," PV Magazine, Jun. 22, 2020, 5 pages.
Ji, X. et al. "Advances in Li—S batteries," Journal of Materials Chemistry 2010, 20 (44), 9821-9826; 6 pages.
Jin, S. et al. "Covalently Connected Carbon Nanostructures for Current Collectors in Both the Cathode and Anode of Li—S Batteries". Adv. Mater. 2016, 28, 9094-9102 ("Jin 2016"), 9 pages.
Jin, S. et al. "Efficient Activation of High-Loading Sulfur by Small CNTs Confined Inside a Large CNT for High-Capacity and High-Rate Lithium-Sulfur Batteries". Nano Lett. 2015, acs.nanolett. 5b04105 ("Jin 2015"), 8 pages.
Kamaya, N. et al. "A Lithium Superionic Conductor", Nature Mater. 2011, 10, 682; 5 pages.
Kang, N. et al. "Cathode porosity is a missing key parameter to optimize lithium-sulfur battery energy density," Nature Communications, Oct. 10, 2019, 10 pages.
Kanno, R. et al. "Lithium Ionic Conductor Thio-LISICON: the Li2SGeS2P2S5 System", J. Electrochem. Soc. 2001, 148, A742. 6 pages.
Kim, J. et al. "Controlled Lithium Dendrite Growth by a Synergistic Effect of Multilayered Graphene Coating and an Electrolyte Additive", Chem. Mater. 2015, 27 (8), 2780-2787 ("Kim 2015"), 8 pages.

Kim, M. et al. "A fast and efficient pre-doping approach to high energy density lithium-ion hybrid capacitors," Journal of Materials Chemistry A of The Royal Society of Chemistry, Mar. 2014, 6 pages (10029-10033); 6 pages.
Kozen, A. et al. "Next-Generation Lithium Metal Anode Engineering via Atomic Layer Deposition", ACS Nano 2015, 9 (6), 5884-5892 ("Kozen 2015"), 9 pages.
Landi, B. et al. "Carbon Nanotubes for Lithium Ion Batteries". Energy Environ. Sci. 2009, 2, 638-654 ("Landi 2009"), 18 pages.
Landi, B. et al. "Lithium Ion Capacity of Single Wall Carbon Nanotube Paper Electrodes", J. Phys. Chem. C 2008, 112, 7509-7515 ("Landi 2008"); 7 pages.
Lee, H. et al. "Simple Composite Protective Layer Coating that Enhances the Cycling Stability of Lithium Metal Batteries", J. Power Sources 2015, 284, 103-108 ("Lee 2015"); 6 pages.
Li, F. et al. "Identification of the Constituents of Double-Walled Carbon Nanotubes Using Raman Spectra Taken with Different Laser-Excitation Energies". J. Mater. Res. 2003, 18, 1251-1258 ("Li 2003"), 9 pages.
Li, N. et al. "An Artificial Solid Electrolyte Interphase Layer for Stable Lithium Metal Anodes". Adv. Mater. 2016, 28 (9), 1853-1858 ("Li 2016"), 7 pages.
Li, W. et al. "The Synergetic Effect of Lithium Polysulfide and Lithium Nitrate to Prevent Lithium Dendrite Growth". Nat. Commun. 2015, 6 (May), 7436 ("Li 2015"), 8 pages.
Liang, Z. et al. "Composite Lithium Metal Anode by Melt Infusion of Lithium into a 3D Conducting Scaffold with Lithiophilic Coating". Proc. Natl. Acad. Sci. U. S. A. 2016, 113, 2862-2867 ("Liang 2016"), 6 pages.
Lin, D. et al. "Layered Reduced Graphene Oxide with Nanoscale Interlayer Gaps as a Stable Host for Lithium Metal Anodes", Nat. Nanotechnol. 2016, 11, 626-632 ("Lin 2016"); 8 pages.
Lin, D. et al. "Reviving the Lithium Metal Anode for High-Energy Batteries", Nat. Publ. Gr. 2017, 12 (3), 194-206 ("Lin 2017"); 13 pages.
Lin, D. et al. "Three-Dimensional Stable Lithium Metal Anode with Nanoscale Lithium Islands Embedded in Ionically Conductive Solid Matrix". Proc. Natl. Acad. Sci. U. S. A. 2017, 114, 4613-4618 ("Lin II 2017"), 6 pages.
Lin, J. et al. "3-Dimensional Graphene Carbon Nanotube Carpet-Based Microsupercapacitors with High Electrochemical Performance", Nano Lett. 2013, 13, 72-78 ("Lin 2015"); 7 pages.
Liu, Y. et al. "An Artificial Solid Electrolyte Interphase with High Li-Ion Conductivity, Mechanical Strength, and Flexibility for Stable Lithium Metal Anodes". Adv. Mater. 2017, 29, 1605531 ("Liu 2017"), 8 pages.
Liu, Y. et al. "Lithium-Coated Polymeric Matrix as a Minimum Volume-Change and Dendrite-Free Lithium Metal Anode", Nat. Commun. 2016, 7, 10992 ("Liu 2016"), 9 pages.
Lu, L. et al. "Free-Standing Copper Nanowire Network Current Collector for Improving Lithium Anode Performance", Nano Lett. 2016, 16, 4431; 7 pages.
Lu, Y. et al. "Stable Lithium Electrodeposition in Liquid and Nanoporous Solid Electrolytes". Nat. Mater. 2014, 13, 961-969 ("Lu 2014"); 9 pages.
Luo, C. et al. "A chemically stabilized sulfur cathode for lean electrolyte lithium sulfur batteries," Proceedings of the National Academy of Sciences (PNAS.org), May 15, 2020, 9 pages.
Mahmood, N. et al. "Nanostructured Anode Materials for Lithium Ion Batteries: Progress, Challenge and Perspective". Adv. Energy Mater. 2016, 6, 1600374 ("Mahmood 2016"), 22 pages.
Manthiram, A. et al. "Lithium-Sulfur Batteries: Progress and Prospects". Adv. Mater. 2015, 27 (12), 1980-2006 ("Manthiram 2015"), 27 pages.
Mikhaylik, Y. et al. "Polysulfide Shuttle Study in the Li/S Battery System," Journal of The Electrochemical Society 2004, 151 (11), A1969-A1976, 9 pages.
Murugan, R. et al. "Fast Lithium Ion Conduction in Garnet-Type Li7La3Zr2O12". Angew. Chem. Int. Ed. 2007, 46, 7778, 4 pages.
Noorden, R. "The Rechargeable Revolution: A Better Battery". Nature 2014, 507, 26-28 ("Noorden 2014"), 3 pages.

(56) References Cited

OTHER PUBLICATIONS

Osaka, T. et al. "Surface Characterization of Electrodeposited Lithium Anode with Enhanced Cycleability Obtained by CO2 Addition", J. Electrochem. Soc. 1997, 144 (5), 1709 ("Osaka 1997"), 6 pages.

Peigney, A. et al. "Specific Surface Area of Carbon Nanotubes and Bundles of Carbon Nanotubes". Carbon 2001, 39, 507-514 ("Peigney 2001"), 9 pages.

Qian, J. et al. "High Rate and Stable Cycling of Lithium Metal Anode". Nat. Commun. 2015, 6, 6362 ("Qian 2015"), 9 pages.

Ren, Z. et al. "Synthesis of Large Arrays of Well-Aligned Carbon Nanotubes on Glass". Science 1998, 282, 1105-1107 ("Ren 1998"), 4 pages.

Roy, P. et al. "Nanostructured Anode Materials for Lithium Ion Batteries". J. Mater. Chem. A 2015, 3, 2454-2484 ("Roy 2015"), 31 pages.

Salvatierra, R. et al. "Graphene Carbon Nanotube Carpets Grown Using Binary Catalysts for High-Performance Lithium-Ion Capacitors". ACS Nano 2017, 11, 2724-2733 ("Salvatierra 2017"), 10 pages.

Stone, G. et al. "Resolution of the Modulus Versus Adhesion Dilemma in Solid Polymer Electrolytes for Rechargeable Lithium Metal Batteries", J. Electrochem. Soc. 2012, 159, A222, 7 pages.

Su, Y. et al. "Lithium-sulfur batteries with a microporous carbon paper as a bifunctional interlayer," Nature Communications 2012, 3, 1166, 6 pages.

Sun, Z. et al. "Large-Area Bernal-Stacked Bi-, Tri-, and Tetralayer Graphene". ACS Nano 2012, 6, 9790-9796 ("Sun 2012"), 7 pages.

Thess, A. et al. "Crystalline Ropes of Metallic Carbon Nanotubes", Science 1996, 273, 483-487 ("Thess 1996"), 6 pages.

Tung, S. et al. "A Dendrite-Suppressing Composite Ion Conductor from Aramid Nanofibres". Nat. Commun. 2015, 6, 6152 ("Tung 2015"), 7 pages.

Wang, C. et al. "Suppression of Lithium-Dendrite Formation by Using LAGP-PEO (LiTFSI) Composite Solid Electrolyte and Lithium Metal Anode Modified by PEO (LiTFSI) in All-Solid-State Lithium Batteries", ACS Appl. Mater. Interfaces 2017, acsami.7b00336 ("Wang 2017"); 9 pages.

Wei, S. et al. "Metal-Sulfur Battery Cathodes Based on Pan-Sulfur Composites", J. Am. Chem. Soc. 2015, 137, 12143-12152 ("Wei 2015"); 10 pages.

Whittingham, M. "History, Evolution, and Future Status of Energy Storage". Proc. IEEE 2012, 100 (Special Centennial Issue), 1518-1534 ("Whittingham 2012"), 17 pages.

Wikipedia "Lithium-sulfur battery, Retrieved from https://en.wikipedia.org/w/index.php?title=Lithium-sulfur_battery&oldid=963354052", last edited on Jun. 19, 2020, at 10:29 (UTC), 9 pages.

Xu, W. et al. "Lithium Metal Anodes for Rechargeable Batteries", Energy Environ. Sci. 2014, 7 (2), 513-537 ("Xu 2014"); 25 pages.

Yan, K. et al. "Selective Deposition and Stable Encapsulation of Lithium through Heterogeneous Seeded Growth", Nat. Energy 2016, 1, 16010 ("Yan 2016"); 8 pages.

Yan, Z. et al. "Three-Dimensional Metal Graphene Nanotube Multifunctional Hybrid Materials," ACS Nano 2013, 7, 58-64. DOI: 10.1021/nn3015882; 7 pages.

Yang, C. et al. "Accommodating Lithium into 3D Current Collectors with a Submicron Skeleton Towards Long-Life Lithium Metal Anodes". Nat. Commun. 2015, 6, 8058 ("Yang 2015"), 9 pages.

Yang, Y. et al. "Nanostructures sulfur cathodes," Chem Soc Rev of The Royal Society of Chemistry, Jul. 2012 (3018-3032); 15 pages.

Yazami, R. et al. "A Reversible Graphite-Lithium Negative Electrode for Electrochemical Generators", J. Power Sources 1983, 9, 365-371 ("Yazami 1983"); 7 pages.

Zhang, H. et al. "Three-Dimensional Bicontinuous Ultrafast-Charge and -Discharge Bulk Battery Electrodes", Nat. Nanotechnol. 2011, 6, 277-281 ("Zhang 2011"); 5 pages.

Zhang, J. et al. "Lithium Metal Anodes and Rechargeable Lithium Metal Batteries", 1st ed.; Hull, R. et al., Eds.; Springer International Publishing, 2017 ("J. Zhang 2017"); 206 pages.

Zhang, R. et al. "Conductive Nanostructured Scaffolds Render Low Local Current Density to Inhibit Lithium Dendrite Growth". Adv. Mater. 2016, 28, 2155-2162 ("Zhang 2016"), 8 pages.

Zhang, S. "Sulfurized carbon: a class of cathode materials for high performance lithium/sulfur batteries," Frontiers in Energy Research, Dec. 2013, 10 pages.

Zhang, S. et al. "Charge and Discharge Characteristics of a Commercial LiCoO2-Based 18650 Li-Ion Battery", J. Power Sources 2006, 160, 1403-1409 ("Zhang 2006"); 7 pages.

Zhang, Y. et al. "A Carbon-Based 3d Current Collector with Surface Protection for Li Metal Anode", Nano Res. 2017, 10, 1356-1365 ("Y. Zhang II 2017"); 11 pages.

Zhang, Y. et al. "High-Capacity, Low-Tortuosity, and Channel-Guided Lithium Metal Anode". Proc. Natl. Acad. Sci. U. S. A. 2017, 114, 3584-3589 ("Y. Zhang I 2017"), 6 pages.

Zheng, G. et al. "Interconnected Hollow Carbon Nanospheres for Stable Lithium Metal Anodes", Nat. Nanotechnol. 2014, advance on (8), 618-623 ("Zheng 2014"); 6 pages.

Zhou, W. et al. "Plating a Dendrite-Free Lithium Anode with a Polymer/Ceramic/Polymer Sandwich Electrolyte", J. Am. Chem. Soc. 2016, 138 (30), 9385-9388 ("Zhou 2016"); 4 pages.

Zhu, Y. et al. "A seamless three-dimensional carbon nanotube graphene hybrid material," Nature Communications 2012, 3, 1225, 7 pages.

European Patent Office, European Search Report for Application No. EP16854534.1, dated May 9, 2019, 9 pages.

International Searching Authority, International Preliminary Report on Patentability for PCT/US2016/056270, dated Apr. 10, 2018, 9 pages.

International Searching Authority, International Search Report and Written Opinion for PCT/US2016/056270, mailed on Dec. 22, 2016, 11 pages.

Unpublished U.S. Appl. No. 17/061,223 "Alkali-Metal Anode with Alloy Coating Applied by Friction", Tour, J., et al., filed Oct. 1, 2020.

Examination Report and Search Report from the Taiwan Intellectual Property Office (TIPO) for Patent Application No. 106 129755, dated Oct. 28, 2021; 11 pages.

China National Intellectual Property Administration, Notice on the First Office Action for CN Application No. 201780067483.9; date of mailing May 24, 2021; 13 pages.

Decision of the Intellectual Property Office, Reasons for the Rejection for Taiwan Patent Application No. 106129755; dated Oct. 5, 2022; 2 pages.

\* cited by examiner

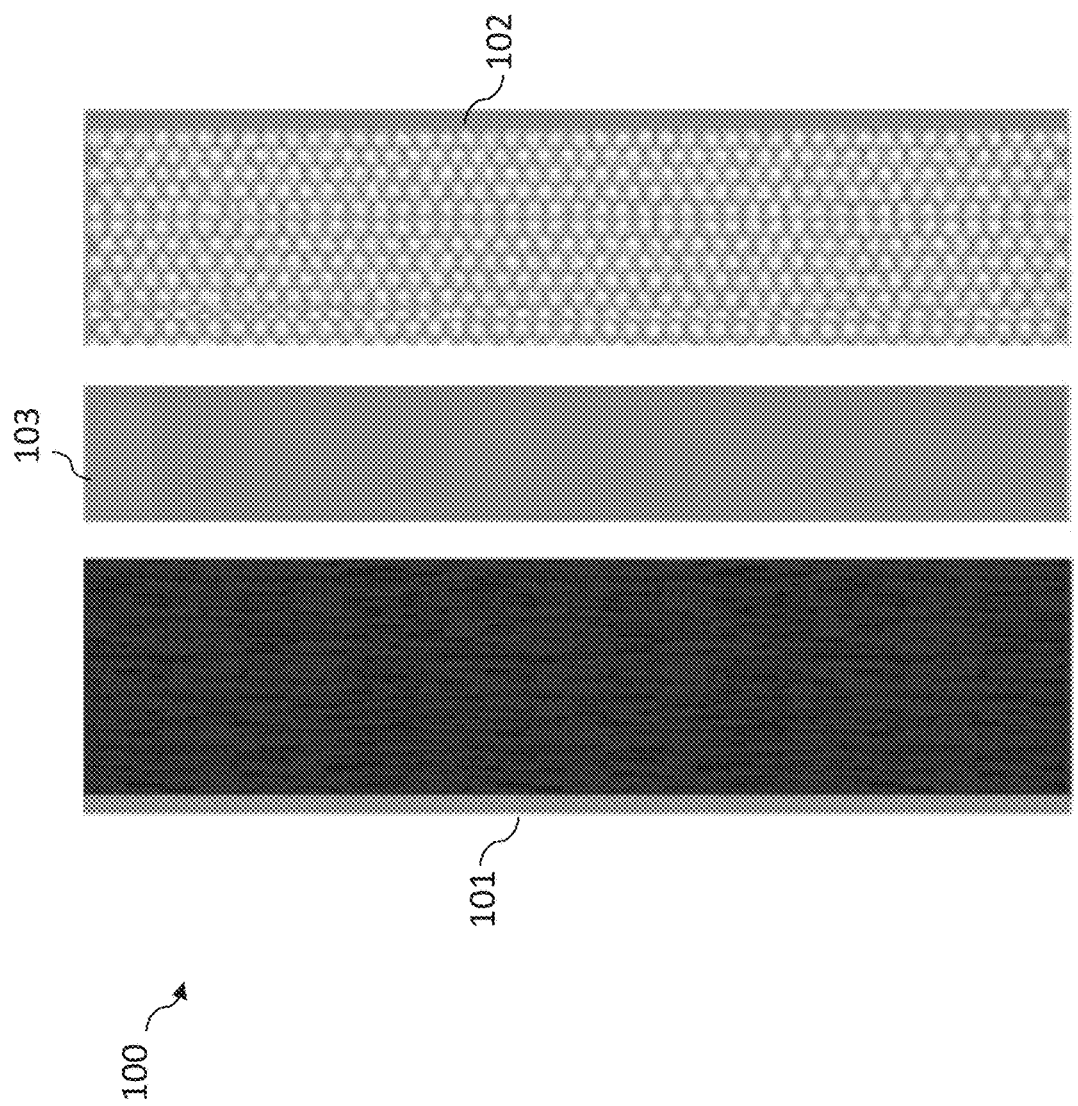

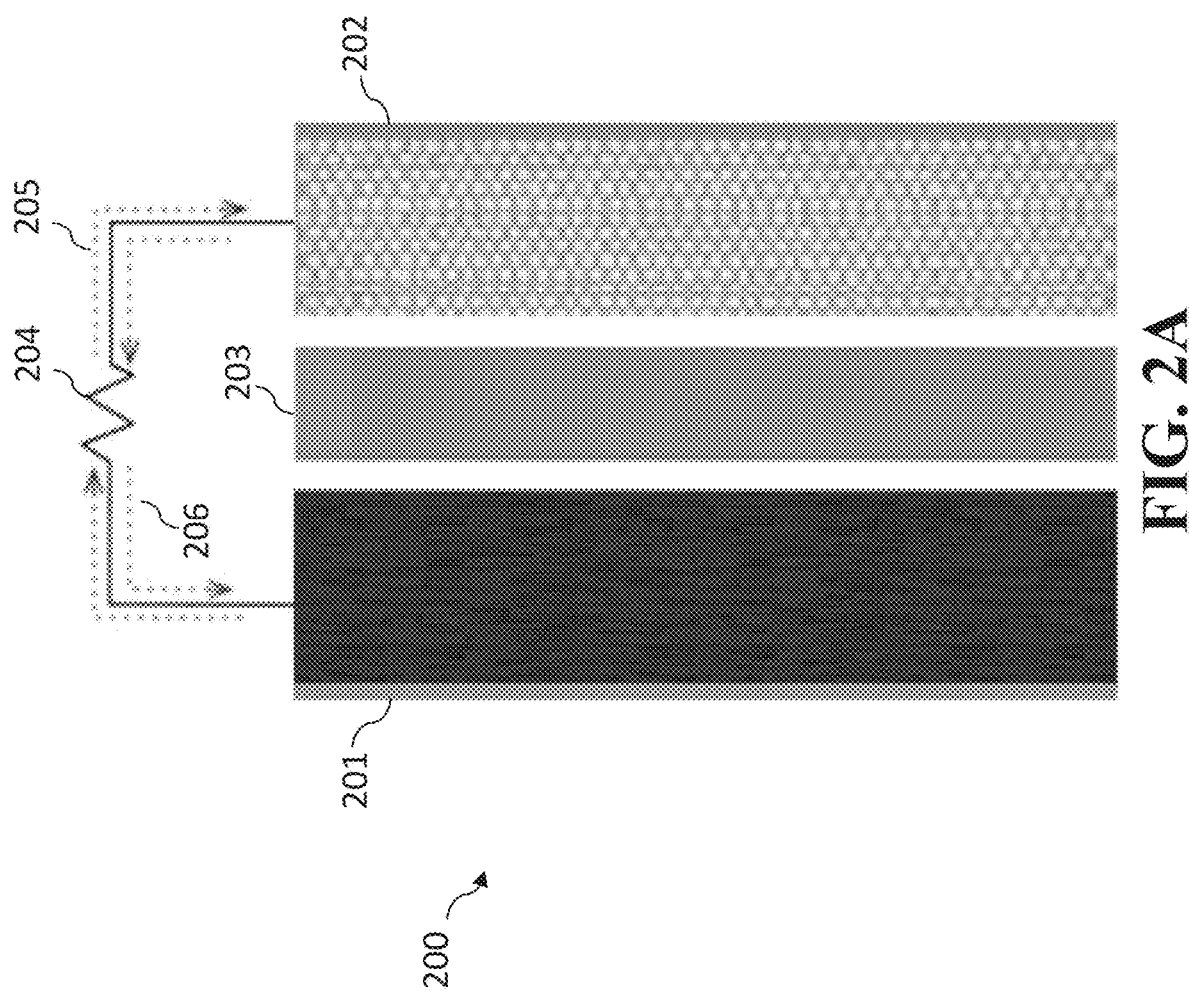

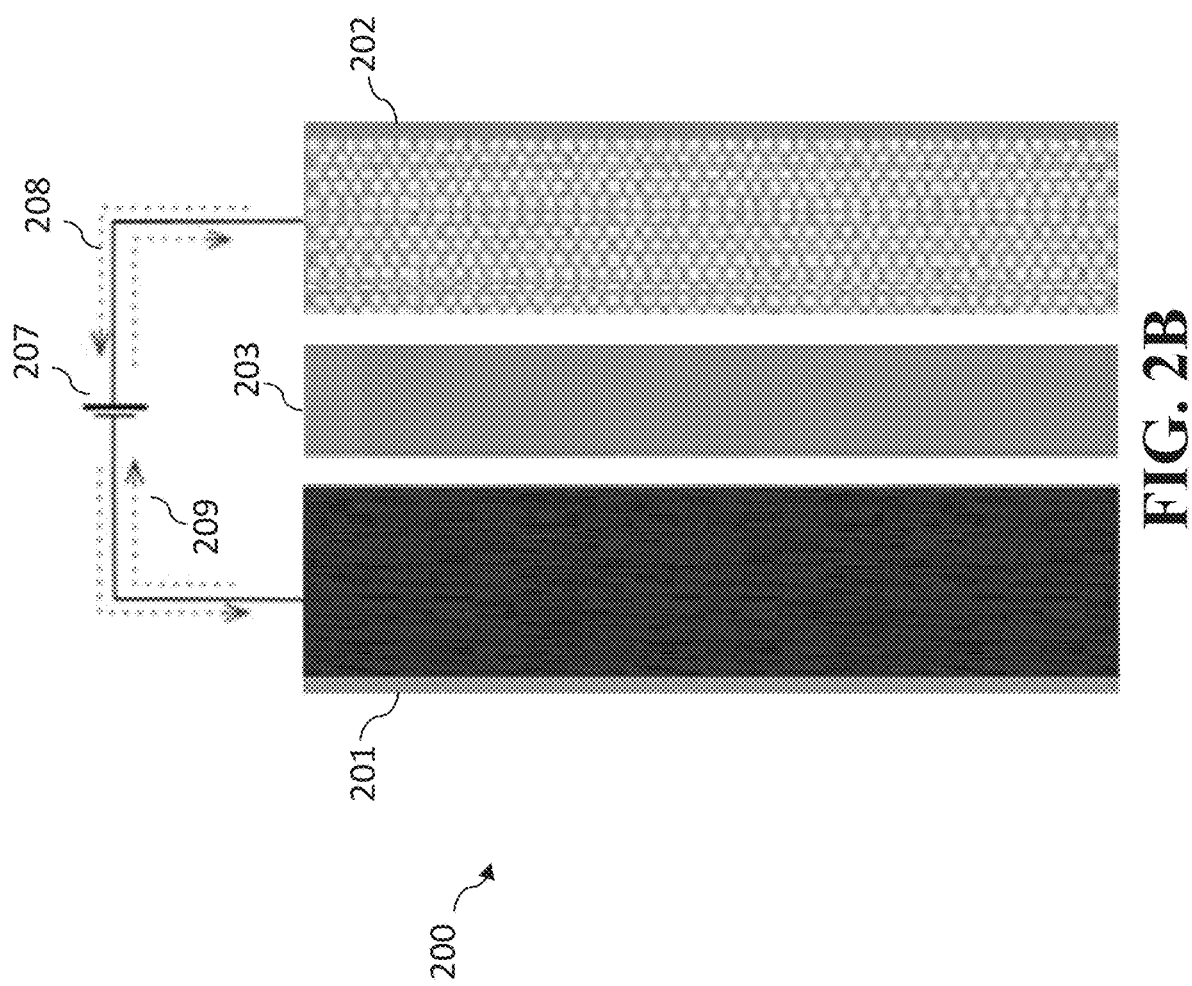

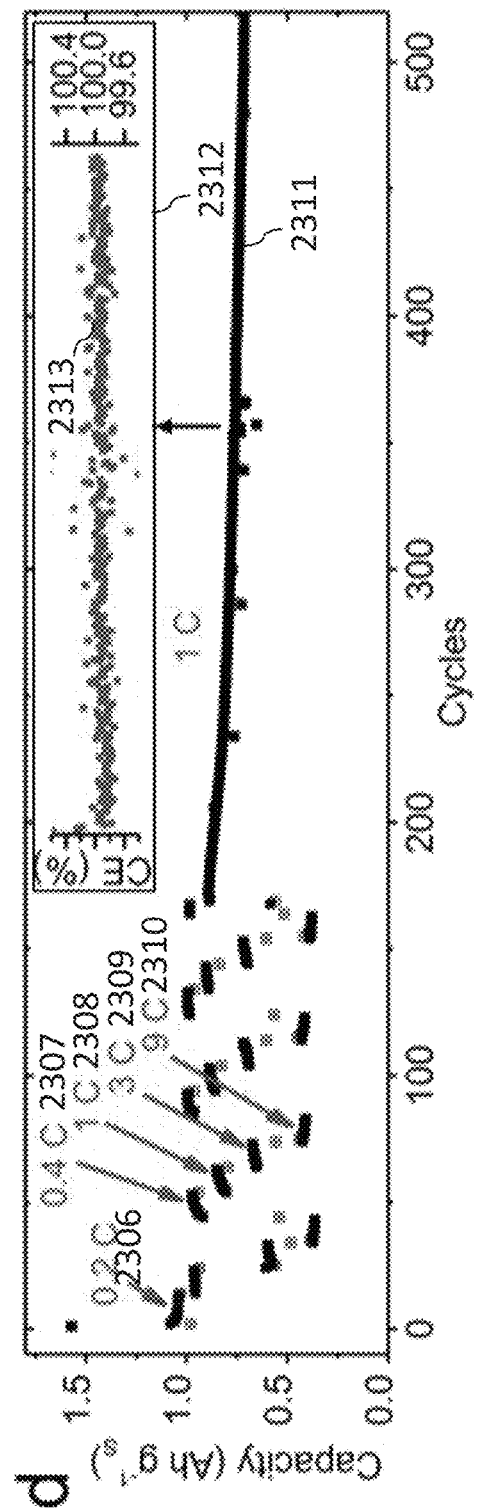
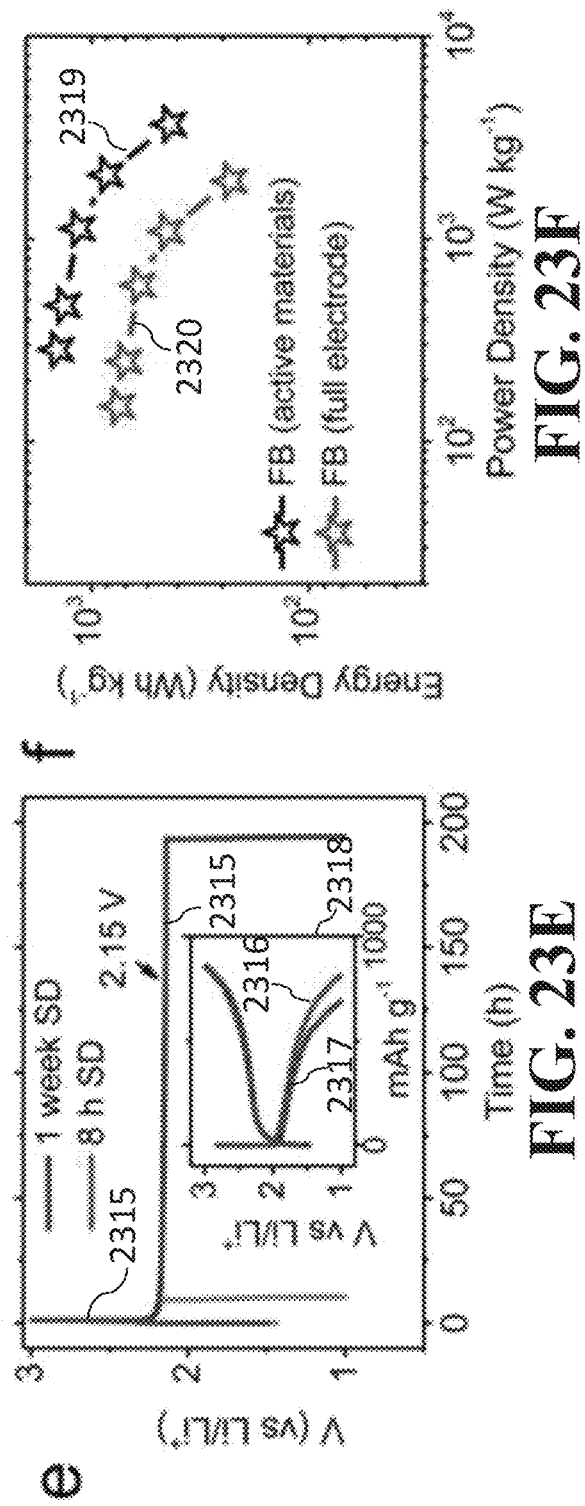
FIG. 23D
FIG. 23E
FIG. 23F

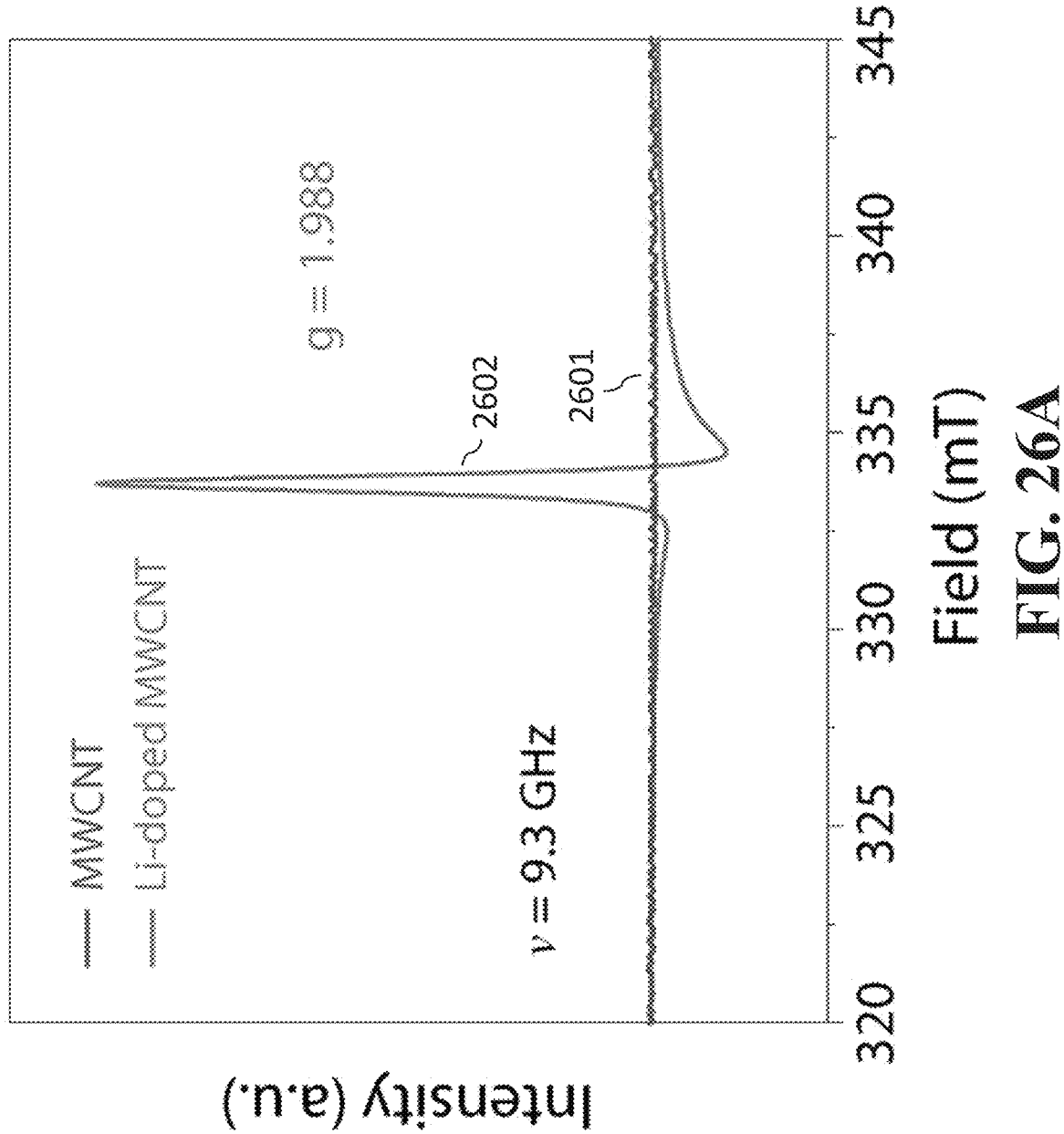

ANODES, CATHODES, AND SEPARATORS FOR BATTERIES AND METHODS TO MAKE AND USE SAME

CROSS-REFERENCE TO RELATED PATENT APPLICATIONS

This application is a 35 U.S.C § 371 national application of PCT Application No. PCT/US17/49719, filed on Aug. 31, 2017, entitled "Anodes, Cathodes, And Separators For Batteries And Methods To Make And Use Same", which claims priority to U.S. Patent Appl. 62/381,782, entitled "Sulfurized Carbon As Stable High Capacity Cathodes In High Concentrated Electrolytes," filed Aug. 31, 2016, and U.S. Patent Appl. 62/460,985, entitled "Anode, Cathodes, and Separators For Batteries And Methods To Make And Use Same," filed Feb. 20, 2017, which patent applications are commonly owned by the owner of the present invention. These patent applications are hereby incorporated by reference in their entirety for all purposes.

GOVERNMENT INTEREST

This invention was made with government support under Grant No. FA9550-14-1-0111 and FA9550-12-1-0035, awarded by the U.S. Department of Defense, Air Force Office of Scientific Research. The United States government has certain rights in the invention.

FIELD OF INVENTION

Anodes, cathodes, and separators for batteries (electrochemical energy storage devices), and more particularly (a) Li metal anodes having lithiated carbon films (as dendrite suppressors and protective coatings for the Li metal anodes), (b) sulfurized carbon cathodes, (c) graphene nanoribbon (GNR) coated (or modified) separators. This includes the methods of making each of these anodes, cathodes, and separators, and the methods of using each of these alone or in combination with one another, such as in batteries.

BACKGROUND OF INVENTION

Lithium-ion batteries are today's energy storage device technology of choice for electronic devices and electric vehicles. Since its commercialization in 1991, the lithium-ion battery (LIB) enabled wireless electronic devices, revolutionizing global communications. Almost three decades later, the LIB is expected to facilitate the integration of renewable energy into the electrical grid, as well as to allow affordable electric transportation. [Goodenough 2013; Noorden 2014; Dunn 2011; J. Zhang 2017]. However, these applications demand energy storage capabilities that the LIBs will be unable to meet, even if the theoretical energy density is reached. Therefore, new battery chemistries with higher energy densities have attracted the attention of the scientific community. There are new efforts to develop new battery chemistries with higher energy densities, such as lithium-air (Li—$O_2$) and lithium-sulfur (Li—S), while also resolving the current limitations with pure lithium, commonly called lithium metal anodes. Li-air (Li—$O_2$) and Li-sulfur (Li—S) systems have shown great promise as the energy densities are almost one order of magnitude higher than that of the LIB. [Noorden 2014; Bruce 2011; Girishkumar 2010; Manthiram 2015; Armand 2008].

In Li-air and Li-sulfur batteries, the positive electrode or cathode is coupled with Li as the negative electrode or anode. [Bruce 2011] Li metal (as opposed to lithium ion=$Li^+$) possess one of the highest theoretical specific capacities (3,860 mAh $g^{-1}$) and the lowest electrochemical potential (−3.040 V vs. standard hydrogen electrode) of all possible anode materials [Xu 2014]; far surpassing presently used graphite anodes in LIBs. While Li metal was extensively investigated as an anode material in the late 1980s, safety issues associated with its use and the short life of the battery hampered its commercialization. Li metal was eventually replaced by graphite and lithium ions. [Goodenough 2013; Xu 2014; Whittingham 2012]. The growing demand for energy storage has revived the attempts to overcome the safety and lifetime issues of Li metal anodes.

A main challenge of Li metal anode is its tendency to form whisker and needle-like structures, often called "dendrites," during the charging process. These dendrites can either isolate Li, shortening the life of the battery, or penetrate through the separator, forming an internal short circuit. The formation of dendrites is related to the reactivity between Li and the electrolyte; the low electrochemical potential of Li makes possible the instantaneous reduction of the electrolyte on its surface, creating a passivation layer or solid electrolyte interface (SEI). This SEI layer is typically inhomogeneous and can easily break as a result of the volume change during the charge-discharge cycle, which promotes the growth of dendrites through the fractures, as well as the production of dead Li (electrically isolated Li). [Xu 2014; Cohen 2000; Lin I 2017].

Thus, in spite of these advantages, the practical application of using Li metal in commercial batteries has been hindered by the safety concerns associated with the Li dendrite growth upon repeated charge/discharge cycling. In contact with the electrolyte, Li forms an inhomogeneous solid electrolyte interphase, which provides nucleation sites for dendrite formation at any current density, in addition to the parasitic reactions that occur. These issues give rise to a low coulombic efficiency, a gap formation between the anode and the interface layer, the depletion of the electrolyte and short circuits that can generate fires and explosions.

The different approaches that have been tried to suppress the formation of Li can be divided into three different categories. The first category is based in the modification of the electrolyte composition to improve the ion transportation and consequently the properties of the SEI. [Qian 2015; Besenhard 1993; Ding I 2013; Osaka 1997; Li 2015; Jin 2015; Ding I 2013]. The second involves the development of solid electrolytes that acts as barriers to stop dendrite propagation without compromising the ion transportation. [Bates 1993; Zhou 2016; Wang 2017]. The third category focuses on protecting the interface Li-electrolyte by forming a protective layer that will control the Li deposition. [Zheng 2014; Lee 2015; Kim 2015; Kozen 2015; Li 2016]. To ensure a homogenous deposition of Li, this protective layer needs to be mechanically strong, chemically stable, and able to control the flow of Li ions. Different carbon materials, metal oxides and polymers have been used and proven to form a stable protective layer that prevent the Li dendrite formation. Nevertheless, in most cases, current collectors and complex fabrication methods are required, and, in most cases, still result in the formation of a gap between the anode and the protective layer giving rise to dendrite formation.

Another interesting strategy is the use of three dimensional (3D) porous frameworks as host structures for Li metal. In this approach, Li metal is electrodeposited in a 3D structure, where it is accommodated and distributed in the empty volume of the porous framework, which reduces local current density and minimizes Li dendrite formation. [Zhang 2016; Yang 2015; Y. Zhang I 2017; Lin 2016; Liu 2016; Lin II 2017; Y. Zhang I 2017; Tour PCT '052 application]. The use of scaffolds or 3D frameworks implies that the gravimetric or volumetric capacity of the Li metal anode is reduced by including the mass or volume of the framework component. An ideal framework structure for Li dendrite suppression would involve a high surface area, low density material with a homogeneously conductive surface for Li deposition that would maximize the gravimetric capacity of the Li metal anode. In addition, a non-tortuous path for Li plating/stripping is desired for reversible operation and high rate applications.

Furthermore, improved high capacity cathodes are desired, such as to achieve batteries with improved energy density and lower cost effectiveness. The development of high capacity cathodes for lithium ion batteries (LIBs) is desired to achieve batteries with improved energy density. Commercially available cathodes such as lithiated metal oxides (e.g., $LiCoO_2$, $LiMnO_2$, $LiFePO_4$, and the like) present lower gravimetric capacity. However, such cathodes display high voltage operation (>3 V vs. $Li/Li^+$) during charge/discharge processes, thereby leading to batteries with comparatively high energy density compared to other battery technologies.

Newer cathodes such as those based on elemental sulfur can lead to much higher energy density because the specific capacity to store Li ions is much higher (1675 mAh $g^{-1}$) compared to lithiated metal oxide cathodes (<200 mAh $g^{-1}$), even though sulfur's voltage operation is lower (~2.1 V vs. $Li/Li^+$).

Sulfur cathodes are also especially attractive considering their cost, low toxicity and abundance when compared to metal oxide cathodes. However, the challenge posed by sulfur cathodes is to control and suppress the "shuttle" effect, by which lithiated species of sulfur, namely lithium polysulfides (i.e., linear chains of sulfur bonded to lithium ion at their ends, $Li_xS_y$, with x=2, y=4-8), can be dissolved into the battery electrolyte.

Moreover, the dissolution of Li polysulfides to the electrolyte has two main deleterious effects: one is that it depletes sulfur content from the cathode and the second is that there is an accumulative reaction of Li polysulfides over the surface of the Li metal anode. These two factors lead to a fast capacity drop in Li—S batteries with a concomitant increased resistance to lithiate/delithiate the cathode.

The approaches to mitigate the Li polysulfide dissolution have been focused on four main strategies: (1) chemical/physical blocking barriers to slow/stop diffusion of Li polysulfides, (2) coated sulfur particles to suppress Li polysulfide dissolution, (3) solid electrolytes, and (4) sulfurized carbon species. Among these options, the sulfurized carbon species involves the chemical covalent bonding between sulfur and a carbon species, in which elemental sulfur is no longer present.

A separator is generally a porous membrane that functions to keep an anode and a cathode apart electrically while still allowing the transport of ionic charge carriers between them. Improved or modified separators are also desired to improve the cycling stability and decrease the self-discharge effect in batteries. The surface modification of the separator prevents the diffusion of undesirable materials between an anode and a cathode of a battery.

SUMMARY OF INVENTION

The present invention includes new anodes and new processes for modifying the Li metal surface enabling its safe use in lithium metal batteries. The modification includes coating the Li metal surface with a multi-walled carbon nanotubes (MWCNTs) (or graphene nanoribbons, single walled nanotubes, or ultrathin carbon films) free-standing thin film ("Li-MWCNT" and, alternatively "MWCNT-Li" and "rLi") and an electrolyte. ("rLi", i.e., "red lithium," is indicative of the MWCNT acquiring a dark red color as a result of the lithiation (doping) process). The thin film is typically 20 to 80 microns in thickness, but it could be thinner or thicker as desired. This thin film coating becomes a lithiated carbon nanotube layer on top of the Li surface driven by the surface reaction between the Li metal and the MWCNT film. The entire MWCNT thin film then becomes doped by the Li metal. Then the Li-doped MWCNT becomes the surface which ejects Li ions toward the cathode upon discharging. This Li-doped MWCNT layer protects the underlying Li metal from parasitic reactions, preventing the formation of dendrites on the surface of Li to practical current densities of 1 and 2 mA $cm^{-2}$ and high areal capacities, such as 2 and 4 mAh $cm^{-2}$ considering one side of the electrode. The ranges could be much broader; these numbers are merely illustrative. The lithiated MWCNT layer that is in direct contact with the lithium metal also eliminates the creation of potential gaps or inhomogeneities between the solid electrolyte interphase layer and the Li metal anode because the MWCNT layer is electrostatically drawn to the lithium metal by the doping process, further reducing the possibility of dendrite formation and loss of coulombic efficiency.

Thus, among other things, the Li-MWCNT protects lithium from the electrolyte and lithium polysulfides in Li—S batteries. The Li-MWCNT can also be utilized in lithium-air ($LiO_2$) batteries to protect the lithium from the dissolved oxygen.

In some embodiment, the present invention encompasses full batteries and new processes by combining the anodes with sulfurized carbon as stable high capacity cathodes. In some embodiments, the present invention includes a full battery (FB) that combines the GCNT-Li anode with a sulfurized carbon (SC) cathode with high sulfur content (up to 60 wt %). This affords a stable device with an operation voltage of 2.15 V, high energy density (752 Wh $kg^{-1}$ total electrodes, total electrodes=GCNT-Li+SC+binder), high areal capacity (2 mAh $cm^{-2}$), and good cyclability (80% retention at >500 cycles), and the system is free of Li polysulfides and dendrites that would cause severe capacity fade. In some embodiments, the full batteries of the present disclosure also include high concentration electrolytes. In some embodiments, the cathodes of the present disclosure also include additional additives, such as graphene nanoribbons (GNRs) (SC/GNR).

The present invention further includes new separators and new processes for making separators having a thin coating of graphene nanoribbons (GNRs). This thin coating could also be made of MWCNTs, single-walled carbon nanotubes (SWCNTs) or graphene that is not in a ribbon shape, graphene oxide, or other form of carbon that can form a barrier to prevent sulfur species from migrating through the membrane. Here, a ribbon is defined as having a length to width aspect ratio of at least 3:1.

The present invention further includes batteries that include one or more of the anodes, cathodes, and separators described above and methods of using same.

In general, in one embodiment, the invention features a lithium metal anode that includes a lithium metal coated with a lithiated carbon material.

In general, in another embodiment, the invention features a cathode that includes a sulfurized carbon cathode.

In general, in another embodiment, the invention features a GNR-modified separator that includes a polymer material coated with a layer of GNRs. The GNR-modified separator is operable for use as a separator in a battery.

In general, in another embodiment, the invention features a battery that includes an anode, a cathode, and a separator positioned between the anode and the cathode. The battery comprises a component selected from the group consisting of: (a) a lithium metal anode that includes a lithium metal coated with a lithiated carbon material; (b) a cathode that includes a sulfurized carbon cathode; (c) a GNR-modified separator that includes a polymer material coated with a layer of GNRs in which the GNR-modified separator is operable for use as a separator in a battery; and (d) combinations thereof.

Implementations of the invention can include one or more of the following features:

The battery can include the lithium metal anode that includes the lithium metal coated with the lithiated carbon material.

The battery can include (a) the lithium metal anode that includes the lithium metal coated with the lithiated carbon material and (b) the cathode that includes the sulfurized carbon cathode.

The battery can include (a) the lithium metal anode that includes the lithium metal coated with the lithiated carbon material, (b) the cathode that includes the sulfurized carbon cathode, and (c) the GNR-modified separator that includes a polymer material coated with a layer of GNRs in which the GNR-modified separator is operable for use as a separator in a battery.

The battery can include the cathode that includes the sulfurized carbon cathode.

The battery can include (a) the cathode that includes the sulfurized carbon cathode, and (b) the GNR-modified separator that includes a polymer material coated with a layer of GNRs in which the GNR-modified separator is operable for use as a separator in a battery.

The battery can include the GNR-modified separator that includes a polymer material coated with a layer of GNRs in which the GNR-modified separator is operable for use as a separator in a battery.

In general, in another embodiment, the invention features a method that includes making a lithium metal anode. The method includes selecting a lithium metal having a surface. The method further includes coating the surface of the lithium metal with a carbon material and an electrolyte. The method further includes performing a reaction involving the lithium metal, carbon material, and the electrolyte) to form a lithiated layer on top of the lithium metal.

In general, in another embodiment, the invention features a method that includes making a sulfurized carbon cathode.

In general, in another embodiment, the invention features a method that includes selecting a polymer material operable for use as a separator in a battery, and modifying the polymer material by adding a layer of GNRs to form a GNR-modified separator.

In general, in another embodiment, the invention features a method of forming a battery that includes the steps of combining an anode, a cathode, and a separator positioned between the anode and cathode. The method further includes the step selected from the group consisting of: (a) making the lithium metal anode as set forth above, (b) making the sulfurized carbon cathode as set forth above; (c) making the GNR-modified separator as set forth above; and (d) combinations thereof.

Implementations of the invention can include one or more of the following features:

In the method of forming the battery, the anode can be made by making the lithium metal anode as set forth above.

In the method of forming the battery, (a) the anode can be made by making the lithium metal anode as set forth above and (b) the cathode can be made by making the sulfurized carbon cathode as set forth above.

In the method of forming the battery, (a) the anode can be made by making the lithium metal anode as set forth above, (b) the cathode can be made by making the sulfurized carbon cathode as set forth above, and (c) the GNR-modified separator can be made as set forth above.

In the method of forming the battery, the cathode can be made by making the sulfurized carbon cathode as set forth above.

In the method of forming the battery, (a) the cathode can be made by making the sulfurized carbon cathode as set forth above and (b) the GNR-modified separator can be made as set forth above.

In the method of forming the battery, the GNR-modified separator can be made as set forth above.

In general, in another embodiment, the invention features a method of forming a battery that includes the steps of combining an anode, a cathode, and a separator positioned between the anode and the cathode. The battery comprises a component selected from the group consisting of: (a) a lithium metal anode that includes a lithium metal coated with a lithiated carbon material; (b) a cathode that includes a sulfurized carbon cathode; (c) a GNR-modified separator that includes a polymer material coated with a layer of GNRs in which the GNR-modified separator is operable for use as a separator in a battery; and (d) combinations thereof.

Implementations of the invention can include one or more of the following features:

The method of forming the battery can include the lithium metal anode that includes the lithium metal coated with the lithiated carbon material.

The method of forming the battery can include (a) the lithium metal anode that includes the lithium metal coated with the lithiated carbon material and (b) the cathode that includes the sulfurized carbon cathode.

The method of forming the battery can include (a) the lithium metal anode that includes the lithium metal coated with the lithiated carbon material, (b) the cathode that includes the sulfurized carbon cathode, and (c) the GNR-modified separator that includes a polymer material coated with a layer of GNRs in which the GNR-modified separator is operable for use as a separator in a battery.

The method of forming the battery can include the cathode that includes the sulfurized carbon cathode.

The method of forming the battery can include (a) the cathode that includes the sulfurized carbon cathode, and (b) the GNR-modified separator that includes a polymer material coated with a layer of GNRs in which the GNR-modified separator is operable for use as a separator in a battery.

The method of forming the battery can include the GNR-modified separator that includes a polymer material coated with a layer of GNRs in which the GNR-modified separator is operable for use as a separator in a battery.

Implementations of the invention can include one or more of the following features:

The lithium metal can be in the form of a lithium foil.

The carbon material can include multi-walled carbon nanotubes.

The multi-walled carbon nanotubes can be in the form of a bucky paper.

The carbon material can include graphene nanoribbons.

The nanoribbons can be in the form of a filtered nanoribbon paper.

The carbon material can be selected from a group consisting of multi-walled carbon nanotubes, single-walled carbon nanotubes, few-walled carbon nanotubes, graphene nanoribbons, graphene oxide, graphene oxide nanoribbons, graphoil, graphene nanoplatelets, graphite, activated carbon, thermally treated asphalt, amorphous carbon, carbon black, and mixtures thereof.

The carbon materials can further be treated with a polymer to make the carbon materials more flexible without cracking.

The polymer can include polydimethylsiloxane.

The polymer can be selected from a group consisting of polydimethylsiloxane, polyurethane, thermoplastic polyurethane, polybutadiene, poly(styrene butadiene), poly(styrene butadiene styrene), polyacrylonitrile, polyaniline, poly fluorinated systems, poly(methyl methacrylate), poly(ethylene glycol), poly(ethylene oxide), polyacrylates, vinyl polymers, chain growth polymers, step growth polymers, condensation polymers, and mixtures thereof.

The electrolyte can be selected from the group consisting of lithium bis(trifluoromethanesulfonyl)imide (LiTFSI), dimethoxyethane (DME), and 1,3-dioxolane (DOL), and mixtures thereof.

The electrolyte can include a mixture of the 1 mol $L^{-1}$ lithium bis(trifluoromethanesulfonyl)imide (LiTFSI) in a ratio of 1:1 of the dimethoxyethane (DME) and the 1,3-dioxolane (DOL).

The electrolyte can be an ionic liquid or a mixture of the ionic liquid with an organic solvent.

The electrolyte can be formed from a salt in a solvent. The salt can be selected from the group consisting of lithium hexafluorophosphate, lithium perchlorate, lithium bis(fluorosulfonyl)imide, lithium bis(oxalato)borate, lithium tetrafluoroborate, and combinations thereof. The solvent can be selected from the group consisting of ethylene carbonate, propylene carbonate, butylene carbonate, vinyl ethylene carbonate, dimethyl carbonate, methyl ethyl carbonate, diethylene carbonate, tetraethylene glycol dimethyl ether, and combinations thereof.

The electrolyte can be placed on or between the carbon material and the lithium metal in the initial phases of the method.

The electrolyte can be in a high concentration.

The electrolyte can be between 0.5 and 10 mol/L of lithium bis(fluorosulfonyl)imide (LIFSI) in dimethoxyethane (DME).

The electrolyte can be between 2 and 8 mol/L of the lithium bis(fluorosulfonyl)imide (LIFSI) in the dimethoxyethane (DME).

The electrolyte can be between 3 and 5 mol/L of the lithium bis(fluorosulfonyl)imide (LIFSI) in the dimethoxyethane (DME).

The electrolyte can be 4 mol/L of the lithium bis(fluorosulfonyl)imide (LIFSI) in the dimethoxyethane (DME).

An electrolyte can be added to the battery in combination with the anode.

The electrolyte can be between 0.5 and 10 mol/L of lithium bis(fluorosulfonyl)imide (LIFSI) in dimethoxyethane (DME).

The lithium metal can dope the carbon material.

The carbon material can become red or silver in color.

The carbon material can be operable to suppress lithium dendrite formation of the lithium metal anode.

The doped carbon material can become the source of lithium ions injected across into the electrolyte and then into a cathode.

The lithium metal can be a metallic Li foil. The doped carbon material can act as a buffer between an SEI layer and the metallic Li foil.

The buffer can eliminate any gap formation between the SEI layer and the metallic Li foil.

The lithium metal, the carbon material, and the electrolyte can be part of a battery.

The lithium metal, the carbon material, and the electrolyte can be part of a battery anode.

The battery can include a sulfur cathode.

The sulfurized carbon cathode can include sulfur, carbon, and thermally treated polyacrylonitrile.

The sulfurized carbon cathode can include sulfur in an amount between about 47% and about 60 wt %.

The amount of the sulfur in the sulfurized carbon cathode can be between about 47% and about 57 wt %.

The amount of the sulfur in the sulfurized carbon cathode can be between about 55% and about 60 wt %.

The cathode can lack elemental sulfur.

The cathode can include a carbon additive that is a conductive filler.

The carbon additive can be selected from the group consisting of carbon black, graphene, carbon nanotubes, graphene nanoribbons, and combinations thereof.

The method of making the sulfurized carbon cathode can include heat treating elemental sulfur with a carbon source.

The carbon source can include PAN.

The step of heat treating can occur in the presence of an additive.

The additive can be selected from a group consisting of carbon black, graphene, carbon nanotubes, graphene nanoribbons, and combinations thereof.

The step of heat treating can occur at a temperature of at least about 100° C.

The step of heat treating can occur at a temperature of at least about 450° C.

The step of heat treating can occur for at least about 3 hours.

The method of making the sulfurized carbon cathode can include forming a powder that includes elemental sulfur, a carbon source, and an additive. The method of making the sulfurized carbon cathode can include heat treating the powder at a temperature of at least about 450° C. for at least three hours.

The carbon source can include PAN. The additive can include graphene nanoribbons.

The sulfurized carbon cathode can be part of a seamless hybrid of nanotubes grown from a graphene layer.

The polymer materials can include at least one of polypropylene (PP) and polyethylene (PE).

In general, in another embodiment, the invention features a method to form an anode that includes selecting a lithium metal having a surface. The method further includes coating the surface of the lithium metal with a carbon material and an electrolyte. The method further includes forming a lithiated carbon material by lithiating the carbon material with lithium from the lithium metal.

Implementations of the invention can include one or more of the following features:

The method can further include continuing the step of lithiating the carbon material until there is no remaining lithium in the lithium metal. The lithiated carbon material can be the anode.

In general, in another embodiment, the invention features a lithium metal anode. The lithium metal is coated with a thin film material and an electrolyte.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

It is also to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

FIG. 1 is a diagram of an arrangement of an anode, cathode, and separator in a battery that can utilize one or more of the new anodes, cathodes, and separators disclosed herein.

FIGS. 2A-2B are illustrations of an embodiment of the present invention that can utilize one or more of the new anodes, cathodes, and separators disclosed herein. FIG. 2A illustrates the embodiment during the discharge portion of the discharge/charge cycle. FIG. 2B illustrates the embodiment during the charge portion of the discharge/charge cycle.

FIGS. 4A-4B are, respectively, low magnification images of (a) the pristine Li surface and (b) the Li-MWCNT surface. FIGS. 4C-4D are, respectively, high magnification images of (c) the pristine Li surface and (d) the Li-MWCNT surface. Dendrites 401 are shown in FIG. 4C.

FIG. 17 shows rate performance (from 0.2 to 60 C) of the full cell.

FIGS. 23A-23F are graphs and an image related to a full battery (FB) with a GCNT-Li anode and SC cathode. FIG. 23A is a graph that shows cyclic voltammograms (CVs) of GCNT-Li and SC cathode half-cells in 4 M LiFSI/DME at 0.5 mV s$^{-1}$. FIG. 23B is a graph that shows galvanostatic charge/discharge curves of the FB at 0.1 C with areal capacity of 2 mAh cm$^{-2}$. FIG. 23C is a photograph of a FB prototype powering a LED. FIG. 23D is a graph that shows sequential rate performance test (0.2 to 9 C) and cycling stability of the FB. The inset shows CE (%) of the rate and stability test. FIG. 23E is a graph that shows self-discharge (SD) tests of the FB after 8 h and 1 week showing charge curve followed by continuous discharge curve during and after the open circuit period. The inset shows voltage vs capacity of the SD tests. FIG. 23F is a graph that shows Ragone plot of the GCNT-Li/SC FB, considering the combined mass of the anode and cathode active materials (Li and S) and the full electrode mass (including binder, carbon additives, GCNT, excess of Li), excluding the current collector.

FIG. 24A shows the fabrication process of the Li-MWCNT electrode consisted in wetting the MWCNT film with a high concentrated electrolyte and pressing it against the Li foil to dope the carbon nanotubes.

FIG. 24B is a photograph of MWCNT film after being doped with Li (dark red color). FIG. 24C is a scheme of the spontaneous lithiation of MWCNTs and the corresponding redox reaction.

FIG. 25A shows the morphology of the pristine MWCNT film characterized by SEM. FIGS. 25B-25C show the morphology of the Li-doped MWCNT film characterized by SEM.

FIGS. 26A-26B are graphs that show the electron paramagnetic resonance (EPR) and Raman spectroscopy, respectively, of MWCNT and Li-MWCNT. Raman spectra (532 nm) compares the vibrational spectra of the pristine MWCNT, the surface of Li metal and the resulting Li-MWCNT.

FIG. 28A is graph that shows single discharges of a Li-MWCNT/SC full battery under different alternated rate conditions. FIGS. 28B-28D are graphs that shows variations in current vs time.

FIG. 29A is a graph that shows the Ragone plot based on the cathode and anode-cathode weight. FIG. 29B is a graph that shows electrochemical impedance spectrum.

DETAILED DESCRIPTION

Figure 3:
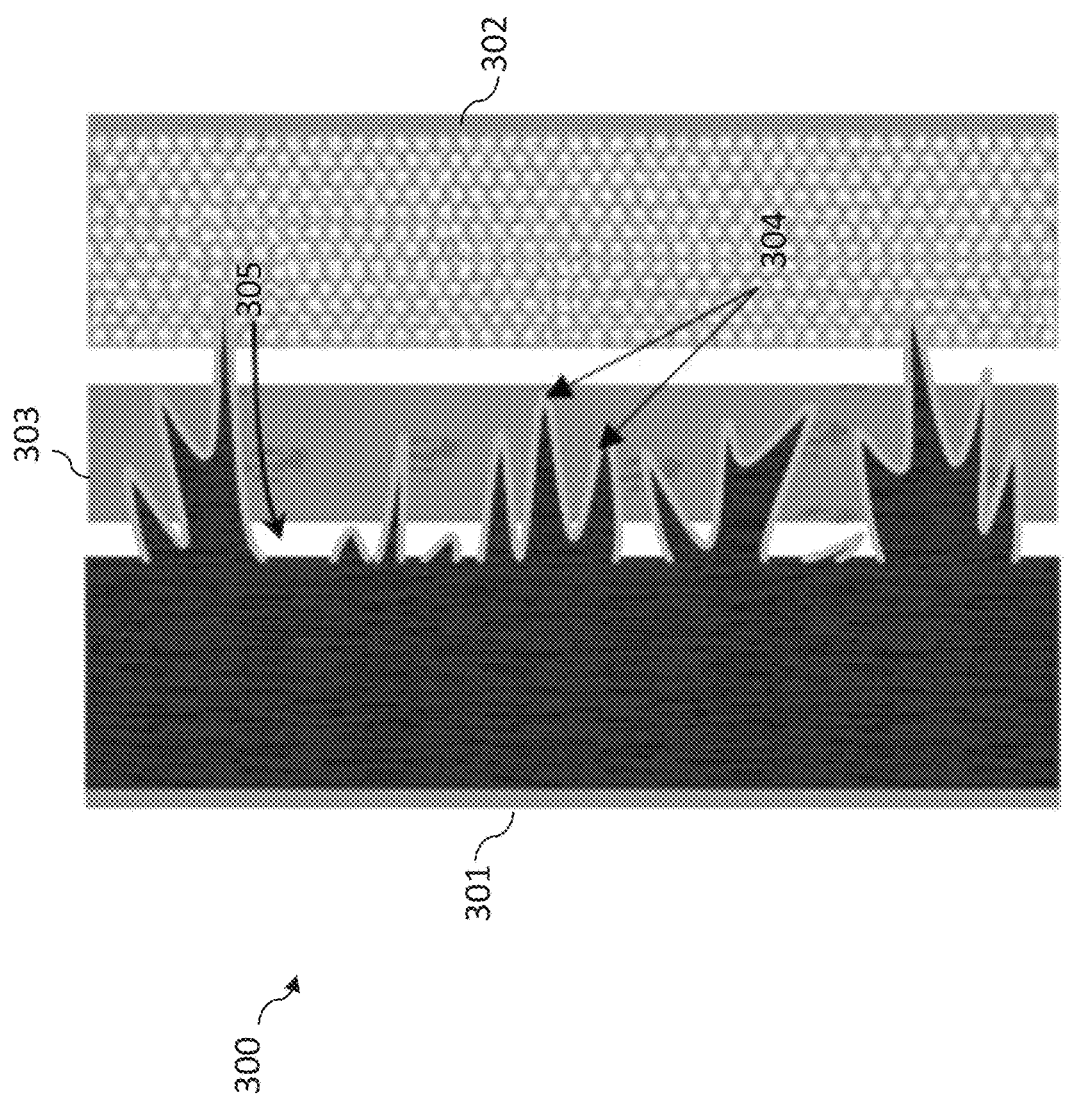
FIG. 3 is a diagram of a prior art battery that has a short circuit pathway due to dendrites.
Figure 4A:
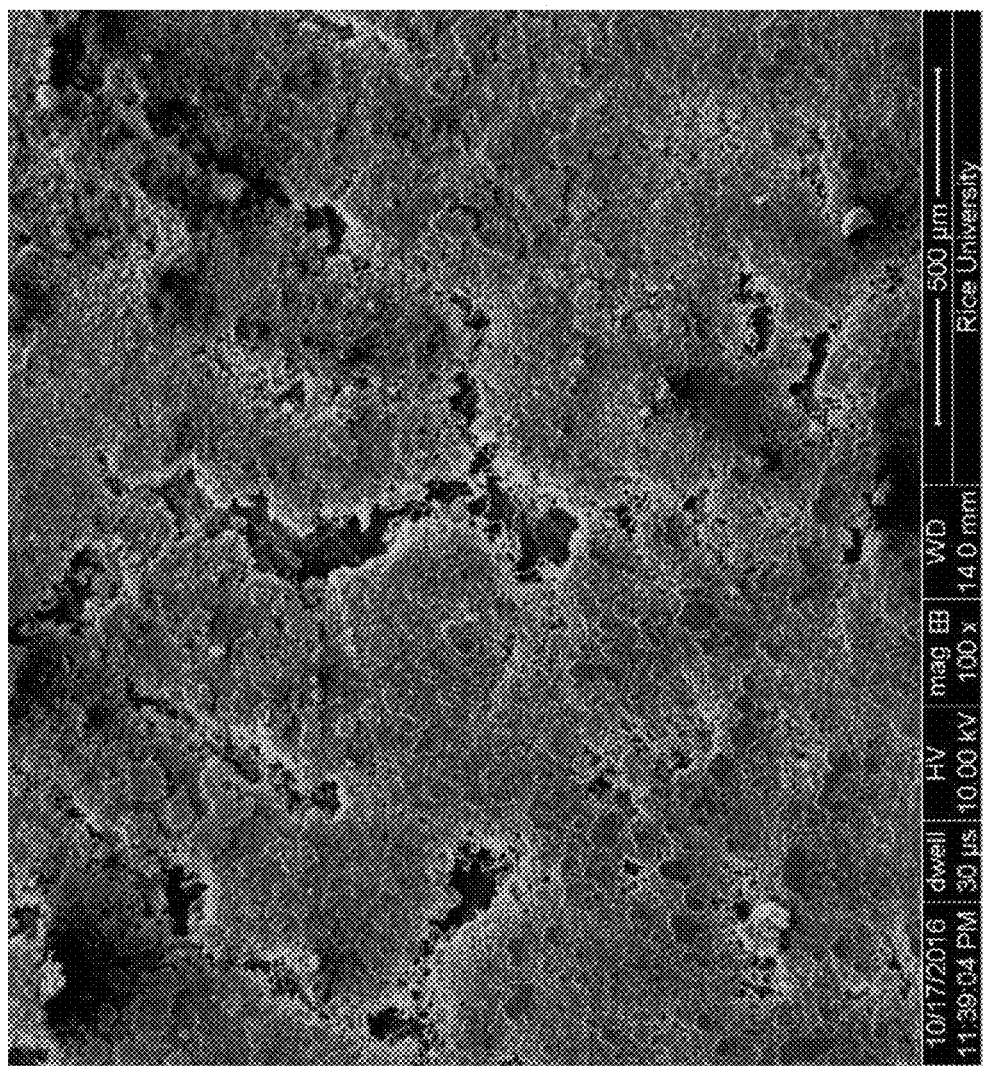
FIGS. 4A-4D are SEM images of the unmodified and lithiated-MWCNT modified Li foil surface after Li plating/stripping cycling.
Figure 4B:
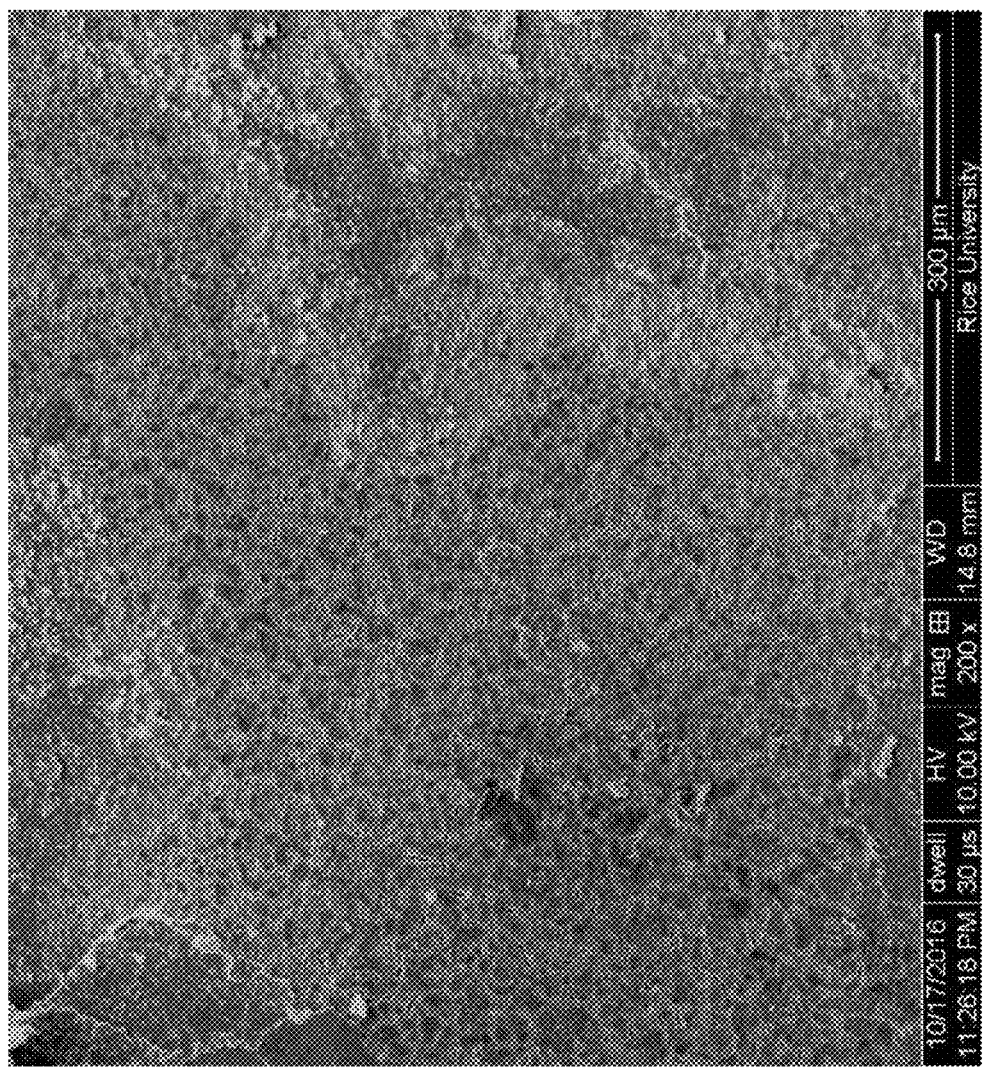
Figure 4C:
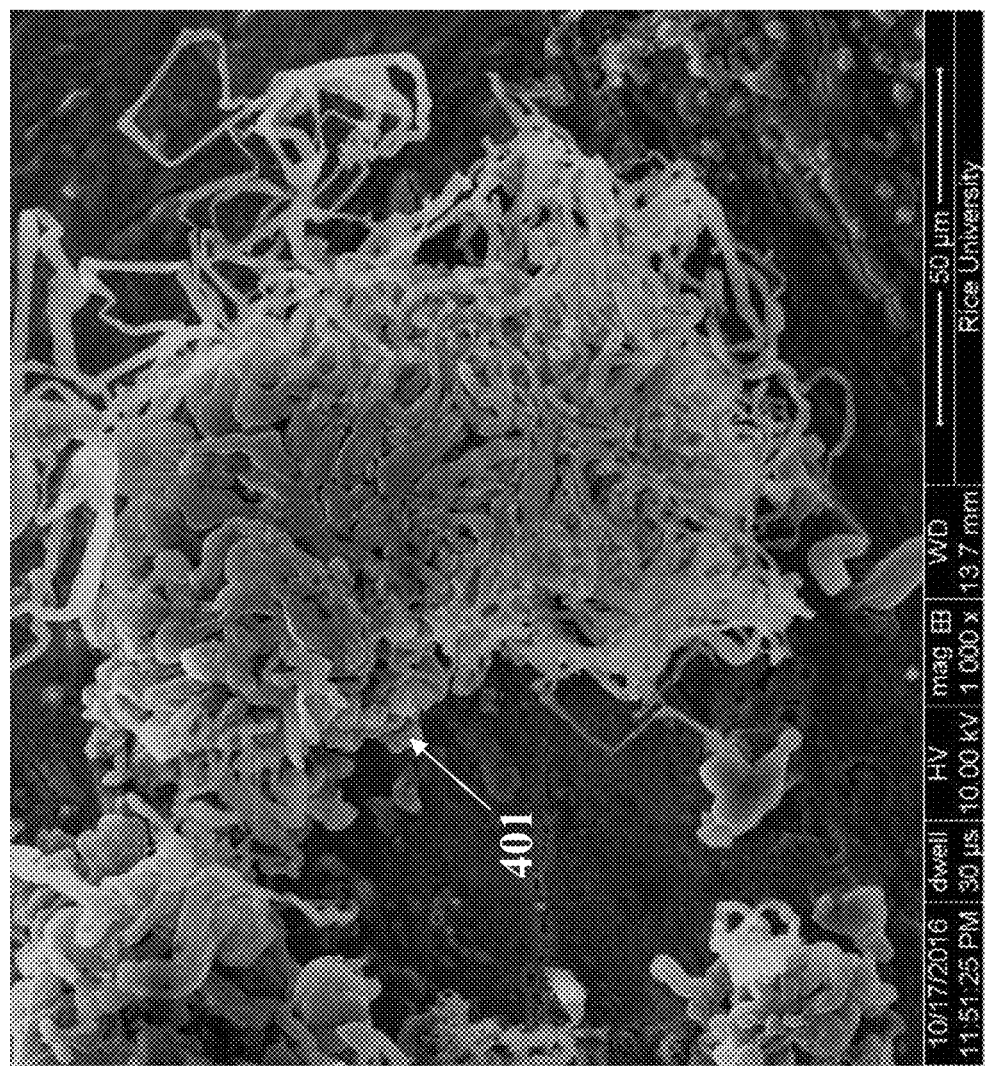
Figure 4D:
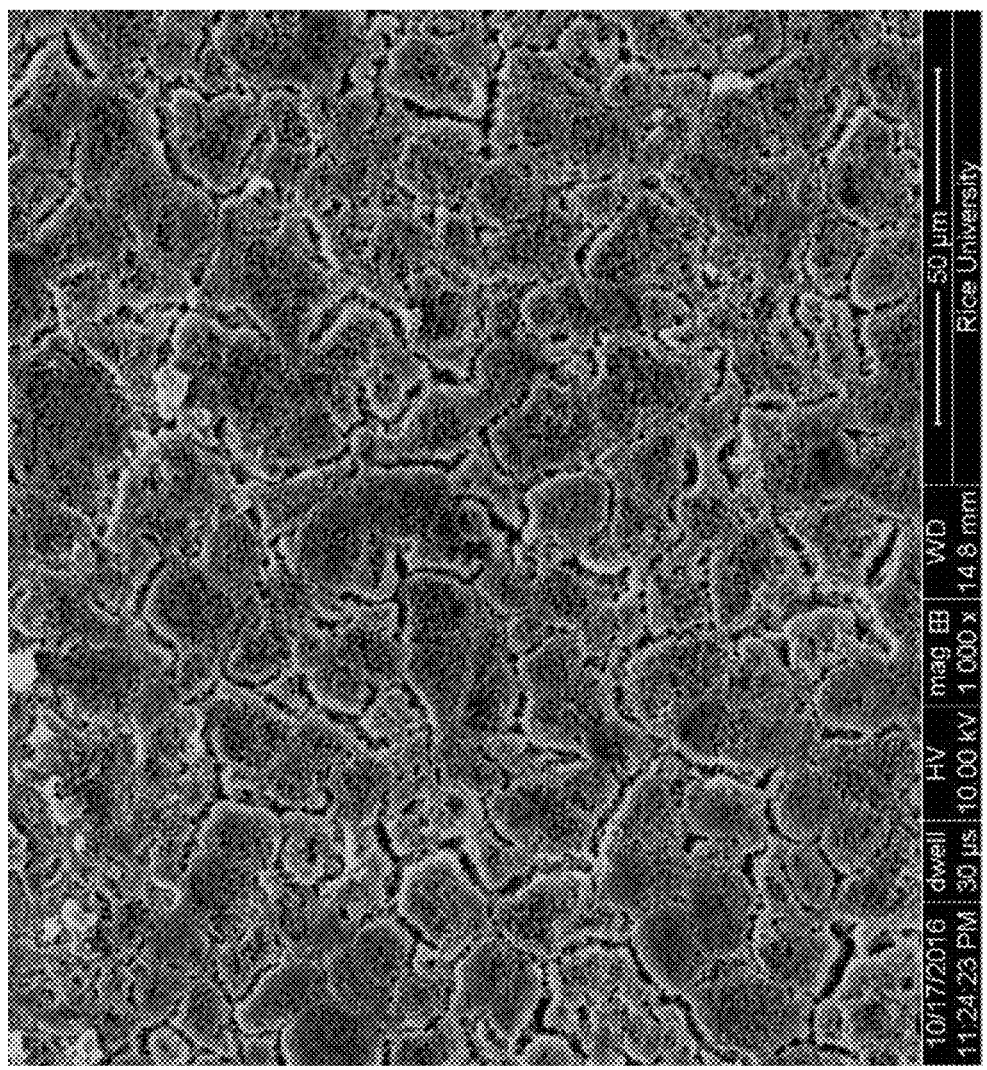

The present invention is directed to anodes, cathodes, and separators for improved batteries (electrochemical energy storage devices), and more particularly (a) Li metal anodes having lithiated carbon films (as dendrite suppressors and protective coatings for the Li metal anodes), (b) sulfurized carbon cathodes, (c) GNR-coated separators. This includes the methods of making each and the methods of using each of these alone or in combination with one another, such as in batteries.

As used herein, a "lithiated carbon film" is a carbon film to which lithium is bound to, or doped with, the carbon material in the carbon film. Furthermore, the lithium could be in the 0 or +1 oxidation state, being lithium metal or lithium ion when bound to the carbon material.

FIG. 1 is a diagram of an arrangement of anode 101, cathode 102, and separator 103 in a battery 103 that can utilize one or more of the new anodes, cathodes, and separators disclosed herein. The separator 103 electrically insulates the anode 101 from cathode 102 but can transport ions between anode 101 and cathode 102.

FIGS. 2A-2B are illustrations of battery 200 having anode 201, cathode 202, and separator 203. One or more of anode 201, cathode 202, and separator 203 can be an anode, cathode, or separator disclosed herein. In FIG. 2A, battery 200 is shown during the discharge portion of the discharge/charge cycle. Load 204 provides for electron flow to flow from anode 201 to cathode 202 as shown by arrows 205 with current flow from the cathode 202 to anode 201 as shown by arrows 206.

FIG. 2B illustrates battery 200 during the charge portion of the discharge/charge cycle. Charger 207 provides for electron flow to flow from cathode 202 to anode 201 as shown by arrows 208 with current flow from the anode 201 to cathode 202 as shown by arrows 209. For instance, when the anode 201 is a Li metal anode having a lithiated MWCNT film (as described herein), it is believed that MWCNT radical anion and lithium cations are formed and, upon discharge, the Li cations move to the cathode.

As noted above, the batteries shown in FIGS. 1 and 2A-2B can be used in an anode, cathode, and separator described here alone or in combination with one another. One advantage in doing so is, for example, is to prevent the growth of dendrites on the anode that would short circuit the battery. For example, as shown in FIG. 3, in the combination of a prior art anode 301, cathode 302, and separator 303 in battery 300, in which dendrites 304 have formed that penetrate the separator 303 resulting a short circuit pathway 305.

Anodes Having Lithiated Carbon Films

The present invention demonstrates that lithiated MWCNT, as an example, can act as a layer that effectively protects the Li surface against parasitic reactions and suppresses the formation of Li dendrites on the surface of the Li foil. The lithiation of the MWCNT film is achieved by contacting the Li surface and the MWCNT film with the use of electrolyte (4 mol L$^{-1}$ of lithium bis(fluorosulfonyl)imide (LIFSI) in dimethoxyethane), as an example. The lithiation reaction is spontaneous (complete in less than 30 minutes) and the MWCNT acquire a red color as a result of the lithiation (doping) process. It is believed that the lithiated carbon layer can act as an ion/electron transport medium, mediating the Li plating and stripping processes, thus suppressing the dendrite and rendering the Li a modified surface that is more chemically resistant against parasitic reactions with the liquid electrolyte. The dendrite suppression ability was observed by Li plating/stripping experiments between two Li foils in a 2032 coin cell configuration. FIGS. 4A-4D show scanning electron microscopy (SEM) images of the Li surface and the lithiated-MWCNT-modified Li surface (Li-MWCNT) after the same number of cycles (continuous plating/stripping of Li) at the same conditions. Li dendrites 401 are clearly observed in the unprotected Li foil (FIG. 4C) as a result of non-homogeneous Li deposition. The Li-MWCNT surface shows no signs of Li dendrites, instead the Li is evenly distributed over the lithiated CNT layer.

The stripping/plating process was investigated using the common electrolyte for sulfur cathodes: 1 M lithium bis(trifluoromethanesulfonyl)imide (LiTFSI) in a ratio of 1:1 of dimethoxyethane (DME) and 1,3-dioxolane (DOL). Moreover, to investigate protection against parasitic reactions, the same electrolyte with the addition of S in the form of lithium polysulfides (Li$_2$S$_6$) was used. The control experiments consisted of a bare Li foil under the same conditions. The additive lithium nitrate (LiNO$_3$) used to protect Li was not used in the electrolyte.

Figure 5:
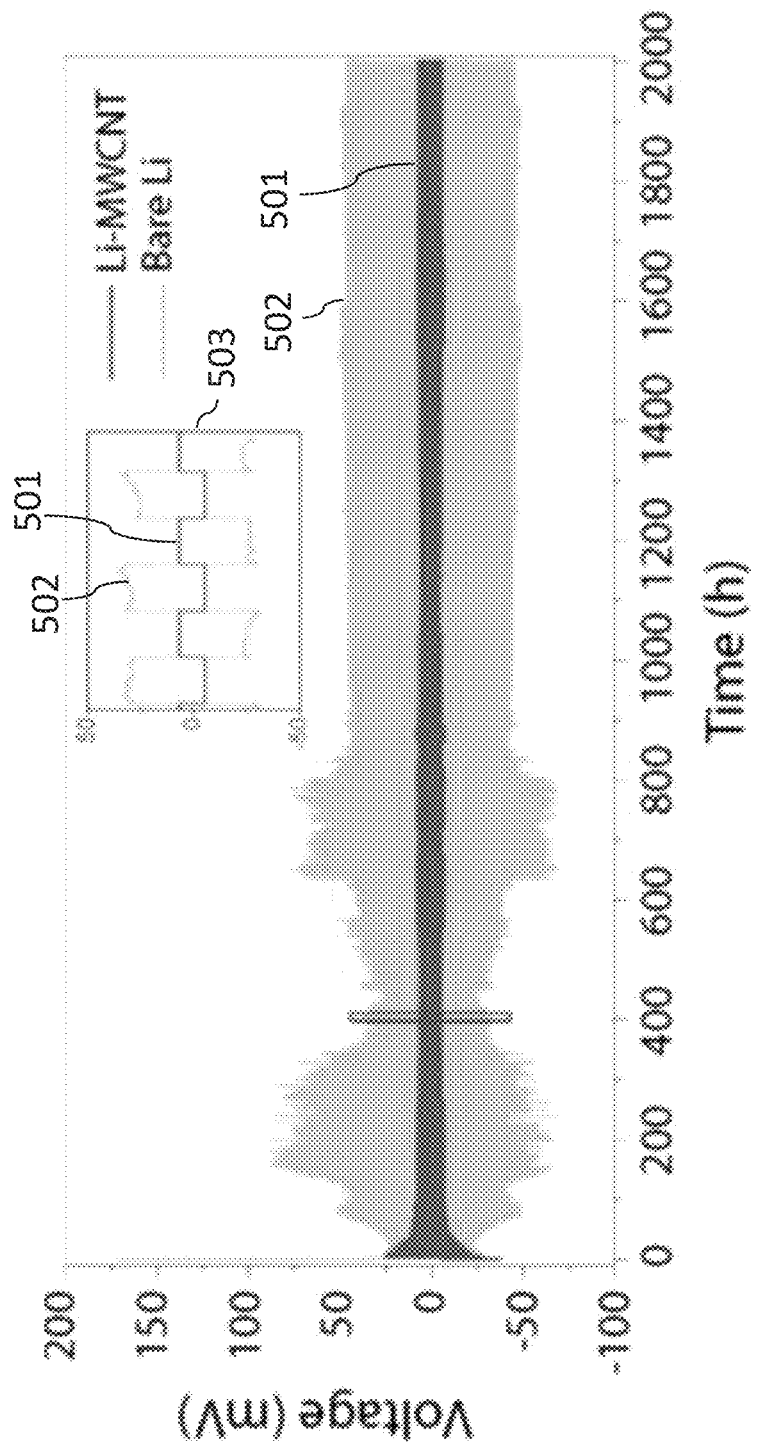
FIG. 5 is a graph that show the comparison of the cycling stability of Li-MWCNT and bare Li symmetric cells at a current density of 1 mA cm$^{-2}$ for a total capacity of 2 mAh cm$^{-2}$.
Figure 6:
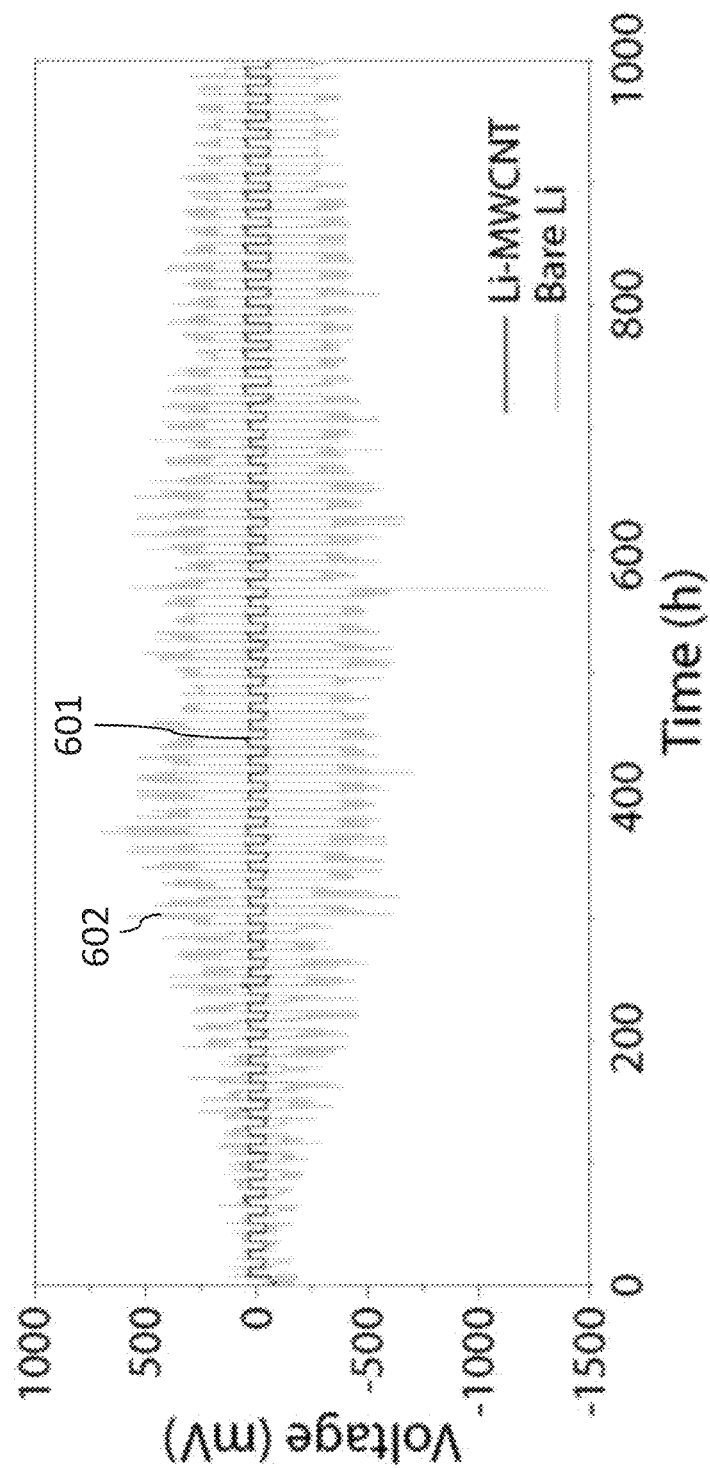
FIG. 6 is a graph showing the comparison of the cycling stability of the bare Li and the Li-MWCNT at a current density of 2 mA cm$^{-2}$ and a total capacity of 4 mAh cm$^{-2}$. 2 mg of S were added to the electrolyte in the form of lithium polysulfides (Li$_2$S$_6$) for chemical resistance testing.

FIGS. 5-6 show the cycling performance at a current density of 1 mA cm$^{-2}$ for a total capacity of 2 mAh cm$^{-2}$. In FIG. 5, curves 501-502 show the comparison of the cycling stability of Li-MWCNT and bare Li symmetric cells, respectively, with inset 503 showing a magnified portion of curves 501-502. The symmetrical cell of bare Li showed a larger Li stripping/platting overpotential (>40 mV vs Li/Li$^+$) than the Li-MWCNT (<40 mV vs Li/Li$^+$). The voltage profile of the bare Li cell showed fluctuations that can be attributed to possible dendrite-induced soft short circuits. In FIG. 6, curves 601-602 are for Li-MWCNT and bare Li, respectively. 2 mg of S were added to the electrolyte in the form of lithium polysulfides ($Li_2S_6$) for chemical resistance testing. The symmetrical cells were exposed to $LiS_x$ to simulate the chemical environment of a Li—S battery. The cell of bare Li showed a larger Li stripping/platting overpotential (>300 mV vs Li/Li$^+$) than the Li-MWCNT (<110 mV vs Li/Li$^+$). The voltage plateaus for Li-MWCNT were more defined and stable, which indicated the suppression of dendrite formation. The Li-MWCNT exhibited a lower stripping/plating overpotential than the bare Li (~16 times lower). In addition, the bare Li anode showed more voltage fluctuation after a few cycles, which might be attributed to the formation of Li dendrites and an increase in the gap between the Li foil and the interface layer, while the Li-MWCNT anode maintained a constant voltage profile. The same behavior was observed when sulfur was presented in the electrolyte, simulating the chemical environment of a Li—S battery.

Figure 7:
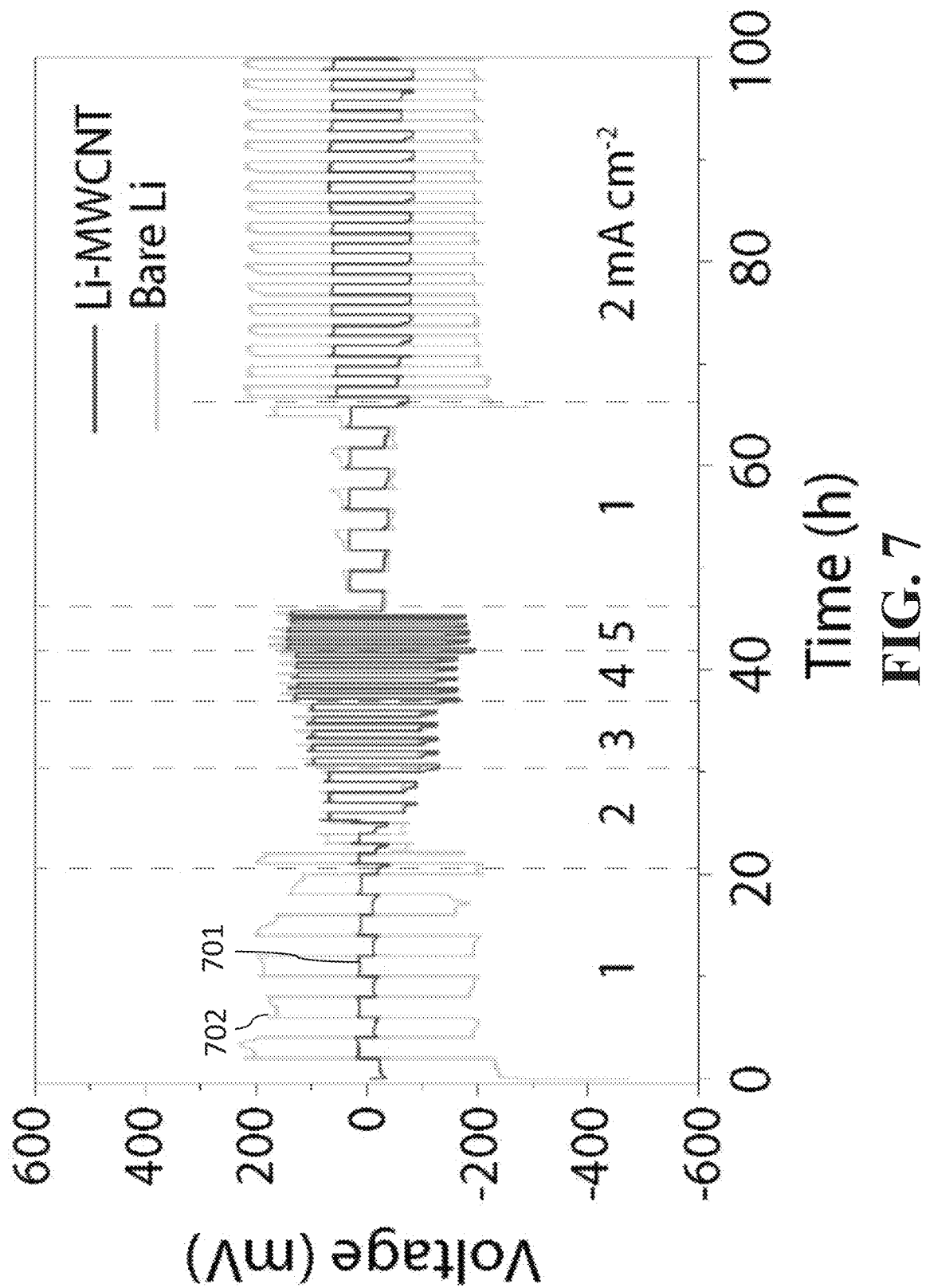
FIG. 7 is a graph showing the rate performance of the bare Li 701 and the Li-MWCNT 702 (current densities from 1 to 5 mA cm$^{-2}$) for a total capacity was 4 mAh cm$^{-2}$.
Figure 8:
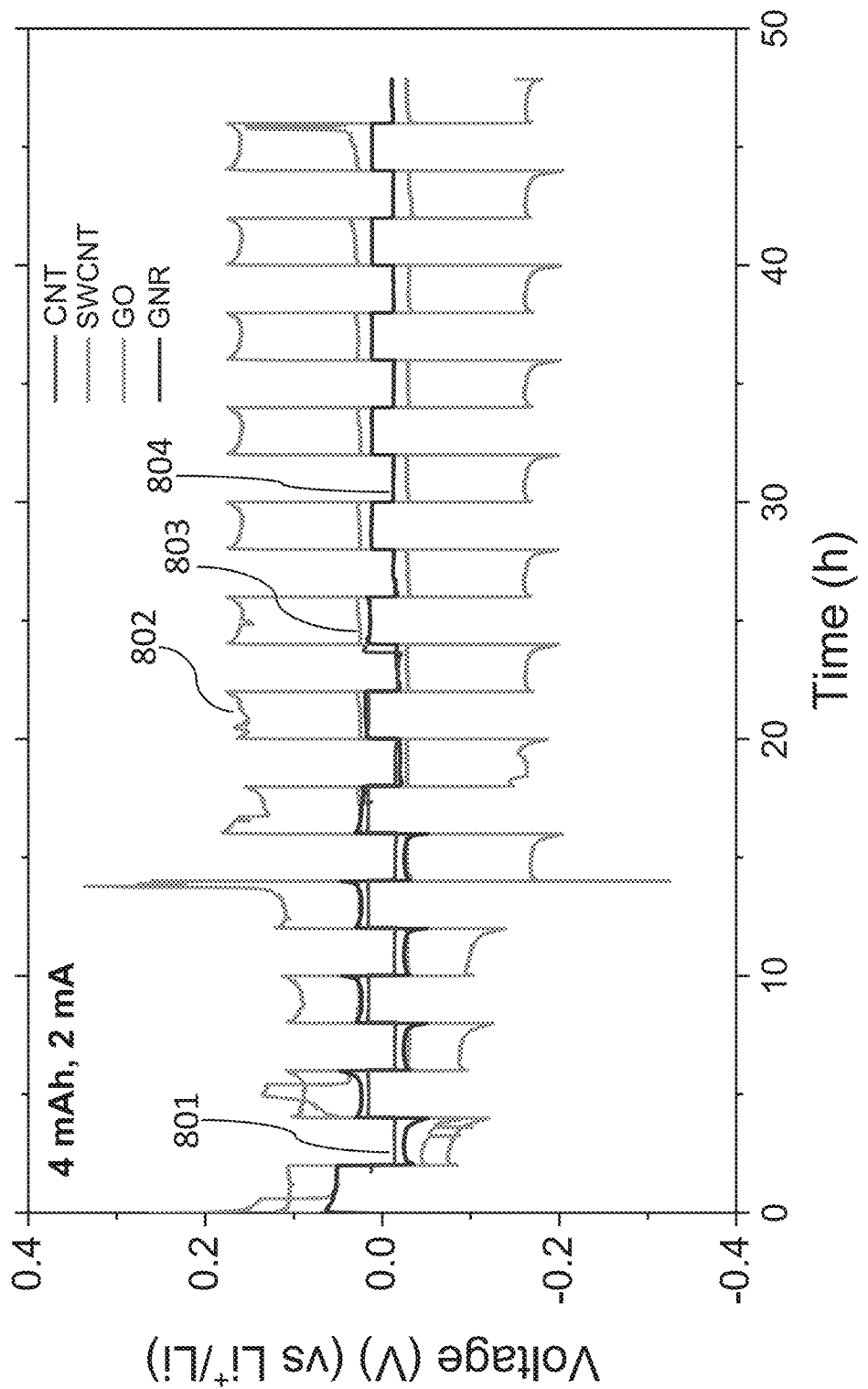
FIG. 8 is a graph showing the plating/stripping test with other carbon nanomaterials as thin films, namely CNT 801—MWCNTs 70-80 nm diameter (NTL Composites); SWCNT 802—HiPco single-walled CNTs (Rice); GO 803—Graphene oxide (AZ Electronics/EMD Merck); and GNR 804—Pristine graphene nanoribbons (AZ Electronics/EMD Merck).

Although lithium polysulfides have been found to improve the stability of Li by forming a strong SEI layer, the bare Li anode still exhibited fluctuations in the voltage profile and a larger overpotential, indicating the enhanced chemical resistance of the Li-MWCNT. The cycling stability at different current densities was investigated, Li-MWCNT exhibited lower overpotential and less fluctuations than the bare Li (FIG. 7). FIG. 8 shows a comparison when single-walled carbon nanotubes 802 are used and also graphene oxide 803 and graphene nanoribbons 804. Graphene nanoribbons can work well, being nearly equivalent to the MWCNTs 801. Mixtures of single-walled and MWCNTs can also be used, as well as chemically or mechanically shortened versions, or double- or triple-walled carbon nanotube versions.

For certain anodes of the present invention, the MWCNT film preparation was performed as follows: Pristine MWCNT (diameter=70-80 nm; M-grade; NanoTech Labs, Inc.) were dispersed in N-methyl-2-pyrrolidone (Sigma-Aldrich) using tip sonication. Alternatively, a dispersion of MWCNT can be achieved in a water and 2-propanol mixture (4:1 volume proportion ratio, respectively). The homogeneous dispersion was vacuum-filtrated through a porous aluminum membrane to produce a homogenous film (1.5 mg/cm$^2$) which is often referred to as a bucky paper. To obtain the free-standing film, the aluminum was dissolved in a 1 N sodium hydroxide solution.

For certain anodes of the present invention, the Li coating was carried out in an argon-filled glove box; 25 µL of 4 M LiFSI (Oakwoods Products, Inc.) in DME (Sigma-Aldrich) were placed on a Li foil (thickness=0.45 mm, MTI Corporation), following by the MWCNT film. The Li foil surface was cleaned before the reaction by scraping the surface to remove an oxide layer. Another 25 µL portion of 4 M LiFSI was added, followed by a second Li foil with the same thickness as the first Li foil. After 30 min, the upper Li foil was removed, resulting in a Li foil covered by a lithiated MWCNT film. See FIGS. 4B and 4D.

For the battery assembly regarding certain embodiments of the present invention, to study the Li stripping/plating, symmetric cells were prepared by assembling the Li-MWCNT electrodes into 2032-type coin cells. The electrolytes employed were either 1 M LiTFSI (Sigma-Aldrich) in a 1:1 ratio of DME and DOL (Sigma-Aldrich) or 4 M LiFSI in DME. The separator used was Celgard K2045. For the controls, symmetric cells using freshly scraped Li foils were assembled. A constant current was applied to the electrodes, and the potential and coulombic efficiencies were recorded over time.

For these embodiments, it was found that the MWCNT film was preferably well-attached to the Li surface. Furthermore, the MWCNT films after lithiation could become brittle. Also, though not required, the lithiation process of MWCNT was facilitated by high concentrated electrolyte.

In further anodes of the present invention, different carbon nanomaterials can be used (single walled CNTs, graphene oxide, graphene nanoribbons, high porosity ultra-thin graphite films, porous ultra-thin conductive films). For these alternative carbon materials, the graphene nanoribbons appeared to provide best performance for these selected, and they also appear to be as good as using the MWCNTs.

Furthermore, in further embodiments of the present invention, a thin and porous polymer coating with the MWCNTs, such as polydimethylsiloxane (PDMS), can be coated onto MWCNT films to render them more flexible and foldable (which would generally be desirable for large batteries, scrolled electrodes, and for flexible batteries).

The present invention will enable the safe use of pure Li metal anodes in advanced battery technologies required for the next generation of high energy density batteries, such as metallic rechargeable, sulfur and oxygen batteries. By solving the lithium dendrite formation with a simple fabrication process, the fabrication of batteries that can safely provide more energy storage will be possible. Furthermore, the fabrication process is simple and allows scalable production. This protective (buffer) layer can be also used to protect other type of metal electrodes, such as sodium or potassium or magnesium or sulfur or selenium.

Figures 9A, 9B:
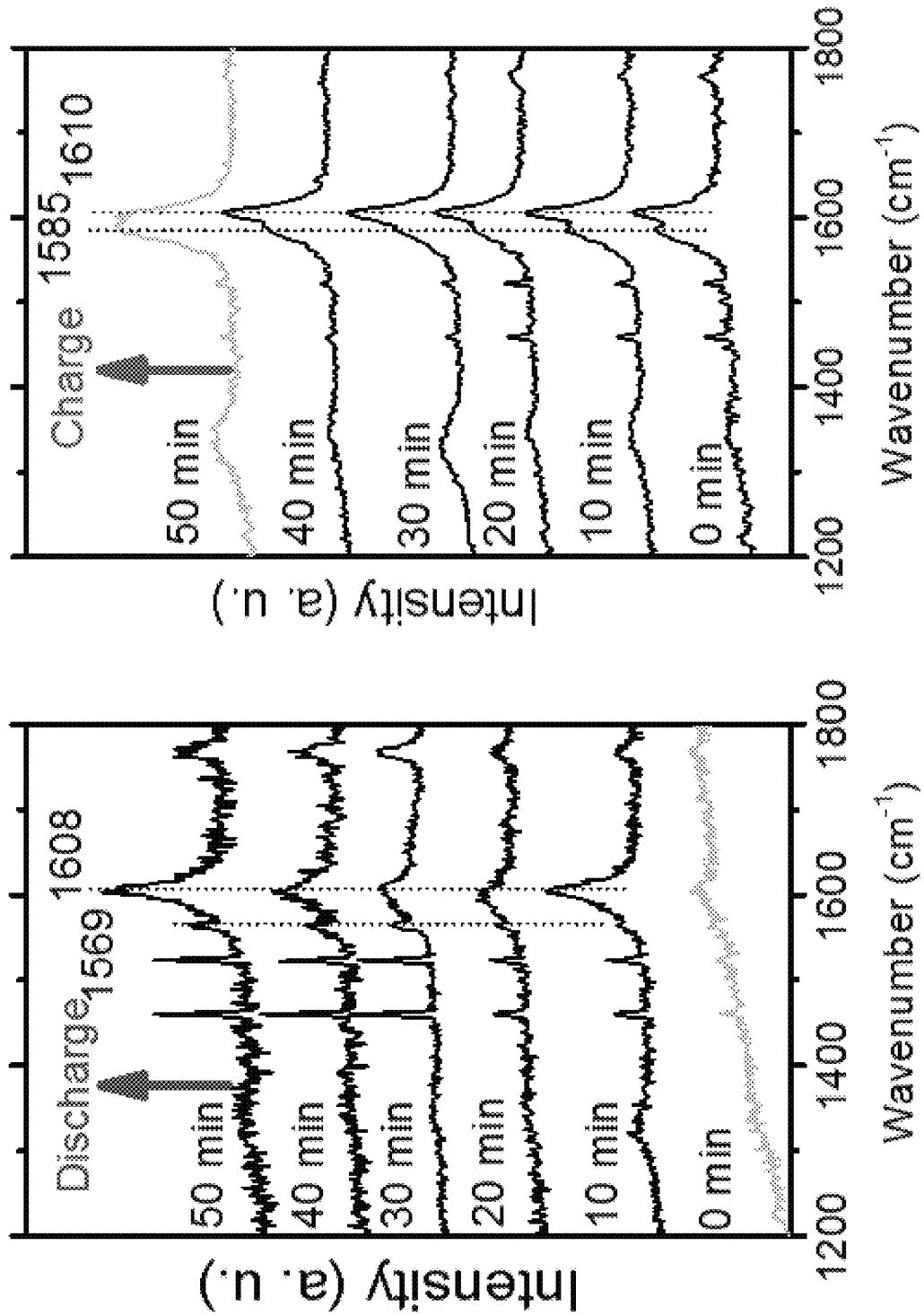
FIG. 9A is a graph showing in situ Raman measurements of a lithiated carbon layer used in anodes of the present invention over different discharge periods.
FIG. 9B is a graph showing in situ Raman measurements of a lithiated carbon layer used in anodes of the present invention over different charge periods.

Moreover, the lithiated carbon film is not only a protection layer, it also assists mediating the lithiation (plating and stripping reaction). FIG. 9A shows in situ Raman measurements of lithiated carbon nanotubes during discharge for time periods from 0 to 50 minutes (every 10 minutes), which reveal changes in the frequency of C—C modes (at approximately 1580 cm$^{-1}$, namely peaks at 1569 cm$^{-1}$ and 1608 cm$^{-1}$). FIG. 9B shows in situ Raman measurements of lithiated carbon nanotubes during charge for the same time periods from 0 to 50 minutes (every 10 minutes), which reveal changes in the frequency of C—C modes (at approximately 1580 cm$^{-1}$, namely at 1585 cm$^{-1}$ and 1610 cm$^{-1}$). These indicated that the lithiated carbon nanotubes participated in the lithiation/delithiation reaction.

Figure 10A:
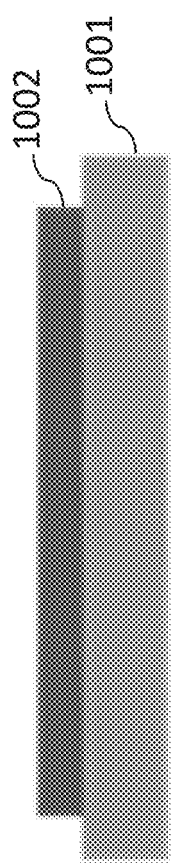
FIGS. 10A-10B are illustrations of a stainless steel substrate with a lithiated carbon nanotube film before and after, respectively, the plating of lithium.
Figure 10B:
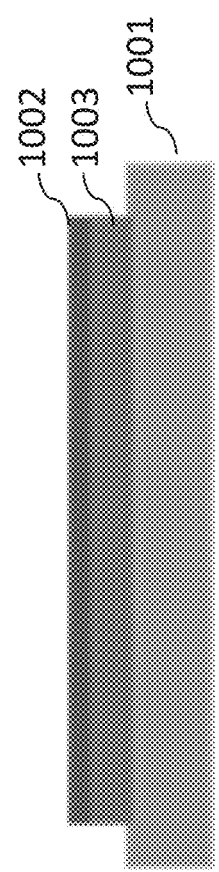
Figure 11A:
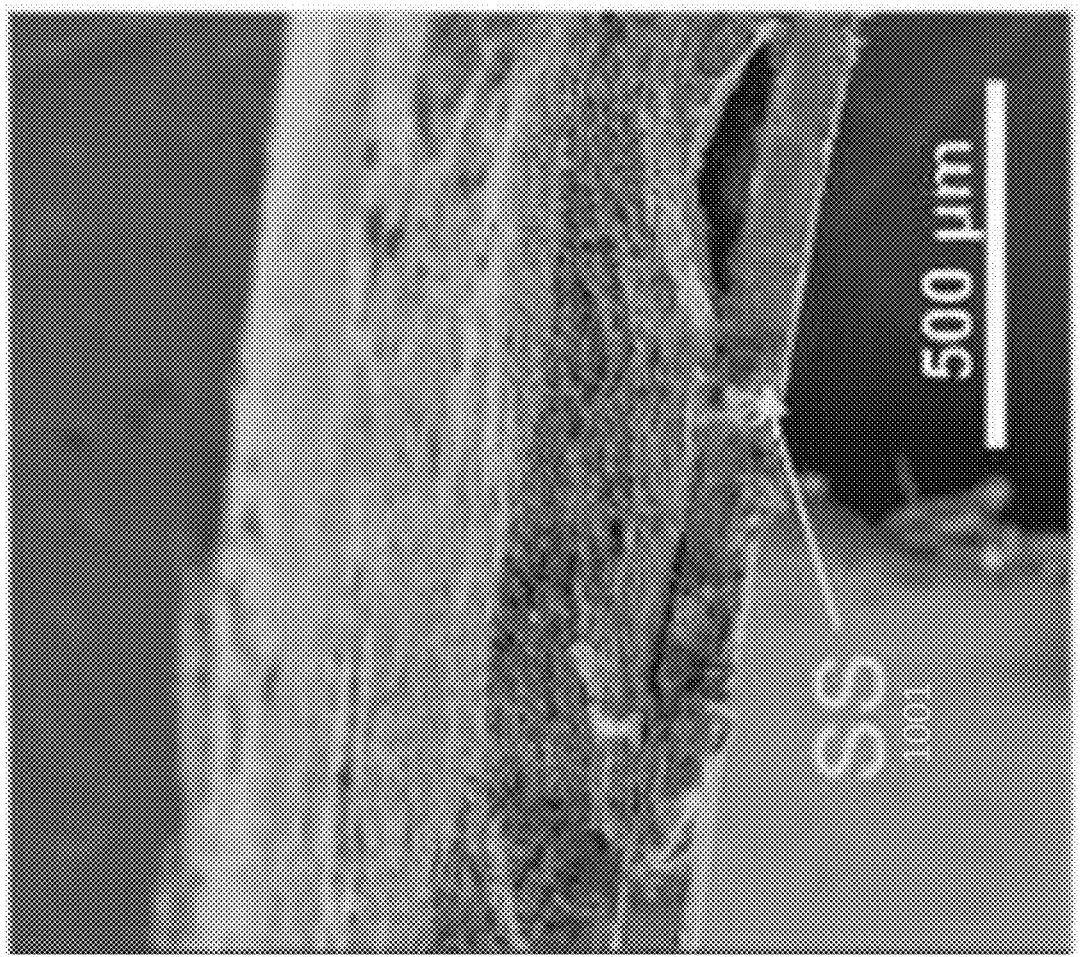
FIGS. 11A-11E are SEM images showing the stainless steel substrate with the lithiated carbon nanotubes film after the plating of lithium.
Figure 11B:
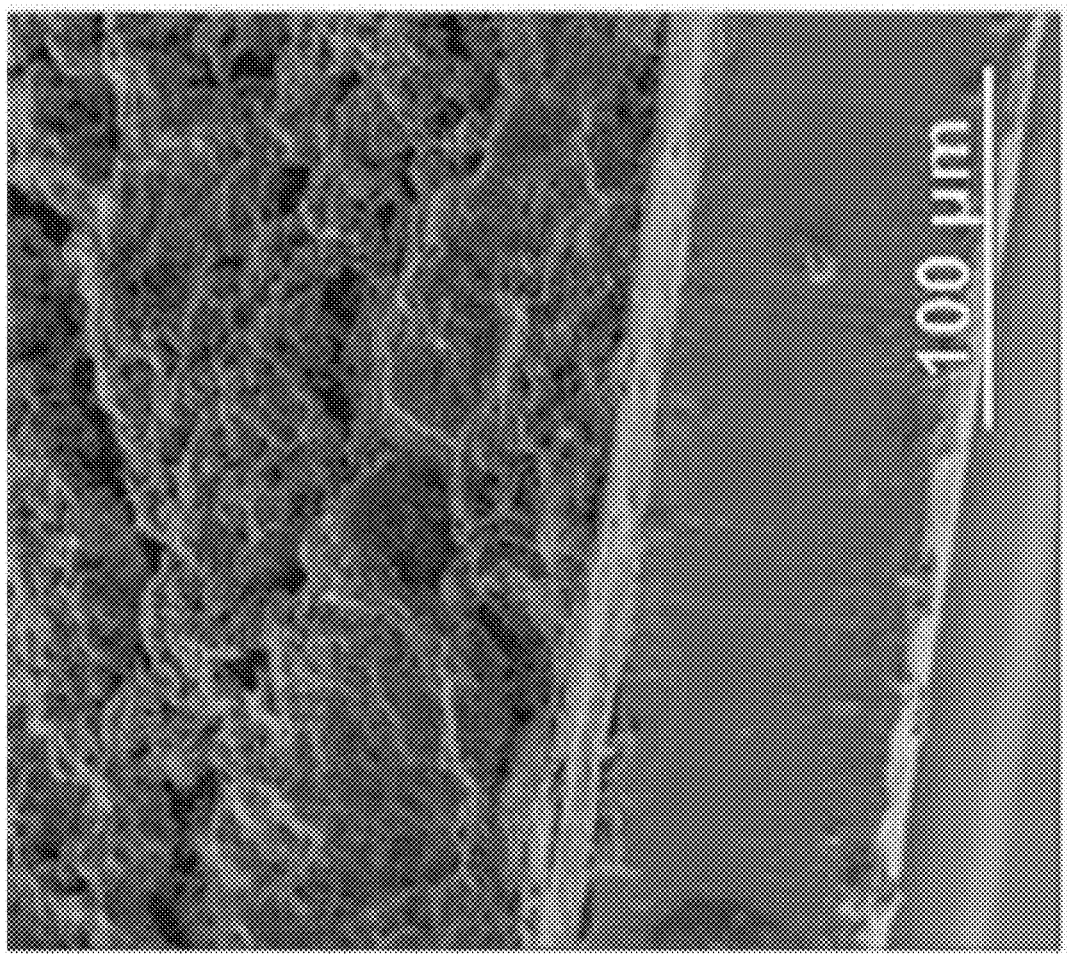
Figure 11C:
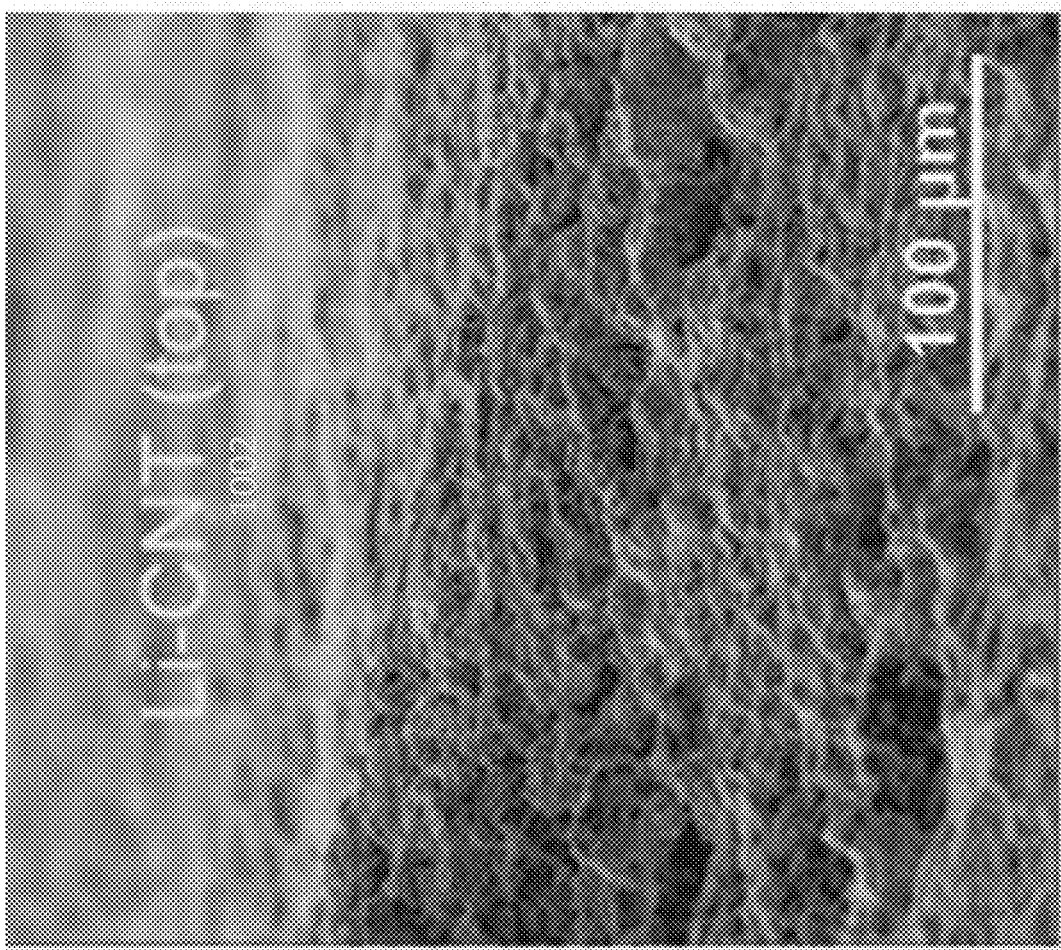
Figure 11D:
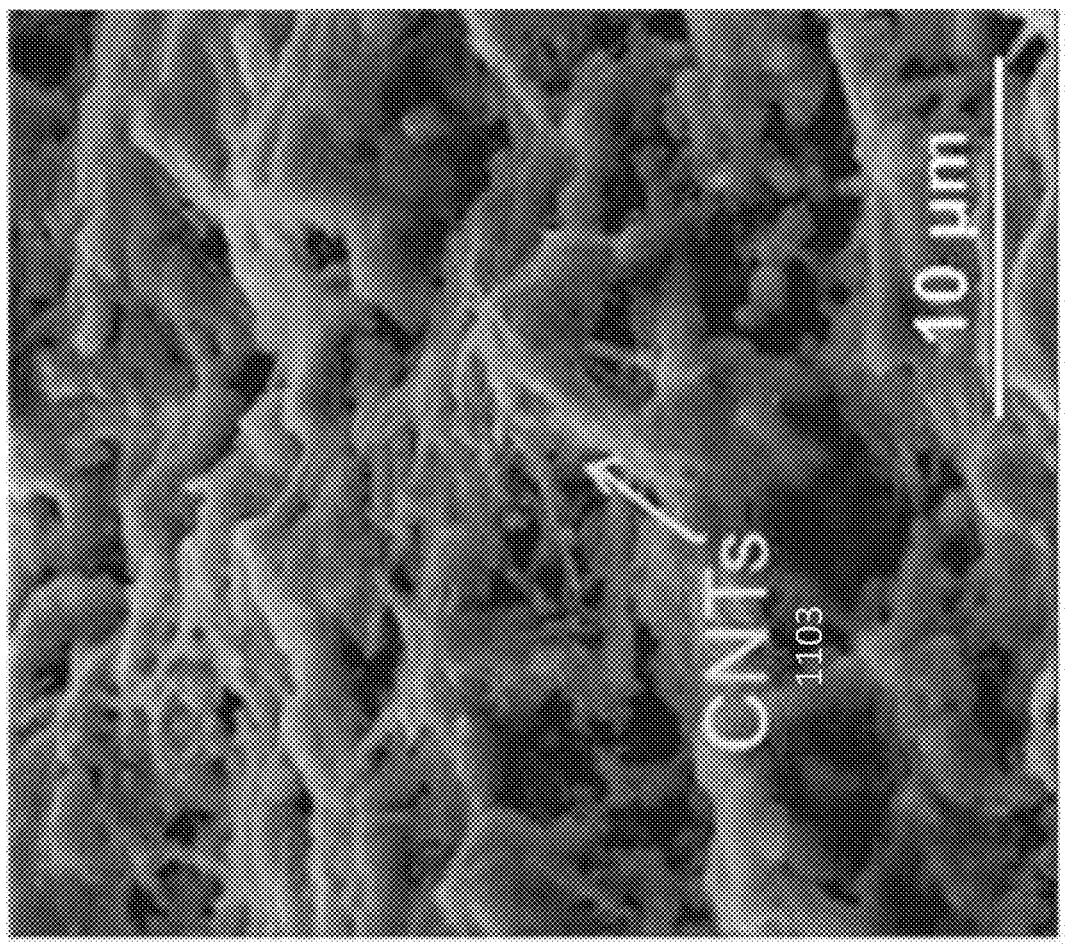
Figure 11E:
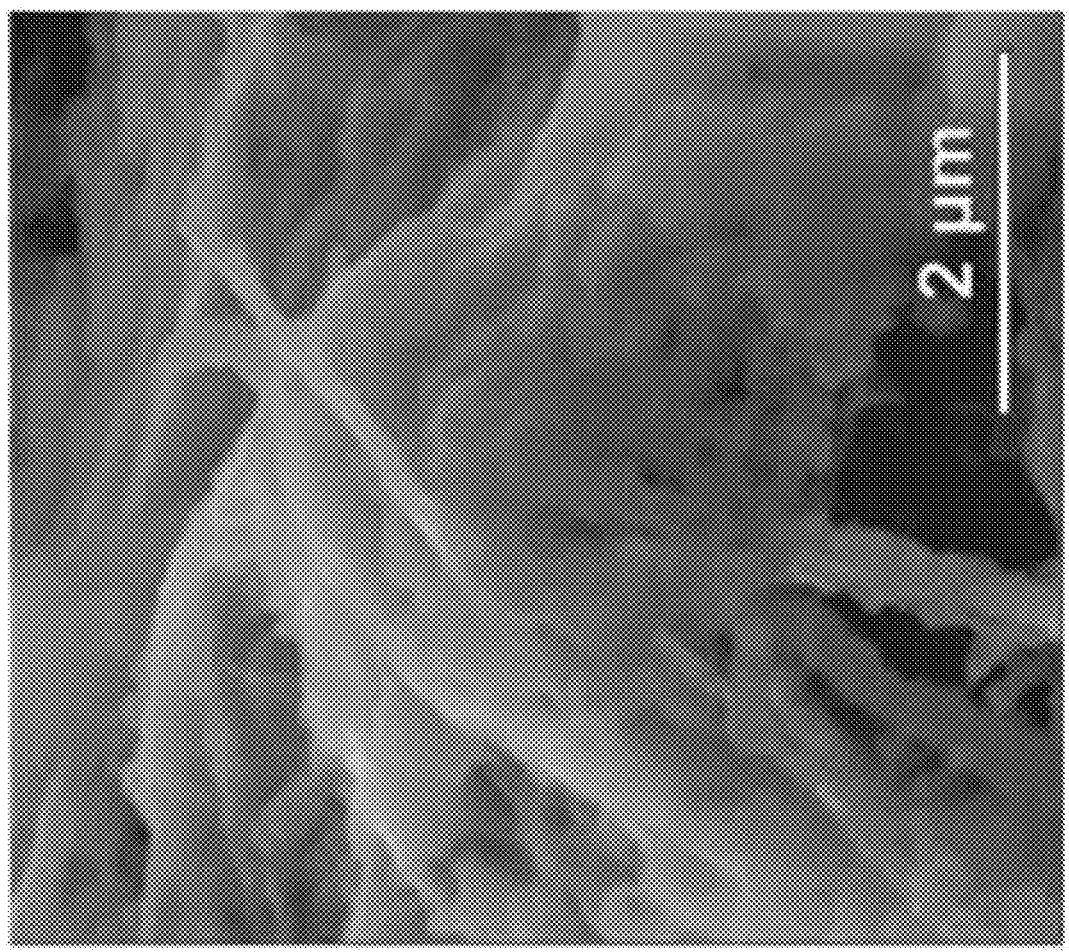

FIGS. 10A-10B are illustrations of a stainless steel substrate 1001 with a lithiated carbon nanotube film 1002 before and after, respectively, the plating of lithium. The lithiated carbon nanotube film 1002 (as illustrated in FIG. 10A) was plated with lithium at 4 mAh per cm$^2$ for a total of 8 mAh. FIGS. 11A-11E are SEM images showing the stainless steel substrate 1001 with the lithiated carbon nanotubes film 1002 after the plating of lithium at 4 mAh per cm$^2$ for a total of 8 mAh. FIG. 11A shows the stainless steel substrate. FIG. 11C shows a further magnified top of lithiated carbon nanotube film 1002. FIG. 11D shows a further magnified portion showing CNTs 1103. These indicated that, as shown in FIG. 10B, the plated Li metal 1003 was located mainly under the lithiated carbon nanotube film 1102.

In other embodiments of the present invention, a MWCNT mat can be positioned on the anode without lithium. Either electrochemically or by evaporation a Li layer can be applied atop the MWCNT layer, which can diffuse to the underside of the MWCNT layer. In some embodiments, the diffusion through the MWCNT layer can be facilitated by an initial or subsequent treatment with electrolyte.

In addition to the simple fabrication process, the present invention also has advantages over the prior art that include: Li dendrite suppression using mediated lithiation; mediation of Li deposition by the MWCNTs during the charge/discharge cycle; and creating an ion/electron conductive/protective layer that evenly distributes the Li metal deposition.

It should further be noted that, in extreme discharge, all of the lithium metal might end up in the lithiated carbon material, such that there is no remaining lithium metal (such as the lithium foil) under the lithium carbon material. Such lithiated carbon material (without any underlying lithium metal) can be utilized as an anode in the present invention.

Sulfurized Carbon Cathodes

Further embodiments of the present invention utilize sulfurized carbon cathodes. The cathodes can further include high concentrations of electrolytes. The cathodes can also further include additional additives, such as graphene nanoribbons (GNRs) (SC/GNR).

The cathodes can have a sulfur content of more than about 50 wt % (e.g., between about 47 and about 56 wt % of S in mass related to the mass of the electrode excluding the mass contribution of the current collector). The sulfur content in the cathodes can lack any elemental sulfur. The sulfur content in the cathodes can contain minimal amounts of elemental sulfur.

The cathodes can be associated with electrolyte concentrations of more than about 1 mol $L^{-1}$ (e.g., about 4 mol $L^{-1}$). The cathodes can be associated with various types of electrolytes. The electrolytes can include commercial electrolytes, such as lithium hexafluorphosphate in ethylene carbonate:diethyl carbonate ($LiPF_6$ in EC:DEC), lithium bis(fluorosulfonyl)imide in dimethoxyethane, and combinations thereof.

The cathodes can include various types of carbons additives as conductive fillers. For instance, in some embodiments, the additives can be carbon black, graphene, carbon nanotubes, graphene nanoribbons, among others.

The cathodes can be fabricated by various methods. For instance, in some embodiments, the cathodes of the present disclosure can be fabricated by heat treating elemental sulfur with a carbon source (e.g., PAN). In some embodiments, the heat treatment can also occur in the presence of additives, such as GNRs. In some embodiments, the heat treatment can occur at temperatures of more than about 100° C. (e.g., about 450° C. and higher). In more specific embodiments, the cathodes can be fabricated by slowly heat treating elemental sulfur, PAN and GNRs (such as at 450° C.) in a sealed container and an inert atmosphere. The final material can have about 55 wt % to about 60 wt % of S in mass. In some embodiments, the final material can be further heat treated with additional amount of elemental sulfur.

For example, a sulfurized carbon cathode can be prepared as follows: A powder can be prepared by grinding elemental sulfur, PAN (Sigma-Aldrich, 150000 molecular weight) and GNRs in the mass proportion of 55:11:1 for 10 minutes. The powder is then submitted to heat treatment in a sealed tube at 450° C. First, the powder is loaded into an alumina boat. The alumina boat is inserted in the tube and the tube is evacuated to remove air. Next, the tube is filled with argon until it reaches room pressure. At this point, the tube is sealed. The heating from room temperature (25° C.) to 450° C. proceeded at a rate of 5° C. $min^{-1}$. The heat treatment at 450° C. proceeded for 3-15 h and then the mixture was allowed to cool to room temperature.

If, for example, this sulfurized carbon cathode is to be included in a battery assembly, this can be further performed as follows: Electrodes can be prepared by 80 wt % of SC/GNR, 10 wt % carbon black (Black Pearl 2000) and 10 wt % PVDF (polyvinylidene fluoride) as binder, prepared as slurry. The slurry is coated over steel foil and dried under vacuum at 60° C. for 12 hours. Half-cells are assembled inside a glove box (oxygen and water level <2 ppm) as coin cells (2032) with Celgard K2045 as separator and Li foil as counter and reference electrode (two electrode configuration). The electrolyte can be 1 mol $L^{-1}$ $LiPF_6$ in EC:DEC or 4 mol $L^{-1}$ LiFSI in DME. The charge-discharge can be tested at 0.1 C (it was considered only the mass of sulfur to calculate the current density) with the voltage limits of 1 to 3 V (vs. Li/Li+).

The cathodes can have various advantageous properties. For instance, in some embodiments, the cathodes display very stable behavior during continuous charge/discharge cycles (i.e., minimal capacity loss over cycles) and compatibility in different electrolytes, in which a better performance (i.e., high capacity and stability) is observed in high concentration electrolytes. In more specific embodiments, the cathodes of the present disclosure are able to deliver a capacity of 704 mAh $g^{-1}$ using common commercial electrolytes (e.g., 1 mol $L^{-1}$ $LiPF_6$ in EC:DEC (lithium hexafluorphosphate in ethylene carbonate:diethyl carbonate)) and 1050 mAh $g^{-1}$ using high concentration electrolytes (e.g., 4 mol $L^{-1}$ lithium bis(fluorosulfonyl)imide in dimethoxyethane).

Furthermore, the carbon in the sulfurized carbon cathode can be part of a seamless hybrid of nanotubes grown from a graphene layer disclosed and taught in U.S. Pat. No. 9,455,094, issued Sep. 27, 2016, to Tour et al. ("the '094 Tour patent"). See also Appendix A, at p. 7 (discussing several commonly-owned patent applications, including U.S. Patent Appl. Serial No. 2014/0313636, which issued as the '094 Tour patent).

Figure 12:
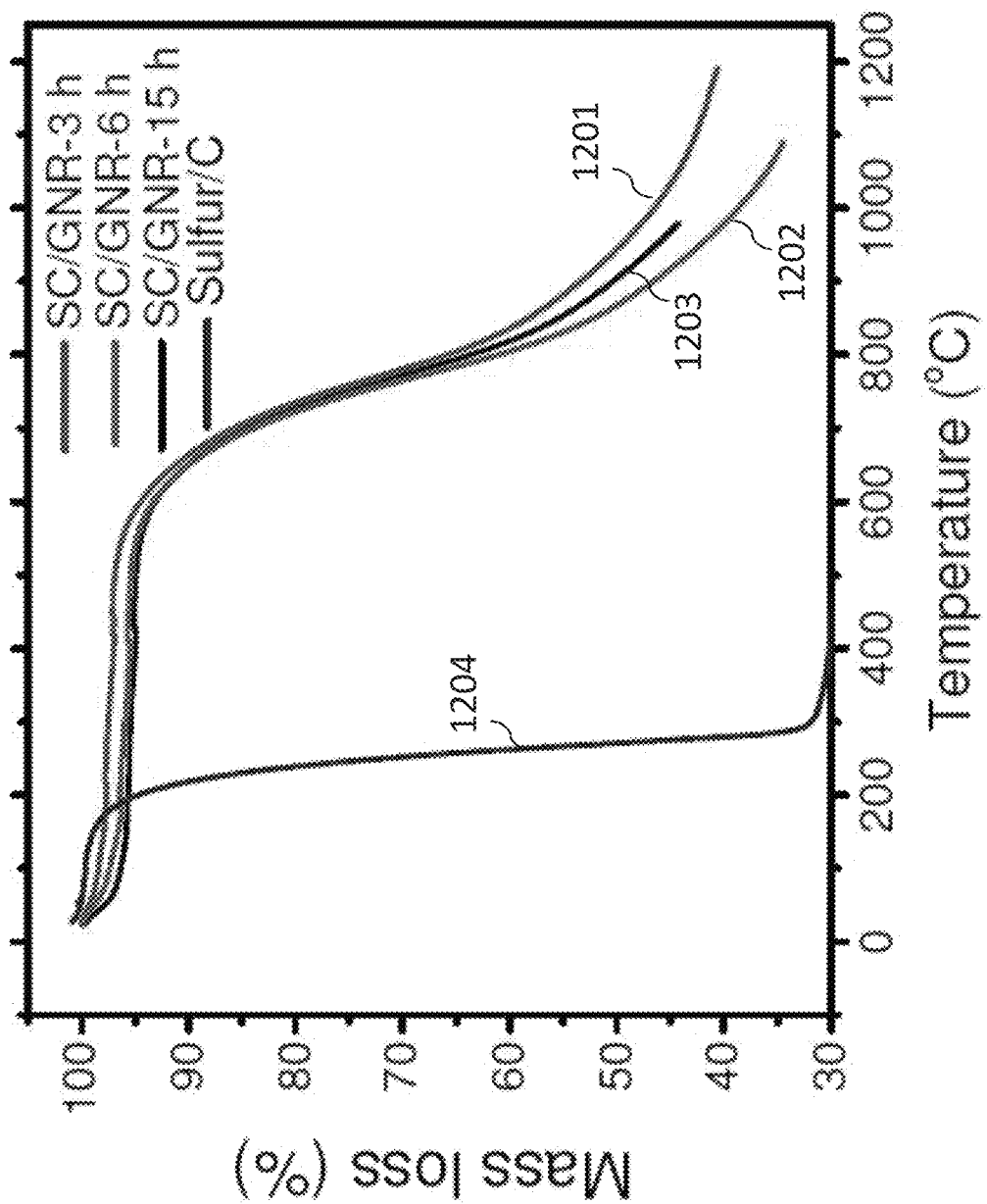
FIG. 12 is a graph showing thermogravimetric curves of SC/GNR treated at different times (3, 6 and 15 h) and an elemental sulfur/carbon (sulfur/C) cathode.

The produced GNR-containing cathodes (SC/GNRs) can act as efficient cathodes without the problems associated with typical elemental sulfur cathodes. The sulfur species in this cathode embodiment corresponds to 55% to 60% of the mass of the material, according to thermogravimetric (TG) curves (FIG. 12).

According to the literature, the sulfur in sulfurized carbon species are believed to be composed mainly by small sulfur chains ($S_2$—$S_3$) chemically bonded to the $sp^2$ carbon lattice produced by the decomposition of the PAN, therefore suppressing the Li polysulfide dissolution. The TG curves (curves 1201-1203) in FIG. 12 show that no elemental sulfur is present in the SC/GNR samples. The mass loss is observed after 700° C. (seen in curves 1201-1203), attributed to the bond breaking of C—S species. For comparison, a mixture of sulfur and carbon black (Black Pearls 2000) is presented in the same graph of FIG. 12 (in curve 1204) to show the mass loss attributed to elemental sulfur occurs at much lower temperature (i.e., ~300° C.).

The heat treating time of S, PAN and GNR was varied from 3 to 15 hours. The heating time does not significantly affect the amount of S in the SC/GNR according to FIG. 12 as long as it is not much faster than three hours or else sulfur can sublime out before it reacts with the PAN.

Figure 13:
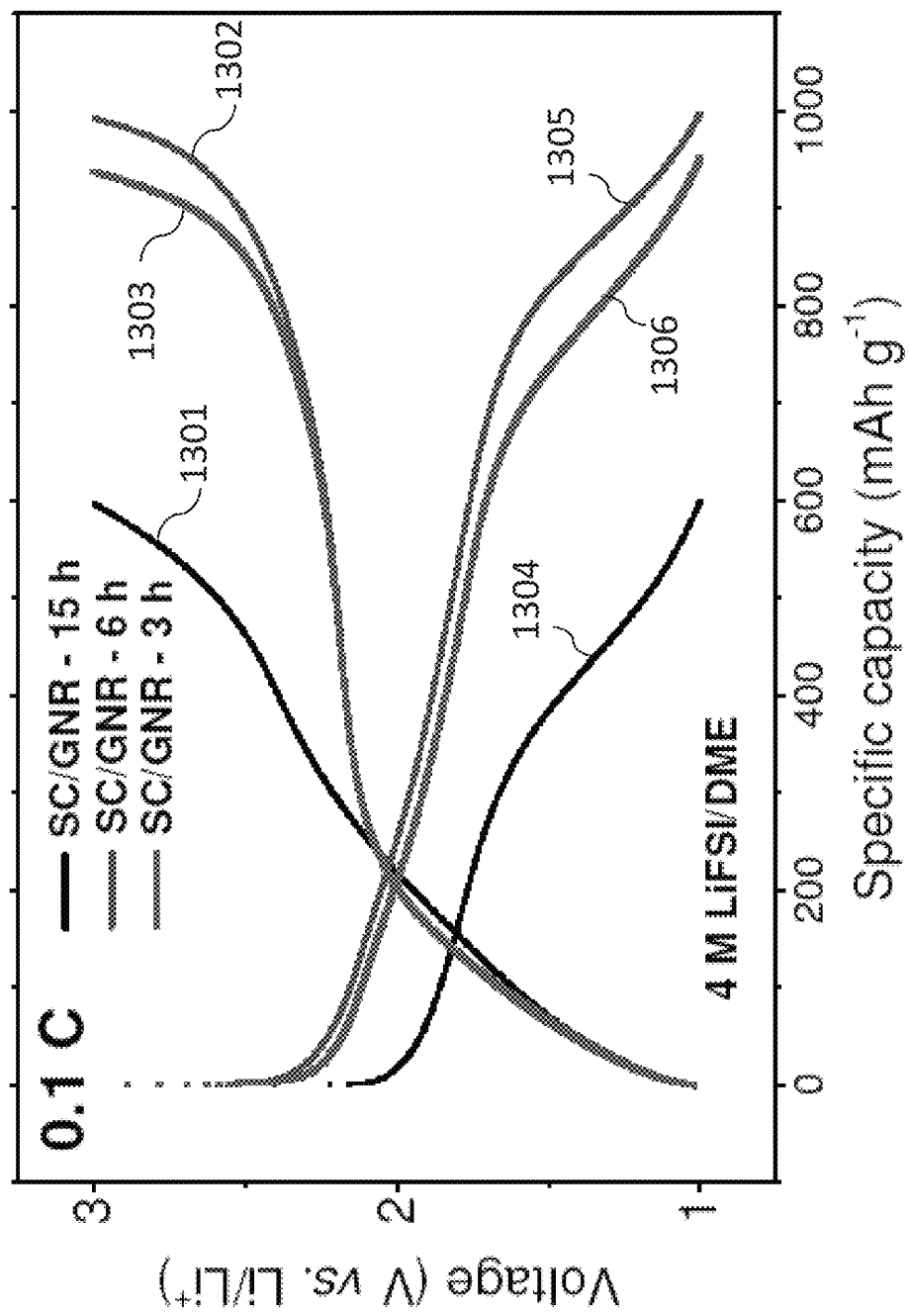
FIG. 13 is a graph showing galvanostatic charge/discharge curves of SC/GNR treated at different times (3, 6 and 15 h) using 4 mol L$^{-1}$ LiFSI in DME.

However, the capacity of half-cell batteries using SC/GNR cathodes produced with 3, 6 and 15 hour heat treatment time (SC/GNR-3 h, SC/GNR-6 h and SC/GNR-15 h) presented very different electrochemical behavior, as observed in FIG. 13. Curves 1301-1303 are the galvanostatic charge curves for SC/GNR-3 h, SC/GNR-6 h and SC/GNR- 15 h, respectively. Curves 1304-1306 are the galvanostatic discharge curves for SC/GNR-3 h, SC/GNR-6 h and SC/GNR-15 h, respectively.

Figures 14A, 14B:
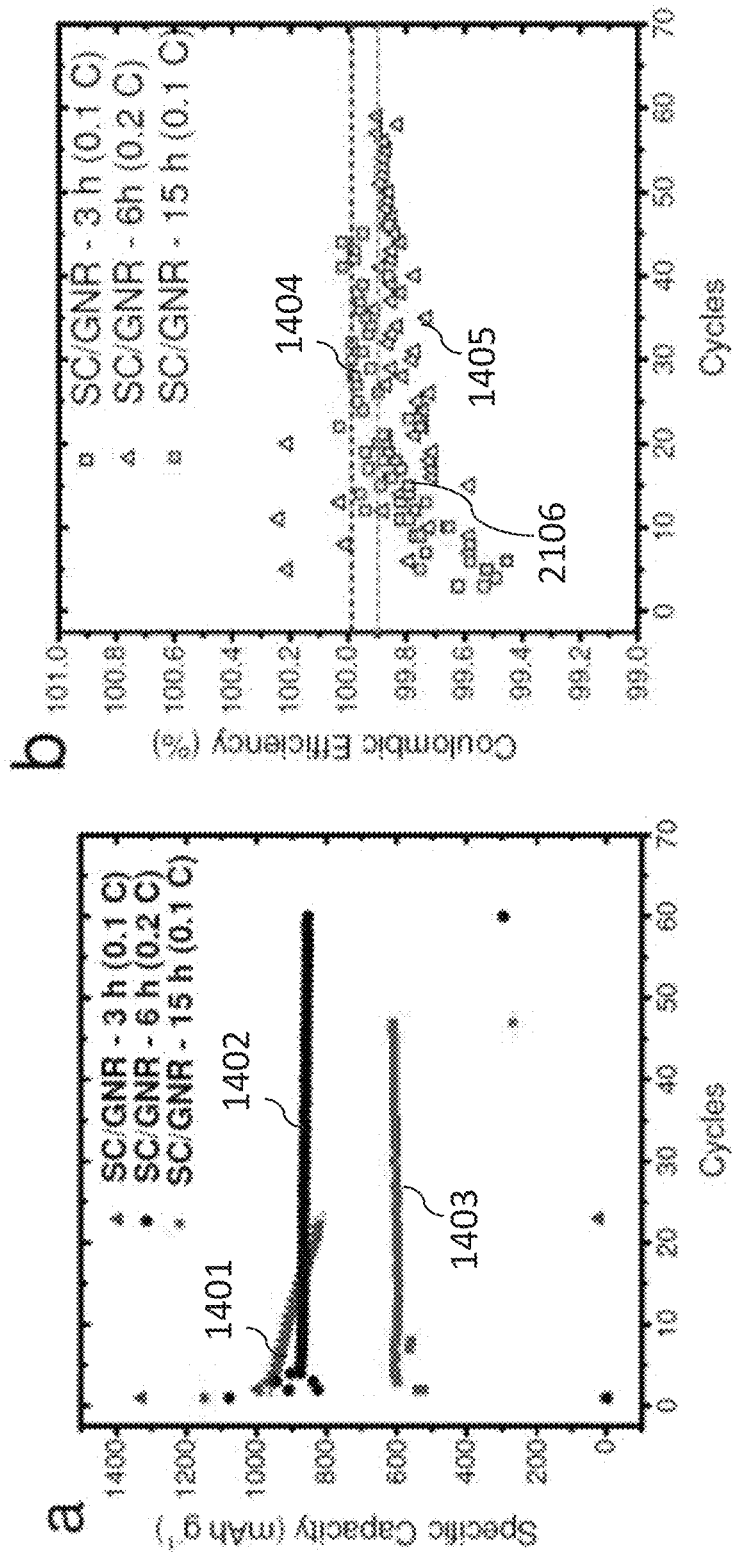
FIGS. 14A-14B are graphs showing cycling stability and coulombic efficiency, respectively, of SC/GNR-3 h, 6 h and 15 h using 4 mol L$^{-1}$ LiFSI in DME.

The tests were conducted in 4 mol L$^{-1}$ LiFSI (lithium bis(fluorosulfonyl)imide in DME (dimethoxyethane)) as electrolyte. The capacity of the sample SC/GNR-15 h is lower (~600 mAh g$^{-1}$) than the samples SC/GNR-3 h/6 h (~1000 mAh g$^{-1}$). The cycling stability and coulombic efficiency (CE) of these tests are presented in the graphs of FIGS. 14A-14B, respectively. The triangles 1401, circles 1402, and squares 1403 reflect the cycling stability of SC/GNR-3 h, SC/GNR-6 h and SC/GNR-15 h, respectively. The dark squares 1404, triangles 1405, and light squares 1406 reflect the coulombic efficiency of SC/GNR-3 h, SC/GNR-6 h and SC/GNR-15 h, respectively.

The samples SC/GNR-6 h and SC/GNR-15 h present stable behavior during continuous cycling compared to the sample SC/GNR-3 h. See FIG. 14A. This is expressed also in CE. See FIG. 14B. The SC/GNR samples present high CE, achieving 99.99% in SC/GNR—15 h and 99.9% in SC/GNR—6 h. The sample SC/GNR-6 h presented the best trade-off between stability and capacity for these samples.

Figure 15:
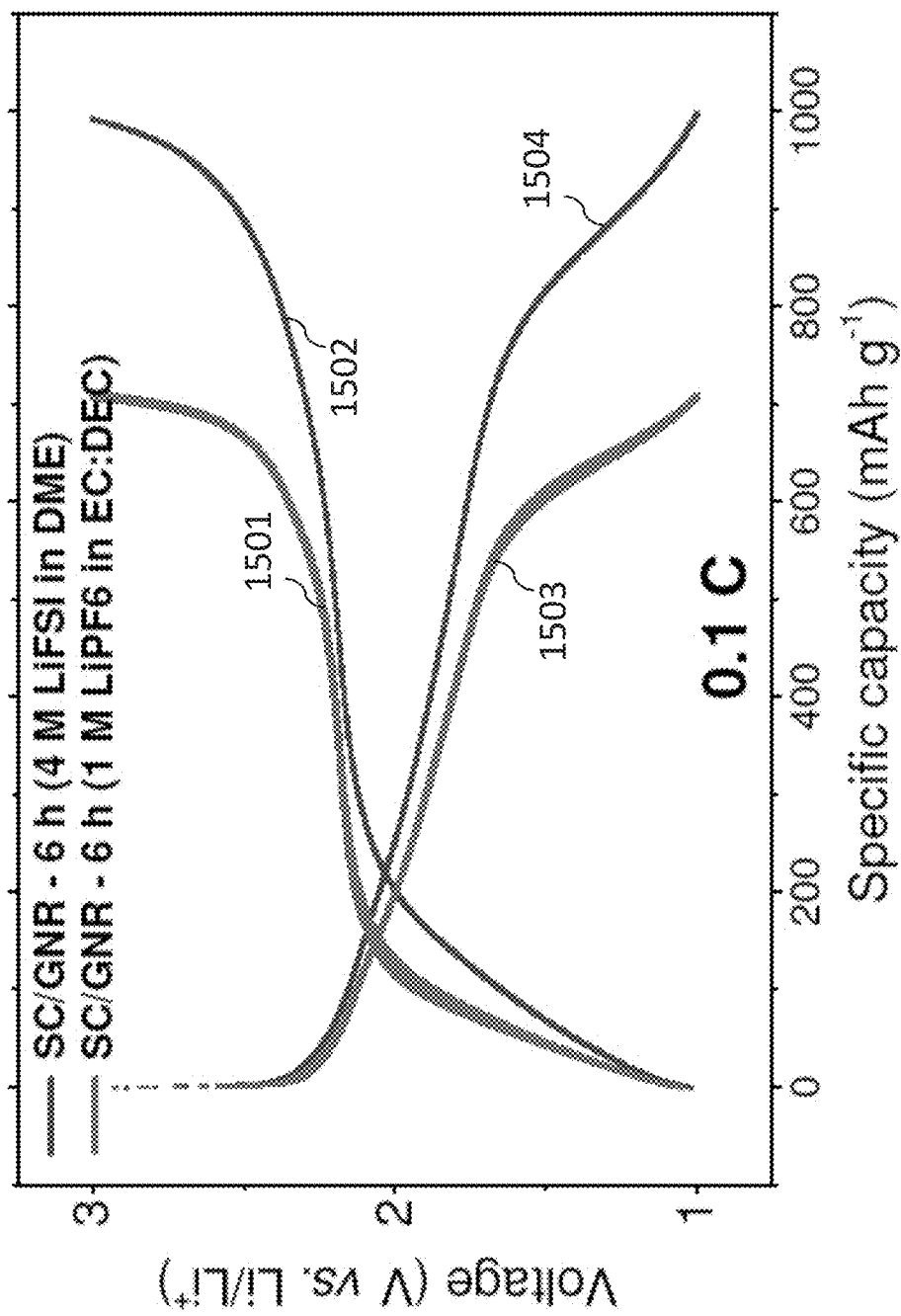
FIG. 15 is a graph showing galvanostatic charge/discharge curves SC/GNR-6 h tested in different electrolytes.

Using the sample SC/GNR-6 h, the compatibility of the cathode was tested in common commercial electrolytes composed by 1 mol L$^{-1}$ LiPF6 (lithium hexafluorphosphate) in EC:DEC (ethylene carbonate:diethylcarbonate) and the performance was compared with the high concentration electrolyte (4 mol L$^{-1}$ LiFSI in DME). See FIG. 15 (showing galvanostatic charge curves 1501-1502 for SC/GNR-6 h tested in electrolytes EC:DEC and DME, respectively, and further showing galvanostatic discharge charge curves 1503-1504 for SC/GNR-6 h tested in electrolytes EC:DEC and DME, respectively). The comparison demonstrates that this cathode material has a 42% higher capacity in the high concentrated electrolyte than the commercial electrolyte (~1000 mAh g$^{-1}$ compared to 700 mAh g$^{-1}$), tested at the same rate (0.1 C, in which 1 C=1675 mA g$^{-1}$). This underscored the advance of the high electrolyte concentrations.

Figure 16:
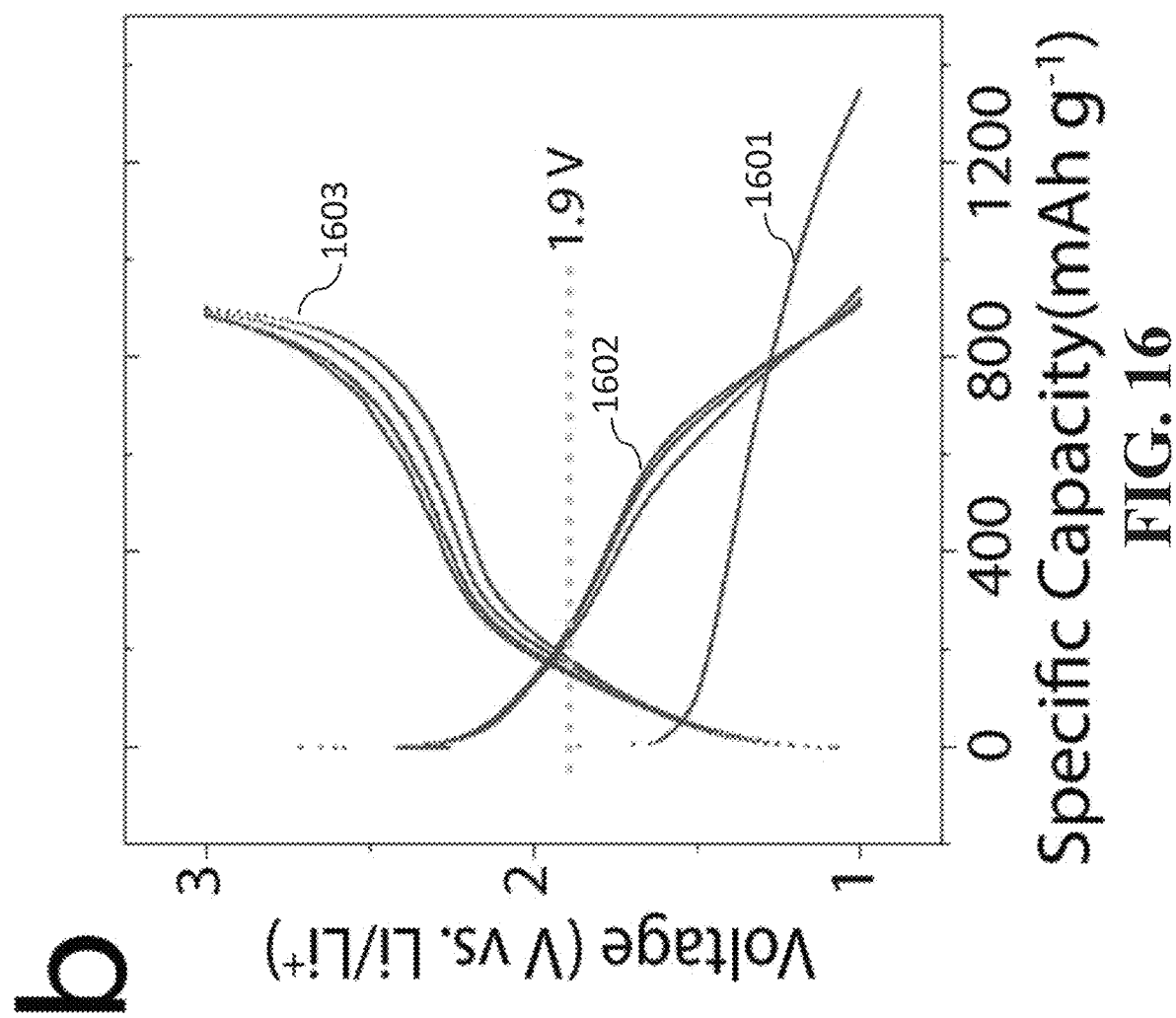
FIG. 16 is a graph showing galvanostatic charge/discharge curves (charge and discharge portions) of the discharge/charge cycle for a battery with (a) an anode having a Li foil/lithiated carbon film and (b) a sulfurized carbon cathode.

FIG. 16 is a graph showing discharge and charge portions of the discharge/charge cycle for a battery with (a) an anode having a Li foil/lithiated carbon film and (b) a sulfurized carbon cathode. The Li foil was extracted from a commercial Li metal primary battery (Energizer Ultimate Lithum®) and had a thickness of ~130 μm. The Li metal was paired with a sulfurized-carbon (SC) cathode in a 4 mol L$^{-1}$ LiFSI/DME electrolyte (lithium bis(fluorosulfonyl)imide salt in dimethoxyethane).

Curve 1601 is the discharge curve during the first cycle. Curves 1602 reflect subsequent discharge curves (going from ~3 volts to 1 volt with a specific capacity of ~800 mAh g$^{-1}$. Curves 1603 reflect subsequent charge curves (going from ~1 volt to 3 volts with a specific capacity of again around ~800 mAh g$^{-1}$. The same cathode and anode in this battery could also operate under other concentrations (0.5 M to 10 M), Li salts, and other electrolyte compositions.

Figure 17:
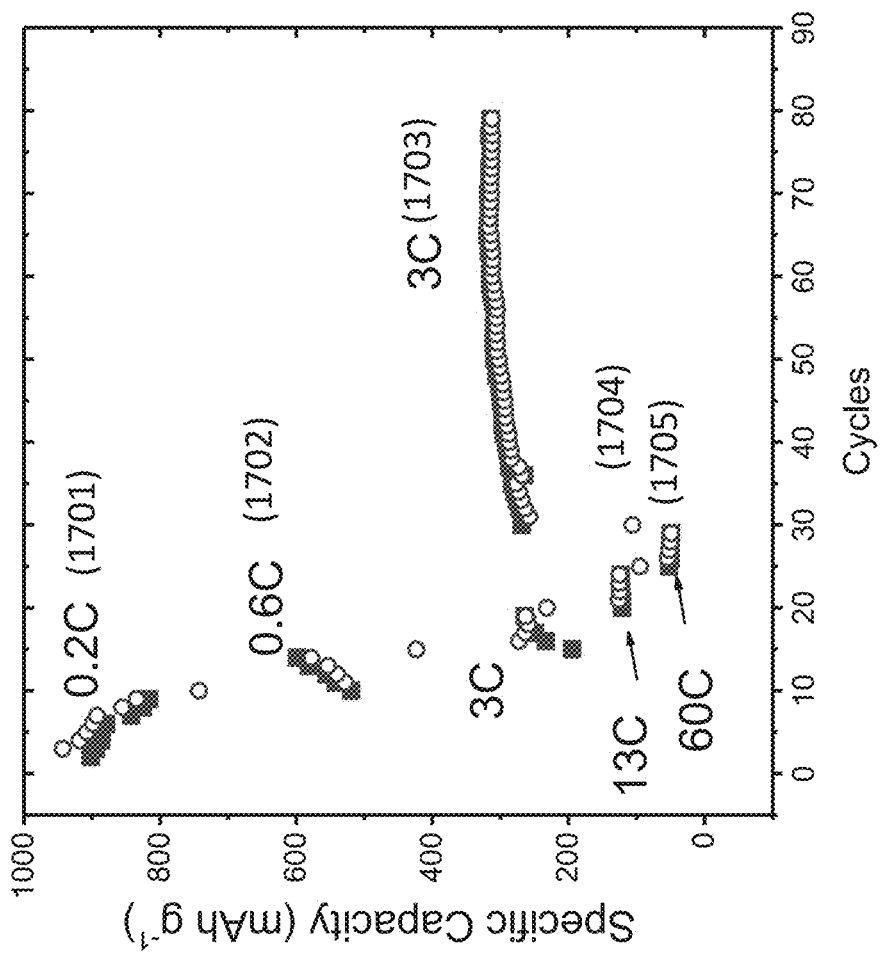
FIG. 17 is a graph showing a rate test of the battery utilized to generate the curves in FIG. 16 over different cycle rates.

FIG. 17 is a graph showing a rate test of the same battery utilized to generate the curves in FIG. 16 over different cycle rates. The curves 1701-1705 correspond to cycle rates of 0.2 C, 0.6 C, 3 C, 13 C, and 60 C, respectively, with 1 C representing a full charge over a one hour period. Accordingly, cycle rates 0.2 C, 0.6 C, 3 C, 13 C, and 60 C, correspond, respectively, to full charges over the following periods, 5 hours, 100 minutes, 20 minutes, around 4.6 minutes, and 1 minute. The open circles in the curves correspond to discharge rate for the cycle and the solid squares in the curves correspond to the charge rate for the cycle.

Sulfurized carbon cathodes have various utilities. For example, anodes and cathodes with high capacity and optimal rate performance are desired to compose batteries that have much higher energy density compared to the current technology. In some embodiments, the compatibility and optimal performance of sulfurized carbon cathodes with high concentration electrolytes make them compatible with high capacity and advanced anodes, such as Li metal anodes, allowing the possibility to replace both anodes.

Moreover, the methods of making the sulfurized carbon cathodes are facile, thereby allowing scalable production of the cathode. In some embodiments, the resulting material also has a high proportion of S (about 55 wt % to about 60 wt %) and N (12 wt %), which could be of interest in other catalytic applications.

Sulfurized carbon cathodes solve issues related to cathodes by using a formulation combination of sulfur covalently bound to carbon in the presence of high electrolyte concentration.

The sulfurized carbon cathodes complement the many developments in anodes, providing the other requisite half of the battery configuration. The sulfurized carbon cathodes demonstrate that covalent sulfur carbon species can afford a stable high capacity cathode if the electrolyte used is at much higher concentrations than typically disclosed by others in the literature.

In some embodiments, the use of such high concentrations of electrolytes along with sulfur-based cathodes produce enhanced effects.

In some embodiments, the sulfurized carbon cathodes can be used in conjunction with Applicants' monolithic seamless graphene-carbon nanotube hybrid electrodes (GCNTs) to afford optimal properties for GCNTs in cathodes as GCNT benefited anodes as formerly disclosed. [See e.g., Tour '052 application and Tour '636 application]. In some embodiments, the sulfurized carbon cathodes can also be used in conjunction with ultrahigh surface area carbons (e.g., uGil-900 made from asphalt and KOH activation) to afford optimal properties for asphalt-derived cathodes just as asphalt-derived carbons benefited anodes as formerly disclosed. [See, e.g., Tour PCT '950 application].

In some embodiments, the high concentration electrolyte for the sulfurized carbon cathodes resembles the electrolyte concentration and type that has been shown to work well for Li-GCNT anodes [e.g., Tour PCT '052 application] and Li-asphalt derived anodes [e.g., Tour PCT '950 application]. As such, in some embodiments, the sulfurized carbon cathodes complement the afore-mentioned systems, which are now permitted as both cathodes and anodes to work in unison, as required.

In some embodiments where GCNT electrodes are utilized, the sulfurized carbon cathodes could be fabricated by the methods of the present disclosure through the use of sulfur, PAN, and GCNT (with or without GNRs). In some embodiments where asphalt-derived electrodes are utilized, then the sulfurized carbon cathodes could be fabricated by using sulfur, PAN, and uGil-900 high surface area carbon from KOH activation of asphalt (with or without the GNRs).

In some embodiments, the inclusion of a small proportion of elemental S to the SC/GNR can increase the total capacity of the sulfurized carbon cathodes. In some embodiments, additives other than GNRs can be utilized. In some embodiments, the additives can include, without limitation, carbon nanotubes, graphene, carbon black, and combinations thereof. In some embodiments, mixtures of Se and S can be included during the preparation of sulfurized carbon. In some embodiments, use of GCNT with PAN and S can be efficacious with or without GNR additives. In some embodiments, ultrahigh surface area carbons such as uGil900 can be used in conjunction with PAN and S with or without GNRs. In some embodiments, the content of sulfur is about 55 wt % to about 60 wt %, making the overall content of S in the sulfurized carbon cathodes about 45 wt % to about 50 wt % (including the binder and carbon additives), which reduces the overall capacity of the cathode. In some embodiments, the voltage of discharge (~2 V) is less flat than an elemental sulfur cathode, even though it is much more stable.

GNR-Modified Separators

A separator is utilized to keep the cathode and anode electrically insulated from one another, but allows the transport of electrolyte and ions within. Standard separators are made from materials such as polypropylene (PP) and polyethylene (PE).

Figure 18:
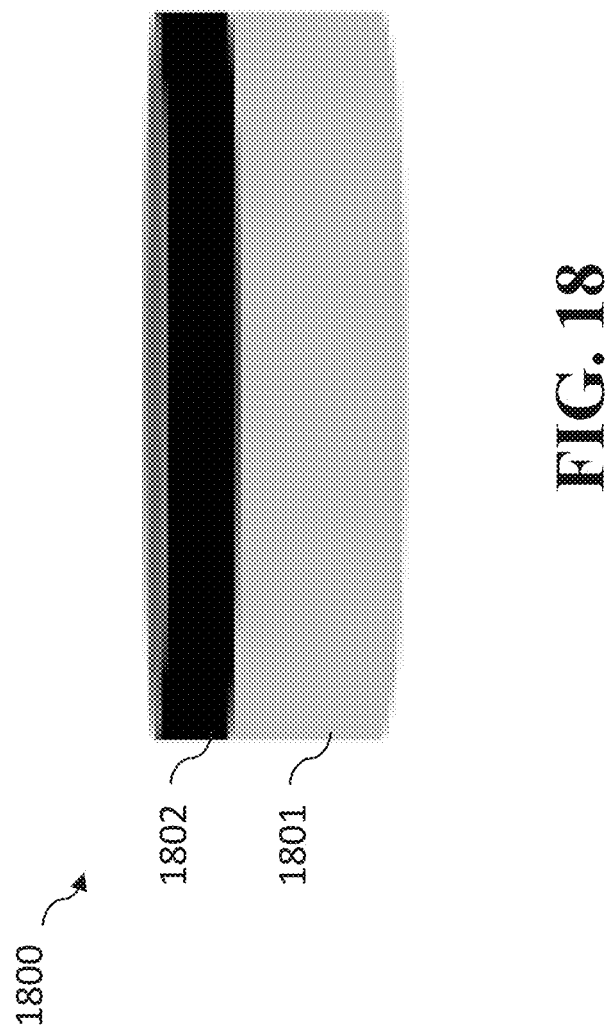
FIG. 18 is an illustration of a GNR-coated separator.
Figure 19:
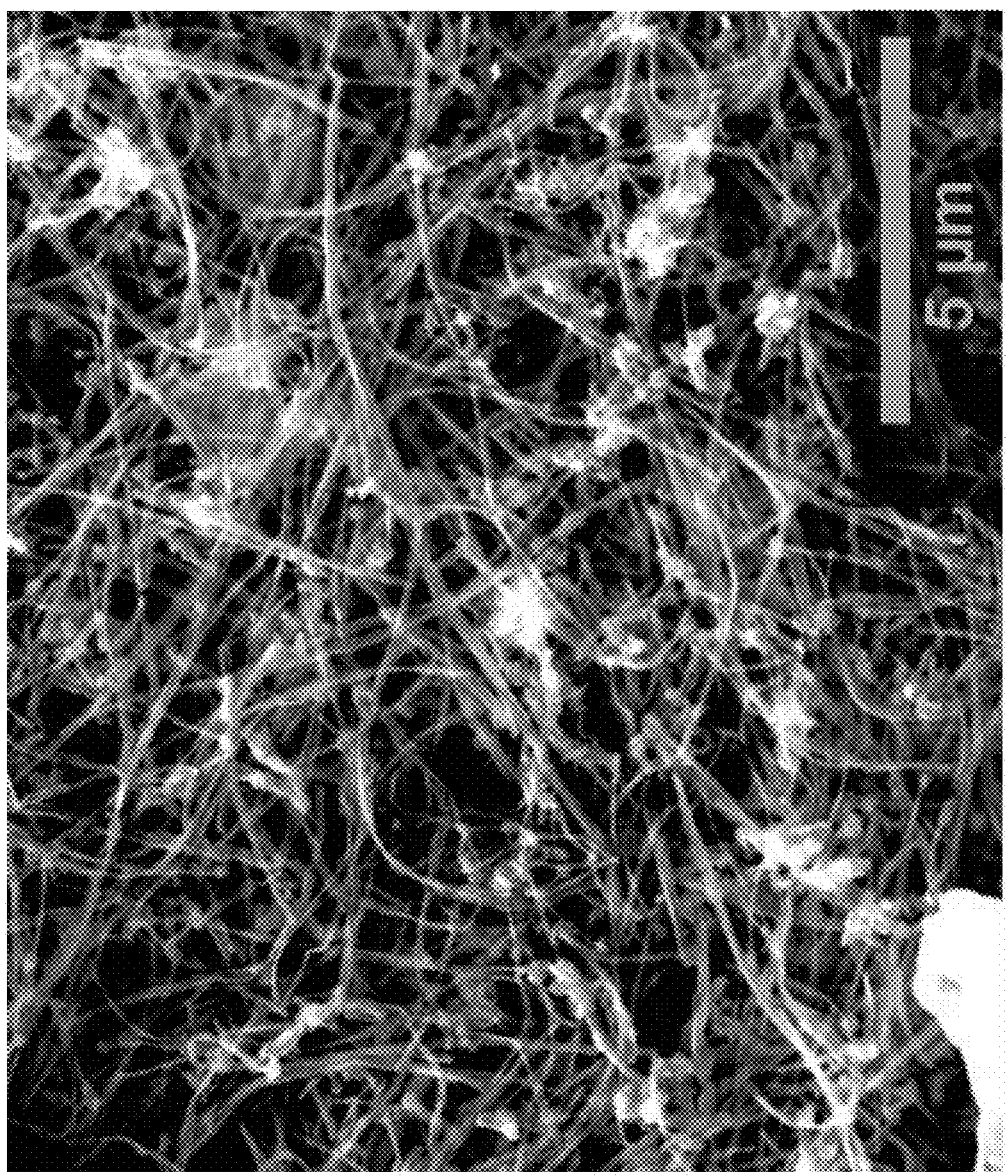
FIG. 19 is an SEM image of a GNR-coated separator.

The present invention can utilize a separator with a coating on one or both sides, which coating further selectively allows or blocks materials from moving from one side to the other (i.e., moving from the anode side to the cathode side or vice versa). As shown in FIG. 18, such a separator 1801 can be modified by adding a layer of graphene nanoribbons (GNRs) 1802 to yield a light-weight GNR-coated separator 1802. FIG. 19 is an SEM image of a GNR-coated separator. While the layer of graphene nanoribbons 1802 is illustrated on one side of the GNR-coated separator 1800, such layer can be provided on both sides. In some embodiments, the GNR-coated separator 1802 is oriented within the battery with a layer of the graphene nanoribbons facing the cathode, such as when the cathode is a sulfurized carbon cathode or an elemental sulfur based cathode.

The GNR-coated separator was fabricated as follows: Pristine GNR (AZ Electronic Materials) were dispersed in N-methyl-2-pyrrolidone (NMP) via 10 min of tip sonication. Then, the dispersion was vacuum-filtered through a Celgard separator and dried at 60° C. under vacuum for 12 h. This fabrication method makes possible large scale applications and can produce GNR-coated separators with different thicknesses by only changing the concentration of GNR in the dispersion.

Such a GNR-coated separator decreases the diffusion of unwanted materials from traversing from one side to the other side of the battery (such as lithium polysulfides from a sulfur-based cathode traversing through the separator to the anode). In addition, the electrical conductivity of GNR provides new electron pathways that reactivate the intercepted material, thus improving the capacity retention. This means that, because the GNRs are conductive, they can transfer electrons to the trapped species (lithium polysulfides and lithium sulfide). Had these intercepted materials not been reactivated, a severe agglomeration of $Li_2S$ after cycling would have been observed and the capacity retention would instead have been similar to the cell without a coated separator.

Figure 20:
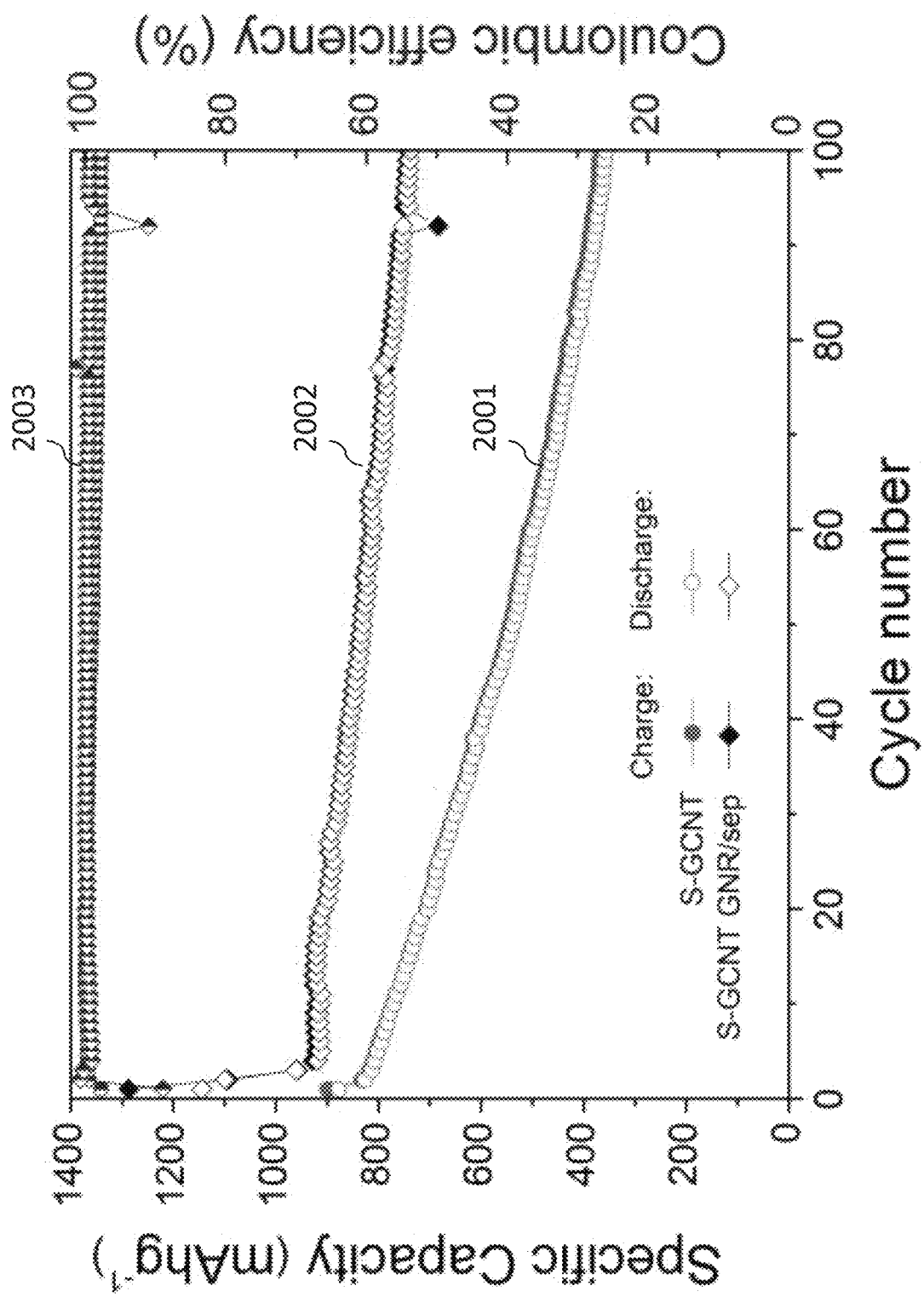
FIG. 20 is a graph that compares the cycling stability between a standard separator and a GNR-coated separator when utilizing an elemental sulfur based cathode.

FIG. 20 is a graph that compares the cycling stability between a standard separator (curve 2001 showing charge and discharge) and a GNR-coated separator (curve 2002 showing charge and discharge) when utilizing an elemental sulfur based cathode. Such curves show that after 100 cycles, the capacity using the standard separator has gone from around 800 to 400 mAh $g^{-1}$, while the capacity using the GNR-coated separator has gone from around 900 to 800 with a GNR-coated separator. Curves 2003 are the coulombic efficiency of both the standard and GNR-coated separators to reflect that these remained the same regardless of the separator utilized. Such graph of FIG. 20 thus showed an improved cycling stability with GNR-modified separators for elemental sulfur-based cathodes. The improved GNR-modified separator can likewise be used in the sulfurized-carbon (SC) cathode described above.

FIGS. 21A-21D are photographs taken at time 0 minutes, 30 minutes, 60 minutes, and 180 minutes, respectively, of a standard separator to show the diffusion of Li polysulfides over time. FIGS. 22A-22D are photographs taken at time 0 minutes, 30 minutes, 60 minutes, and 180 minutes, respectively, of a GNR coated separator to show the diffusion of Li polysulfides over time. At time zero (shown in FIGS. 21A and 22A), these reflect (a) on the left side 1702 of the apparatus a relatively clear fluid of LiTFSI (1 M) and $LiNO_3$ (0.16 M) in DME-DOL and (b) on the right side 1701 of the apparatus a relatively dark fluid of $Li_2S_6$ (1M), LiTFSI (1M) and $LiNO_3$ (0.16 M) in DME-DOL. The difference in these apparati is that the apparatus of FIGS. 21A-21D utilizes a standard (or un-modified) separator 2103, while the apparatus of FIGS. 22A-22D utilizes a GNR-modified separator 2203. As evident from (b) comparing FIG. 21B with FIG. 22B (both taken at time t=30 minutes), (c) comparing FIG. 21C with FIG. 22C (both taken at time t=60 minutes), and (d) comparing FIG. 21D with FIG. 22D (both taken at time t=180 minutes), the rate of diffusion was reduced for the apparatus having the GNR-modified separator (utilized in FIGS. 22A-22D).

By reducing the diffusion of such unwanted materials (such as sulfur or lithiated polysulfides) this better enables the use of such materials in the cathodes and anodes (such as sulfur based cathodes).

Batteries

Batteries can be utilized that utilize one or more of the improved anodes, cathodes, and separators and their modifications described herein. In some embodiments, the battery includes an anode having a lithiated carbon film, a sulfurized carbon cathode, and a GNR-modified separator. In other embodiments, the battery has just two of the three being complemented by other standard/commercial component when needed (i.e., an anode having a lithiated carbon film and a sulfurized carbon cathode; an anode having a lithiated carbon film and a GNR-modified separator; or a sulfurized carbon cathode and a GNR-modified separator. In still other embodiments, the battery has only one of the three (an anode having a lithiated carbon film, a sulfurized carbon cathode, and a GNR-modified separator).

FB with GCNT-Li Anode and Sulfurized Carbon Cathode

A full battery (FB) was assembled by combining a GCNT-Li anode [Zhu 2012; Lin 2015] with a sulfurized carbon cathode.

For the graphene-carbon nanotube preparation, the preparation of GCNT was similar to the previously reported methods. [Zhu 2012; Lin 2015]. First, Bernal-stacked multilayer graphene was grown on copper foil (25 μm) using the CVD method as reported elsewhere. [Sun 2012]. The catalysts for CNT growth are deposited by e-beam evaporation over the graphene/Cu foil in the order graphene/Fe (1 nm)/$Al_2O_3$ (3 nm). The CNT growth was conducted under reduced pressure using a water-assisted CVD method at 750° C. First, the catalyst is activated by using atomic hydrogen (H·) generated in situ by $H_2$ decomposition on the surface of a hot filament (0.25 mm W wire, 10 A, 30 W) for 30 s, under 25 Torr (210 sccm $H_2$, 2 sccm $C_2H_2$ and water vapor generated by bubbling 200 sccm of $H_2$ through ultrapure water). After the activation of the catalyst for 30 s, the pressure is reduced to 8.3 Torr and the growth is carried out for 15 min.

For the electrochemical plating/stripping of Li into/from GCNT, the electrochemical reaction was performed in 2032 coin-type cells using GCNT substrates and Li foil as both counter and reference electrodes. The GCNT substrates are circular with total area of ~2 cm$^2$. The electrolyte used was 4 M lithium bis(fluorosulfonyl)imide (LiFSI) (Oakwood Inc.) in 1,2-dimethoxyethane (DME). The LiFSI salt is vacuum-dried (<20 Torr) at 100° C. for 24 h, and DME was distilled over Na strips. The GCNT substrate was prelithiated by putting one drop of electrolyte on the surface of GCNT, pressing a Li coin gently against the GCNT and leaving it with the Li coin on top for 3 h. Adding excessive amounts of the electrolyte solution during the pretreatment was found to yield ineffective prelithiation due to poor contact between the GCNT and the Li. After the prelithiation, the GCNT was assembled in a coin cell using the same Li chip used in the prelithiation.

For the sulfurized carbon cathode preparation, the sulfurized carbon cathode was prepared by the decomposition of polyacrylonitrile (PAN) (Sigma-Aldrich, Mw 150 k) in the presence of excess elemental sulfur. PAN, S, and graphene nanoribbons (GNRs) (EMD-Merck) in the mass ratio of 55:11:1 were ground together using a mortar and pestle. (The GNRs improved the conductivity of the final material). The resulting powder is heated from room temperature to 450° C. at a rate of 5° C. min$^{-1}$ in an argon atmosphere (1 atm). After 6 h, the sulfurized carbon powder was removed and used without purification. The sulfurized carbon powder had approximately 60 wt % S. The sulfurized carbon cathodes were prepared by mixing the SC powder with carbon black (Black Pearls 2000, Cabot Corp.) and polyvinylidene fluoride (PVDF, Sigma-Aldrich) in a mass proportion of 8:1:1, resulting in a total S content in the electrode of 48 wt %. Typical mass loading was 4-5 mg in 1 cm$^2$ electrodes.

For the full battery assembly, the FB was assembled by combining the GCNT-Li and sulfurized carbon cathode using a 4 M LiFSI/DME electrolyte and Celgard K2045 as separator. The electrodes were ~1 cm$^2$. The areal capacity of the GCNT-Li was set to match the 30% irreversible capacity loss of the first cycle of the sulfurized carbon cathode.

By this assembly, a FB can be obtained that matching the dendrite-free GCNT-Li anode with a sulfurized carbon cathode with S content of ~60 wt %. The S content in the cathode was reduced to 48 wt % with the addition of binder and carbon additives. Cathodes based on sulfurized carbon have advantages over elemental sulfur ($S_8$) cathodes, such as high compatibility with different electrolytes and absence of Li polysulfide diffusion [Wei 2015]; the latter generally leads to capacity fading over cycling in elemental sulfur cathodes. [Yang 2013].

Figure 22A:
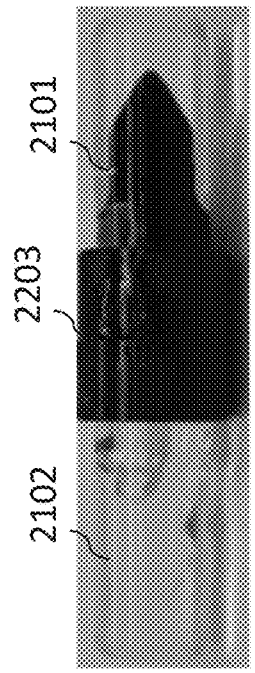
FIGS. 22A-22D are photographs taken at time 0 minutes, 30 minutes, 60 minutes, and 180 minutes, respectively, of a GNR coated separator to show the diffusion of Li polysulfides over time.
Figure 22B:
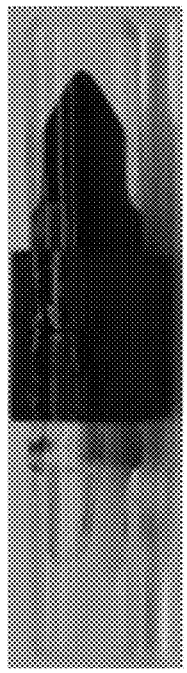
Figure 23B:
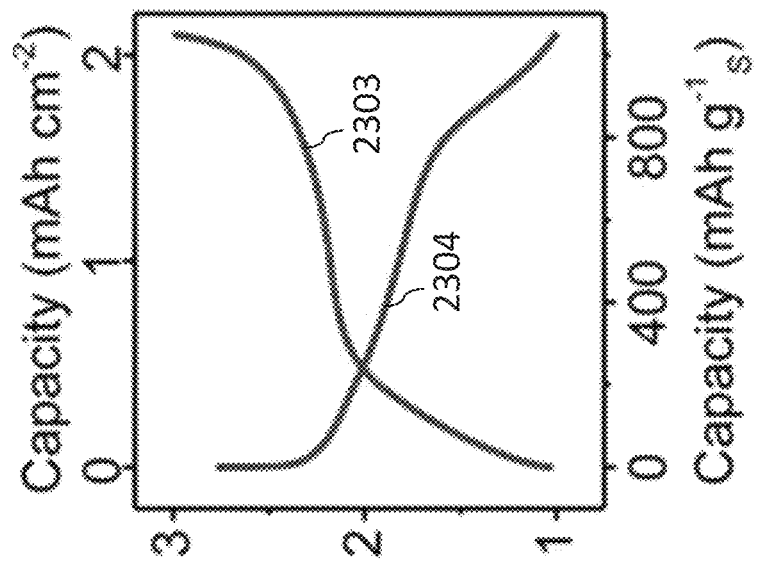
Figure 23A:
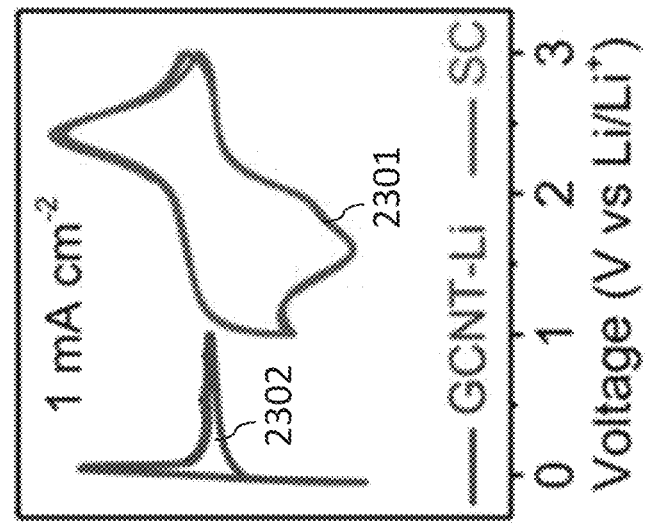
Figure 23C:
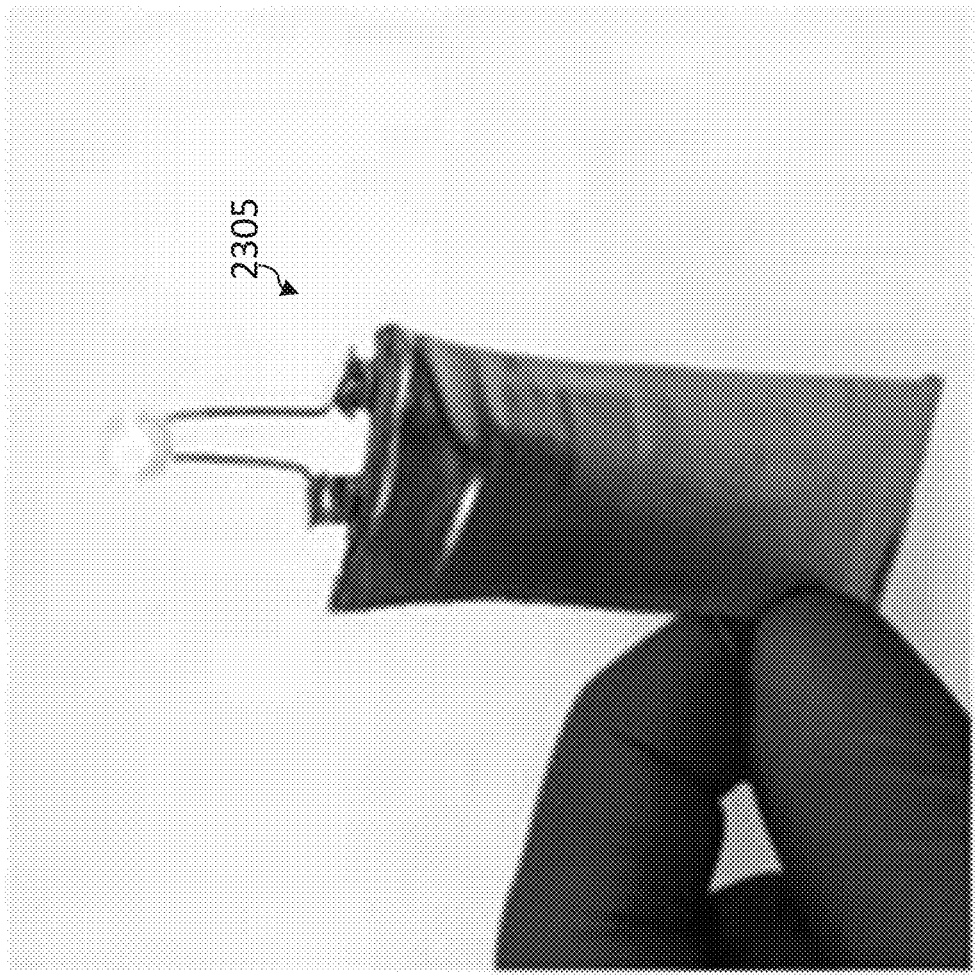

FIG. 23A shows the cyclic voltammograms (CVs) of the GCNT-Li and the a sulfurized carbon cathode (third cycle) half-cells, each with total areal capacity of ~2 mAh cm$^{-2}$. The first cycle of the a sulfurized carbon cathode half-cell (curve 2301) has a CE of 83%, and the first cycle of the GCNT-Li anode half-cell (curve 2302) has an average CE of 85%, both requiring a small excess of Li from the anode in the FB. The galvanostatic charge/discharge curves (curves 2303-2304, respectively) of the FB in FIG. 22B shows that the discharge curve 2304 extends from 2.1 to 1.7 V. The specific capacity based on S mass is very close to that observed in the half-cells.

Figure 22C:
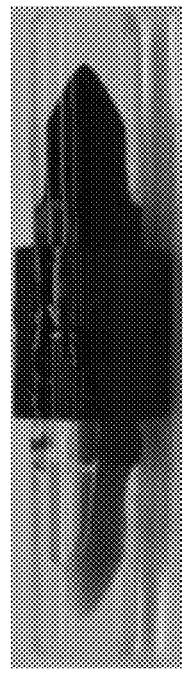
Figure 22D:
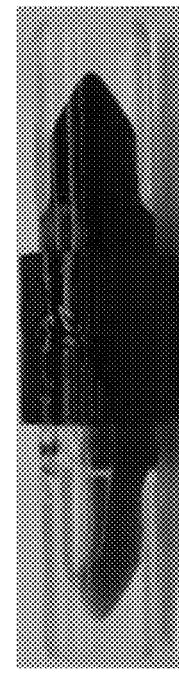
Figure 21A:
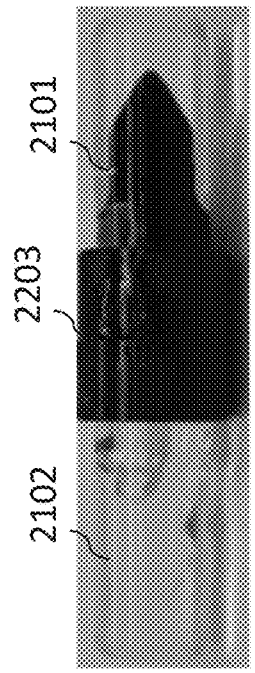
FIGS. 21A-21D are photographs taken at time 0 minutes, 30 minutes, 60 minutes, and 180 minutes, respectively, of a standard separator to show the diffusion of Li polysulfides over time.
Figure 21B:
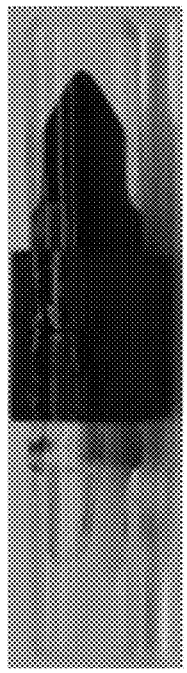
Figure 21C:
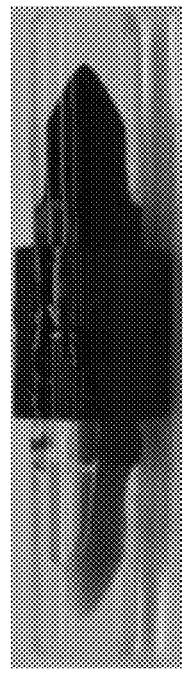
Figure 21D:
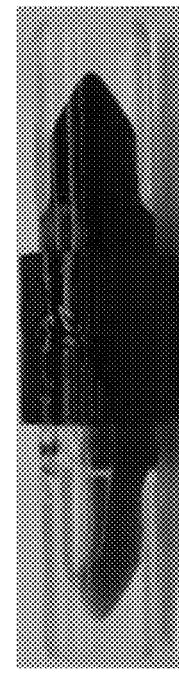

A pouch FB 2305 based on GCNT-Li/SC is shown in FIG. 22C. The FB can be cycled continuously at different rates (1 C=1/discharge time, h) from 0.2 to 9 C (curves 2306-2310, respectively). A cycle stability over 500 cycles is obtained at 1 C with µ80% capacity retention (curve 2311) and CE close to 99.9% (curve 2313 in inset 2312).

As shown in FIG. 22E, the self-discharge (SD) was also tested in the FB, in which a stable voltage of 2.15 V can be achieved even after 1 week (curve 2315). (Curve 2314 is the voltage for the first 8 h). A capacity retention of 94% and 81% is measured after 8 h and 1 week of SD, respectively (shown in curves 2316-2317 of inset FIG. 2318). Finally, the Ragone plot is calculated and presented in the FIG. 23F for a range of energy and power densities (curves 2319-2320 for FB (active materials) and FB (full electrode), respectively).

At the lowest power density, the energy density of the GCNT-Li/SC full-cell is 1423 Wh kg$^{-1}_{active\ materials}$ (752 Wh kg$^{-1}_{total\ electrodes}$), where active materials=Li+S only and total electrodes=GCNT-Li+sulfurized carbon+carbon additives+binder. This is 3× higher energy density than that seen in Li—S full-cells with respect to the mass of active materials (Li—S). [Jin 2016]. Moreover, the data appear attractive when compared to commercial LIB performances with 310 Wh kg$^{-1}_{active\ materials}$ (220 Wh kg$^{-1\ total\ electrodes}$) [Zhang 2006], where active materials=graphite+LiCoO$_2$; total electrodes=graphite+LiCoO$_2$+carbon additives+binder.

However, a definitive comparison with a commercial cell is difficult at this stage because commercial cells are dual-sided and stacked, designed to minimize the contribution of current collectors and packaging materials.

In a non-optimized device, a volumetric energy density of 234 Wh/L$_{total\ electrodes}$ was achieved. There is no dendritic or mossy Li in the full-cell electrodes after 500 cycles. These results represent a significant achievement for a Li polysulfide- and dendrite-free battery.

The present invention thus achieves superior energy density due to the near theoretical Li storage capacity and serves as the basis for the demonstrated sulfurized carbon||GCNT-Li full-cell in a high concentration electrolyte to produce a safe, stable, and high-performance battery.

FB with Li-MWCNT Anode and Sulfurized Carbon Cathode

A full battery (FB) was assembled by combining a Li-MWCNT anode with a sulfurized carbon cathode.

For the MWCNT film preparation, free standing carbon nanotubes films were prepared by dispersing MWCNTs (NTL, C-grade, 70-80 nm diameter) in N-methylpyrrolidone (NMP). The MWCNTs were used as received without further purification. MWCNTs (68 mg) were dispersed in NMP (250 mL) using tip sonication; the as prepared dispersion was vacuum filtered through a porous Al membrane (9 cm dia). The MWCNTs were trapped on the surface forming a MWCNT film. This resulting film was rinsed with methanol and dried overnight at 70° C. The Al film was later dissolved using an aqueous etching solution of HF (2.5 v/v %) and HCl (2.5 v/v %) at room temperature. After the Al was completely dissolved, the MWCNT film was removed from the solution, rinsed with water and ethanol, and dried overnight at 70° C. The porous Al membrane was previously prepared by etching commercial Al foil (60 µm thickness, Fisher Scientific Inc.) in the aqueous etching solution mentioned above for approximately 10 min.

For the lithiated-MWCNT preparation, Li metal foils from MTI Corporation (1.6 cm diameter chips, 230 µm thickness) were used or they were extracted from an Ultimate Lithium AA battery-Duracell Inc. (25×3.5 cm, 130 µm thick). The Li foils were cleaned before their use by scraping the surface until a shiny metallic surface appeared. The lithiated MWCNT film (Li-MWCNT) was produced by placing the MWCNT film between two Li foils wetted by 50

µL of 4 M lithium bis(fluorosulfonyl)imide (LiFSI) in dimethoxyethane (DME). The lithiation process took approximately 10 min and it could be visualized by the reddish color acquired by the CNT film.

For the sulfurized carbon preparation, The sulfurized carbon powder was prepared by grinding polyacrylonitrile (PAN) (Sigma-Aldrich, Mw 150 k), elemental sulfur (Ss) and graphene nanoribbons (GNRs, EMD-Merck) in a mass ratio of 55:11:1 (S:PAN:GNR, respectively). The mixture was heated at 450° C. for 6 h under argon atmosphere (1 atm), at a heating rate of 5° C. $min^{-2}$. After the heat treatment, the resulting sulfurized carbon powder was used without further purification. A content of ~60 wt % S was measured in the sulfurized carbon powder by thermogravimetric analysis (TGA). The cathode slurry was prepared by mixing the SC, carbon black (Black Pearls 2000, Cabot Corp.) and polyvinylidene fluoride (PVDF, Sigma Aldrich) in a mass ratio of 8:1:1 in NMP. The slurry was used to coat stainless steel foils (30 µm thick, 40 mg $cm^{-2}$) or carbon-coated Al foils (10 µm, 5.5 mg $cm^{-2}$, MTI Corp.). The typical mass loading of sulfurized carbon cathodes was 3-5 mg per $cm^{-2}$, with a final S content of 47 wt % to 57 wt %.

Figure 24A:
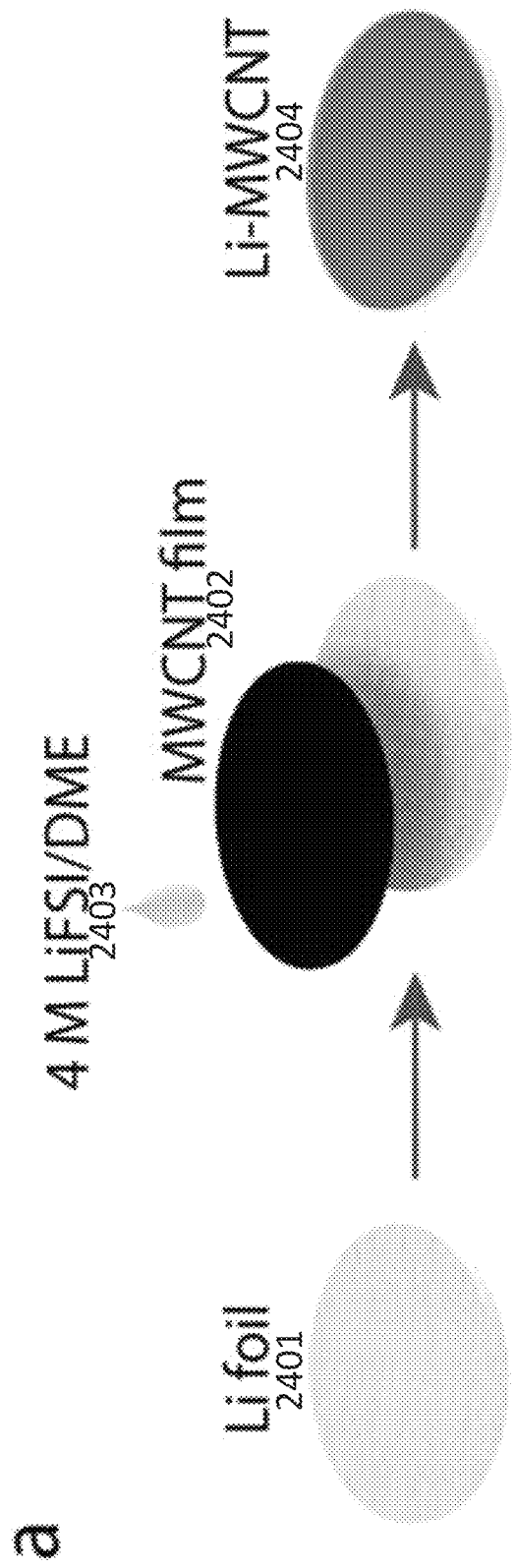
FIGS. 24A-24C are schematics and an image of the fabrication of an electrode composed of a Li metal coated with a Li-doped MWCNT film (Li-MWCNT).
Figure 24C:
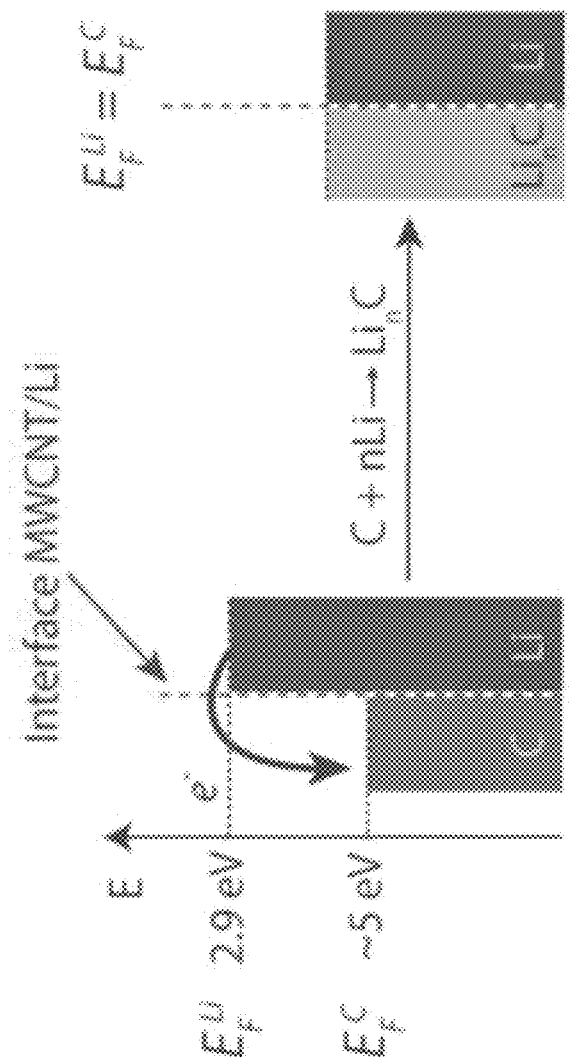
Figure 24B:

FIG. 24A shows the fabrication process of the Li-MWCNT electrode 2404 includes wetting the MWCNT film 2402 with high a high concentrated electrolyte 2403 and pressing it against the Li foil 2401 to dope the carbon nanotubes. The thin film of MWCNTs acquired a red color after the lithiation reaction. The red color is attributed to the Li-doped MWCNTs. Reaction took at least 10 min to complete. The red color was only observable with a high concentration of electrolyte. Such Li foil modification is scalable. Li-doped MWCNT act as protective layer for the Li foil. Li-doped MWCNT act as an enhanced solid electrolyte interphase (SEI) layer.

Figure 28A:
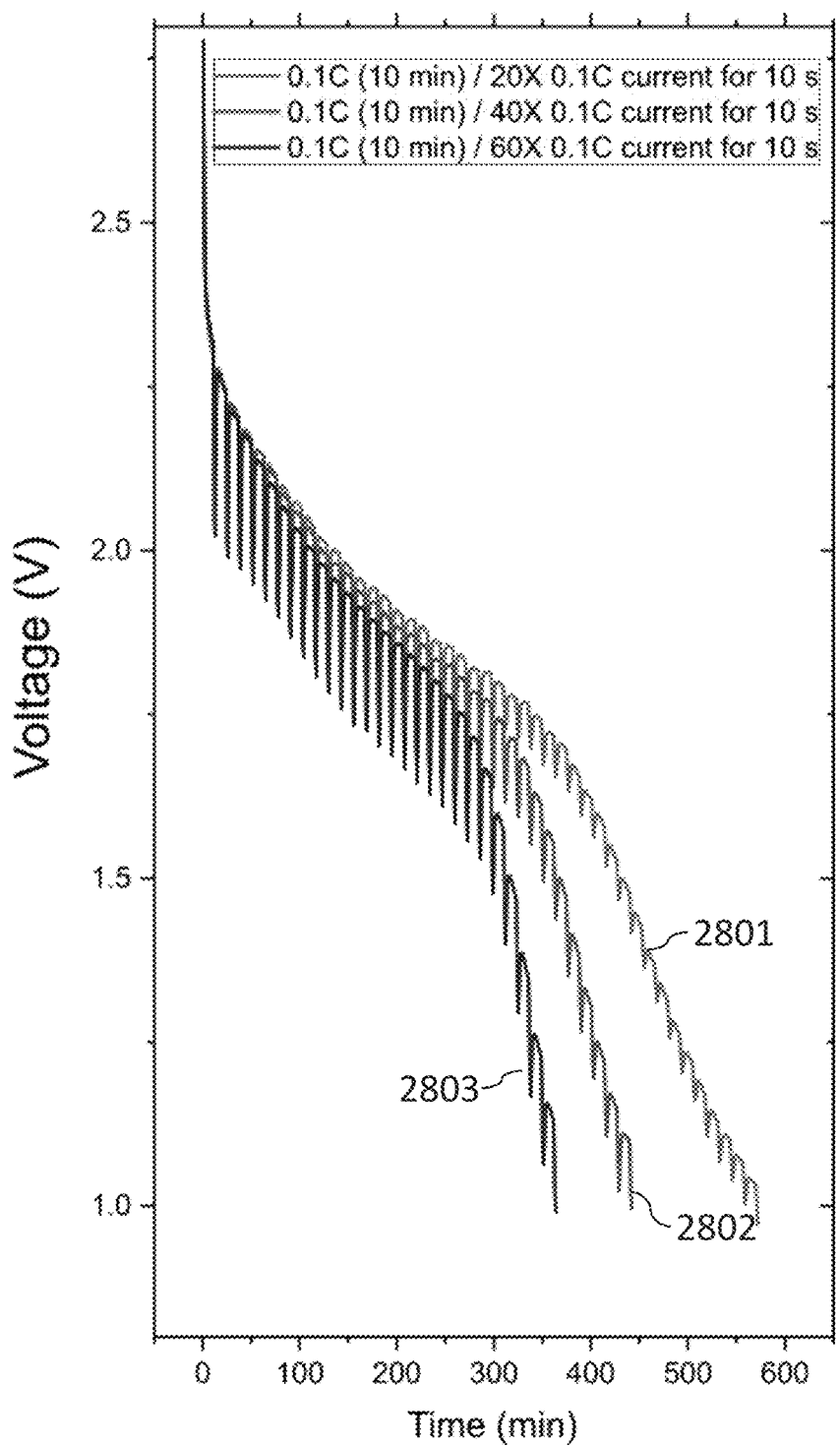
FIGS. 28A-28D are graphs that show an alternated rate test.
Figures 28B, 28C, 28D:
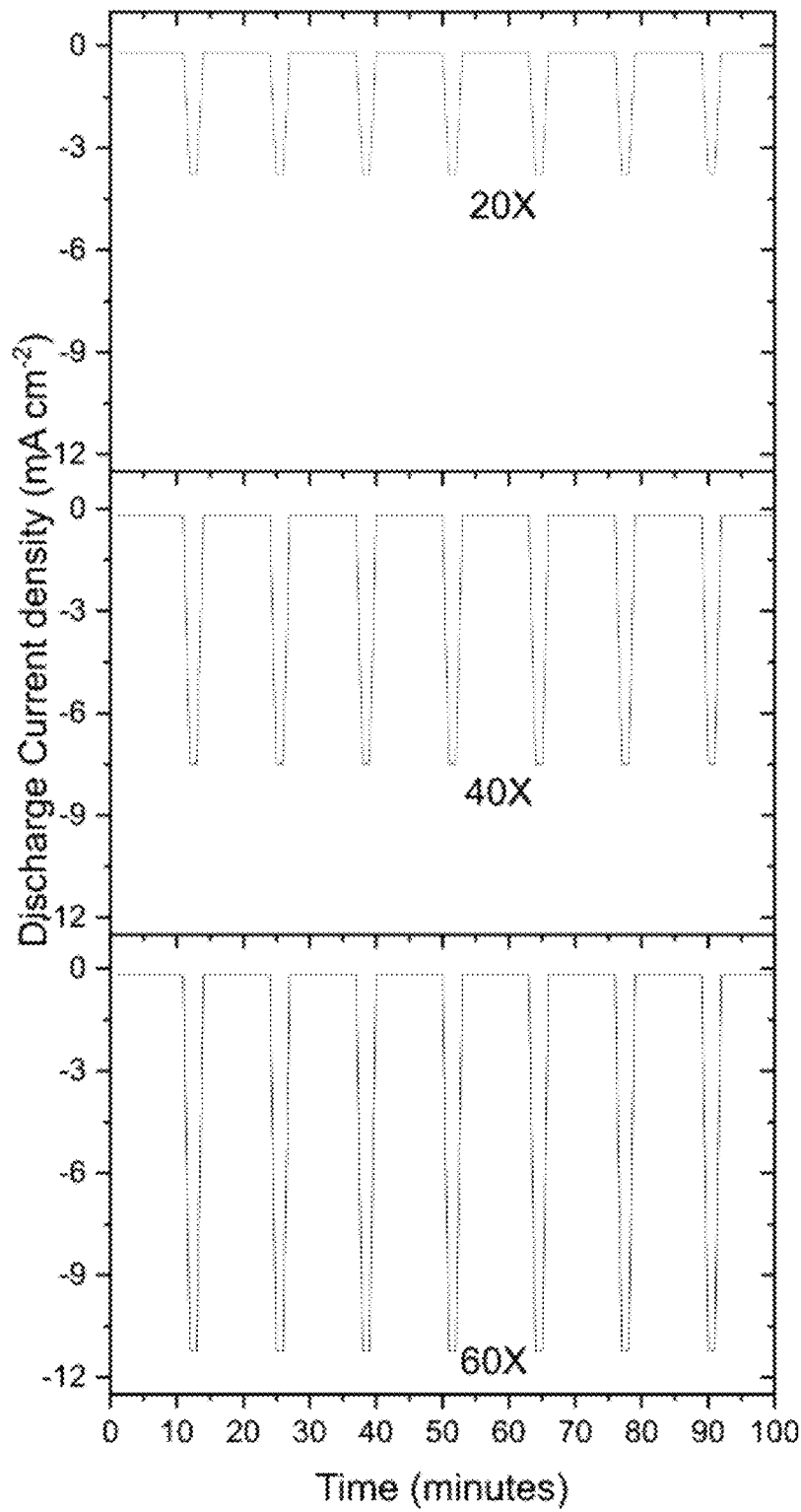

FIG. 28B is a photograph of MWCNT film after being doped with Li (dark red color). Again, the MWCNT became red as result of lithiation reaction. The red color appears only where there is a Li foil surface available FIG. 28C is a scheme of the spontaneous lithiation of MWCNTs and the corresponding redox reaction. Energy diagrams demonstrated the driving force for reduction of MWCNTs is based on the difference of Fermi energy levels related to vacuum (work function) of Li metal (−2.9 eV vs. vacuum) and MWCNTs (−5 eV vs. vacuum). The voltage potential was created because of the difference of Fermi energy level of each metal (Li and MWCNT). Electrons flowed from the metal with highest Fermi level (Li −2.9 eV). The reaction happened when two metals are in contact. The reaction ended when both Fermi levels are equilibrated. The high concentrated electrolyte enabled maximum lithiation. The same reaction was not possible using just 1 M electrolyte of pure (dry) Li foil.

Figures 25A, 25B, 25C:
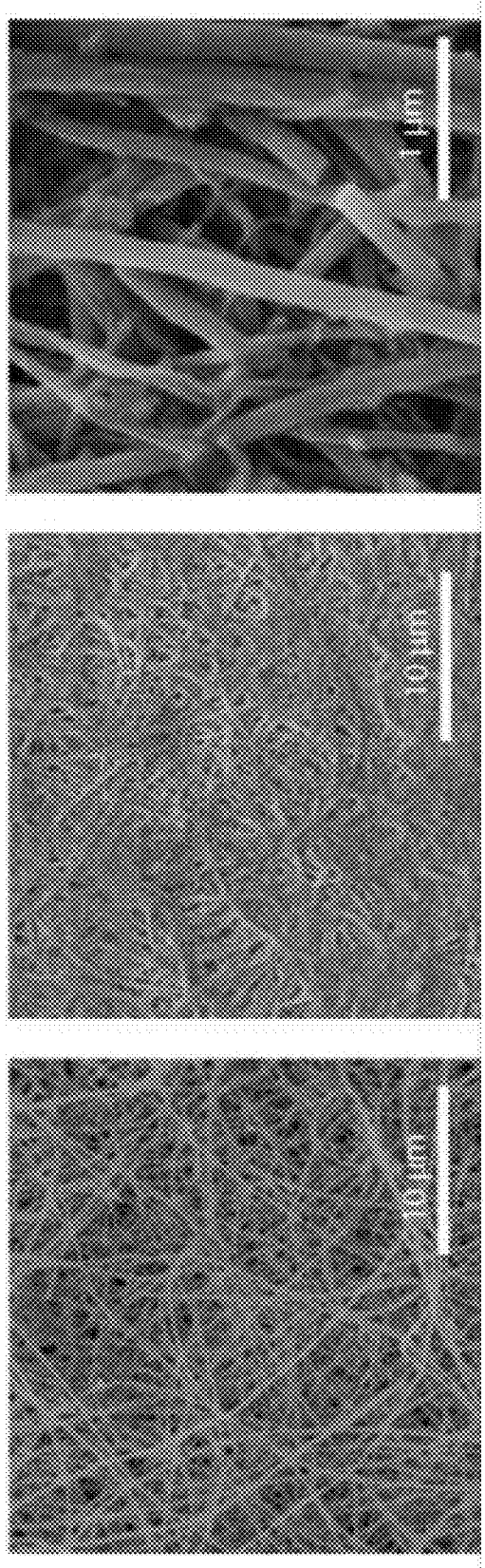
FIGS. 25A-25C show the morphology of the Li-MWCNT film.

FIGS. 25A-25C show the morphology of the Li-MWCNT film. FIG. 25A shows the morphology of the pristine MWCNT film characterized by SEM. FIGS. 25B-25C show the morphology of the Li-doped MWCNT film characterized by SEM. The morphology of MWCNTs was not affected by the lithiation of the MWCNTs. The MWCNTs looked swollen because of lithiation. The Lithiation created a compact MWCNT layer. The mat structure of the MWCNT thin film was unaffected by lithiation.

Figure 26B:
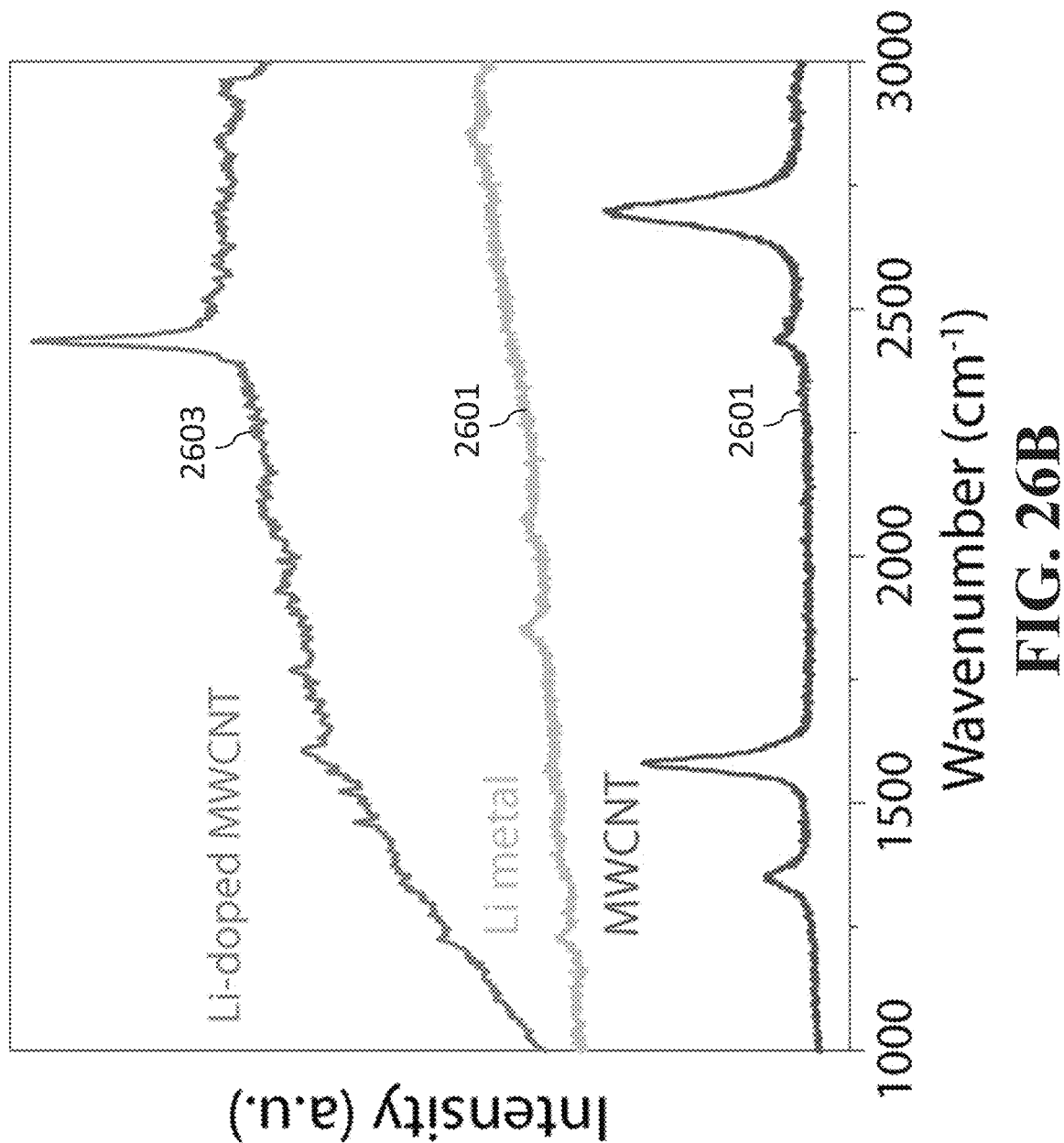

FIGS. 26A-26B are graphs that show the electron paramagnetic resonance (EPR) and Raman spectroscopy, respectively, of MWCNT and Li-MWCNT. Raman spectra (532 nm) compares the vibrational spectra of the pristine MWCNT, the surface of Li metal and the resulting Li-MWCNT.

For FIG. 26A, the EPR measurement elucidated the nature of Li-doped MWCNT. The EPR of pristine MWCNT (curve 2601) indicated high purity of MWCNT sample (no signals observed). The EPR of Li-doped MWCNT (curve 2602) produced a high intensity peak. The g factor of 1.988 indicated formation of stable radicals induced by MWCNT reduction. The g factor (1.988) was far from the expected for free electron systems (g=2.0023). The electrons in Li-doped MWCNT could be in more localized electron states.

For FIG. 26B, the Raman spectrum of Li-doped MWCNT (curve 2603) presented low intensity of the $sp^2$ carbon modes (D, G, 2D). The nature of MWCNTs bond structures was altered with Li-doped MWCNT formation. (Curves 2604 and 2605 are for Li metal and MWCNT, respectively). The Raman spectrum corroborated EPR and XPS data.

As discussed above, FIGS. 5-6 show the cycling performance at a current density of 2 mA $cm^{-2}$ for a total capacity of 4 mAh $cm^{-2}$ when comparing bare Li and Li-MWCNT symmetric cells. In FIG. 5, the voltage profile of the bare Li cell showed fluctuations that can be attributed to possible dendrite-induced soft short circuits. In FIG. 6, the voltage plateaus for Li-MWCNT were more defined and stable, which indicates the suppression of dendrite formation.

FIG. 7 is a graph that show rate performance (current densities from 1 to 5 mA $cm^{-2}$) for a total capacity of 2 mAh $cm^{-2}$. Curves 701-702 are for Li-MWCNT and bare Li, respectively. The symmetrical cell of bare Li showed a larger Li stripping/platting overpotential than the Li-MWCNT at different current densities. After returning back to 2 mA $cm^{-2}$, the bare Li cell overpotential was ~2.7 times higher. In the case of the Li-MWCNT cell, the overpotential was approximately the same.

Figure 27:
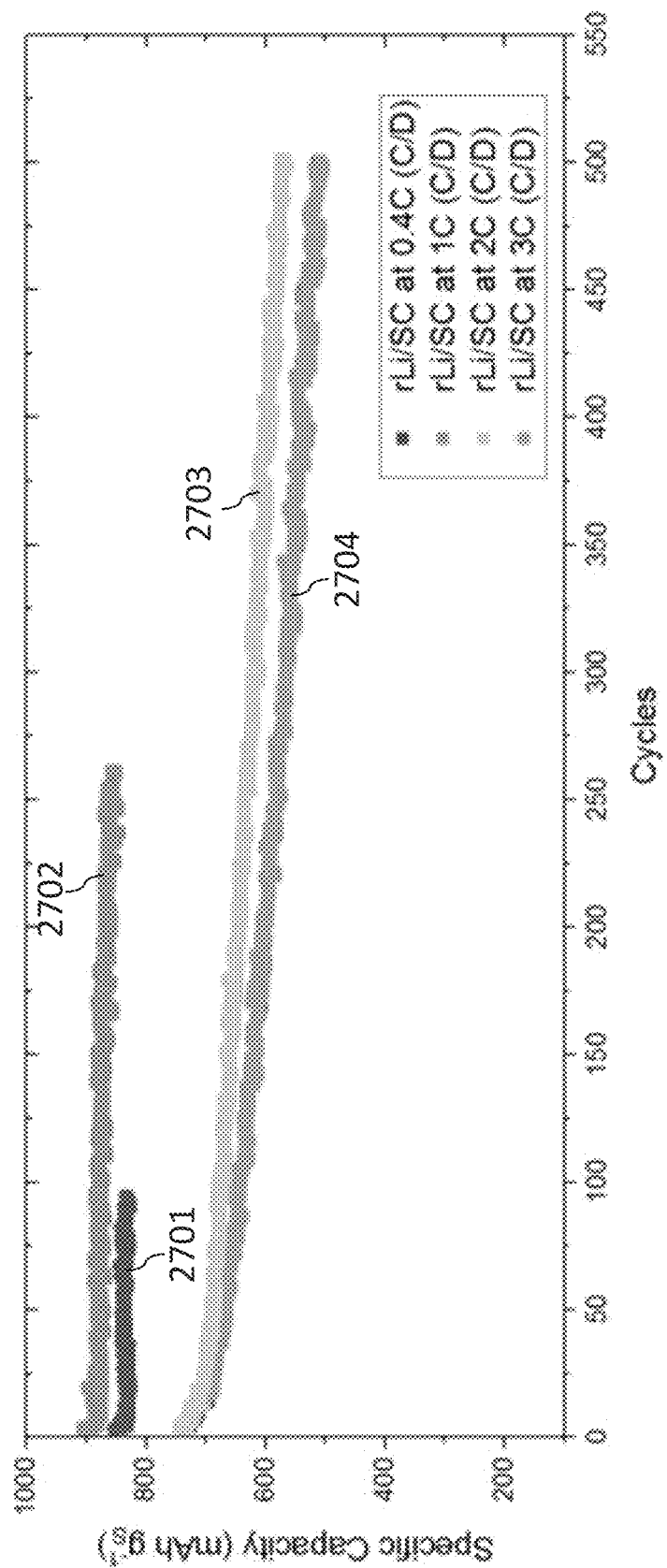
FIG. 27 is a graph that shows cycles of Li-MWCNT/SC battery at different current densities (cycle stability).

FIG. 27 shows cycles of Li-MWCNT/SC ("rLi/SC") battery at different current densities (cycle stability), with curves 2701-2704 corresponding to rLi/SC at 0.4, 1, 2, and 3 C (C/D), respectively. Charge and discharge were performed at the same rate. Example "rLi/SC at 1 C (C/D)" means that charge and discharge were performed at the same current density, enabling full charge and discharge in approximately 1 h, respectively.

FIGS. 28A-28D are show an alternated rate test. FIG. 28A is graph that shows a single discharge of a rLi/SC full battery in which the current density was continuously alternated, starting at 0.1 C current density for 10 minutes, then discharge for 10 s at higher current density (20, 40 or 60 times the original current density for curves 2801-2803, respectively), then returned to the original rate at 0.1 C until the battery reached the lower cut-off limit (1 V). The battery was cycled (charge and discharge) at 0.4 C for 3 times between the alternated rate tests. FIGS. 28B-28D are graphs that shows variations in current vs time (20, 40, and 60 times the original current density, respectively).

FIGS. 16-17 and 29A-29B are graphs that shows electrochemical characterization a full cell with Li-MWCNT as the anode and S (sulfurized carbon) as the cathode.

FIG. 16 is a graph that shows galvanostatic charge/discharge curves. The curves are for the full cell. FIG. 16 shows high reversible capacity (~1000 mAh $g^{-1}$, based on S mass), lower irreversible capacity at the first cycle (~30%), an average flat discharge voltage at 1.9 V, and that only first cycle presented lower voltage (~1.5 V). The lower voltage is related to the activation of sulfur species in the sulfurized carbon cathode. The charge extend up to 3 V (flat voltage at 2.3 V).

FIG. 17 is a graph that shows rate performance (from 0.2 C to 60 C) of the full cell. Curves 1701-1705 for 0.2 C, 0.6 C, 3 C, 13 C, and 60 C, respectively. This showed that rates from 0.2 to 60 C were possible. The lower rates could be recovered after high rate test. FIG. 17 also showed long-term stability (i.e., the battery would run until final submission).

Figure 29A:
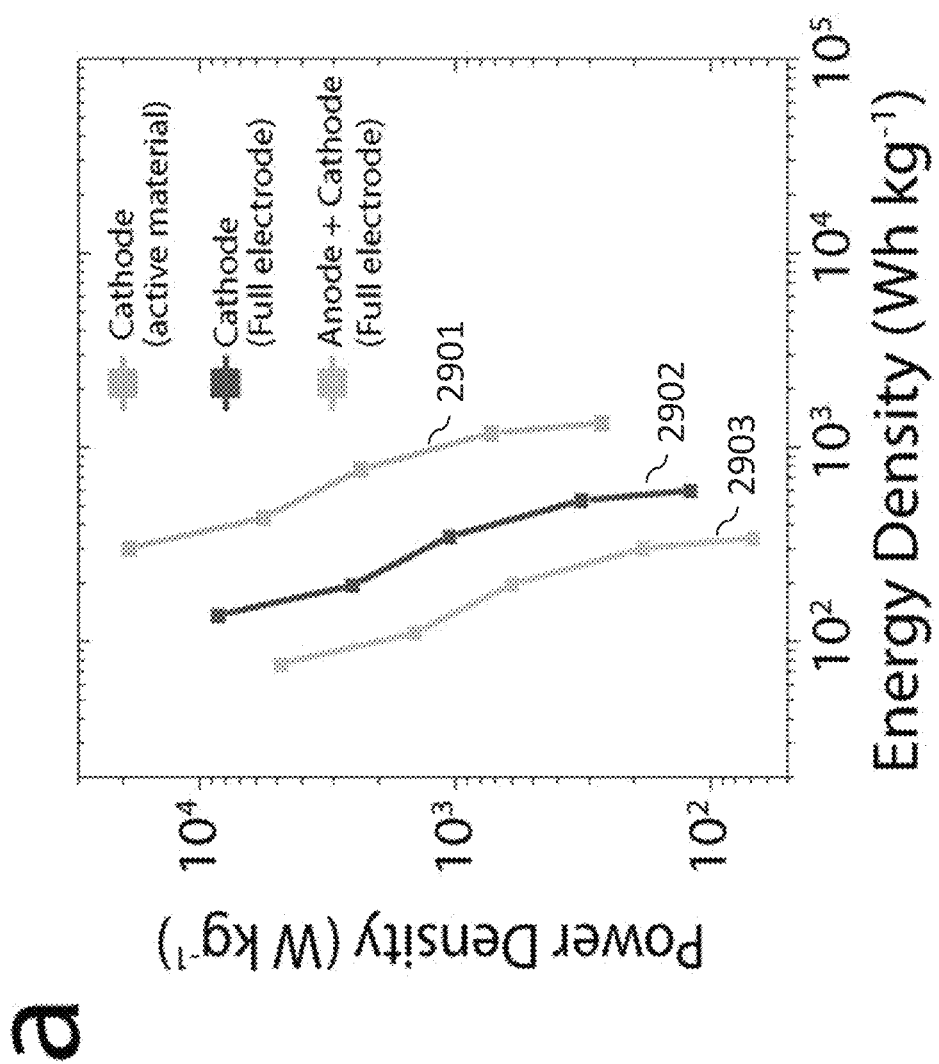
FIGS. 29A-29B are graphs that shows electrochemical characterization a full cell with Li-MWCNT as the anode and S (sulfurized carbon) as the cathode.

FIG. 29A is a graph that shows the Ragone plot based on the cathode and anode-cathode weight. The energy and power density were calculated in terms of mass of cathode active material (S mass) (curve 2901), mass of sulfurized carbon electrode (curve 2902), and mass of both electrodes (anode+cathode, including current collectors) (curve 2903). The battery had high power and energy density capability (projection for 340 Wh kg$^1$ of the full cell assuming both sides coated of cathode current collector). The full mass (including current collector) was considered for calculations.

Figure 29B:
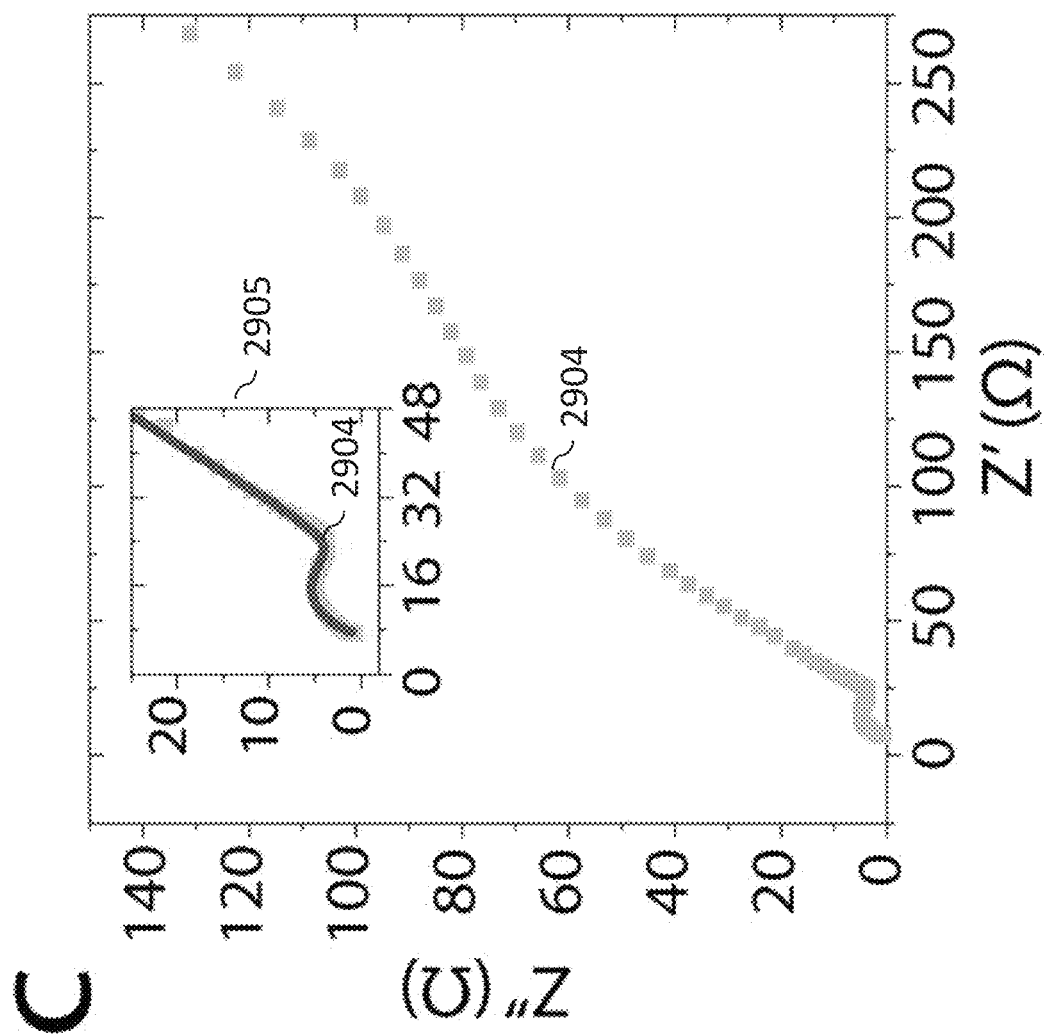

FIG. 29B is a graph that shows electrochemical impedance spectrum (with magnified portion of curve 2904 from 0 to 48Ω shown in inset 2905). An equivalent circuit was fitted over the experimental data. This revealed a low internal resistance (~8Ω) and a low charge transfer resistance (~13Ω).

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

REFERENCES

Tour J. M. et al., U.S. Pat. No. 9,455,094, "Graphene-Carbon Nanotube Hybrid Materials And Use As Electrodes," issued Sep. 27, 2016. ("the '094 Tour patent").

Tour J. M. et al., Vertically Aligned Carbon Nanotube Arrays As Electrodes, PCT Int'l Patent Publ. No. WO/2017/011052, filed Apr. 25, 2016 ("Tour PCT '052 application").

Tour J. M. et al., High Surface Area Porous Carbon Materials As Electrodes, PCT Int'l Patent Publ. No. WO/2017/062950, filed Oct. 8, 2015 ("Tour PCT '950 application")

Tour J. M. et al., Graphene-Carbon Nanotube Hybrid Materials And Use As Electrodes, U.S. Patent Publ. No. 20140313636, published Oct. 23, 2014 ("Tour '636 application").

Eustace, D. J. et al., Li/TiS$_2$ Current Producing System. U.S. Pat. No. 4,416,960, issued Nov. 22, 1983 ("Eustace '960 patent").

Armand, M. et al., Building Better Batteries. *Nature* 2008, 451 (7179), 652-657 ("Armand 2008").

Aurbach, D. et al., A Short Review of Failure Mechanisms of Lithium Metal and Lithiated Graphite Anodes in Liquid Electrolyte Solutions. *Solid State Ionics* 2002, 148, 405-416 ("Aurbach 2002").

Bai, P. et al., Transition of Lithium Growth Mechanisms in Liquid Electrolytes. *Energy Environ. Sci.* 2016, 9, 3221-3229 ("Bai 2016").

Bates, J. B. et al., Fabrication and Characterization of Amorphous Lithium Electrolyte Thin Films and Rechargeable Thin-Film Batteries. *J. Power Sources* 1993, 43 (1-3), 103-110 ("Bates 1993").

Besenhard, J. O. et al., Inorganic Film-Forming Electrolyte Additives Improving the Cycling Behaviour of Metallic Lithium Electrodes and the Self-Discharge of Carbon-Lithium Electrodes. *J. Power Sources* 1993, 44 (1-3), 413-420 ("Besenhard 1993").

Bouchet, R., Batteries: A Stable Lithium Metal Interface. *Nat. Nanotechnol.* 2014, 9, 572-573 ("Bouchet 2014").

Bruce, P. G. et al., Li—O2 and Li—S Batteries with High Energy Storage. *Nat. Mater.* 2011, 11 (2), 172-172 ("Bruce 2011").

Claye, A. S. et al., Solid-State Electrochemistry of the Li Single Wall Carbon Nanotube System. *J. Electrochem. Soc.* 2000, 147, 2845-2852 ("Claye 2000").

Cohen, Y. S. et al., Micromorphological Studies of Lithium Electrodes in Alkyl Carbonate Solutions Using in Situ Atomic Force Microscopy. *J Phys. Chem. B* 2000, 104 (51), 12282-12291 ("Cohen 2000").

Crowther, O. et al., Effect of Electrolyte Composition on Lithium Dendrite Growth. *J. Electrochem. Soc.* 2008, 155, A806-A811 ("Crowther 2008").

Ding, F. et al., Effects of Carbonate Solvents and Lithium Salts on Morphology and Coulombic Efficiency of Lithium Electrode. *J. Electrochem. Soc.* 2013, 160 (10), A1894-A1901 ("Ding I 2013").

Ding, F. et al., Dendrite-Free Lithium Deposition via Self-Healing Electrostatic Shield Mechanism. *J. Am. Chem. Soc.* 2013, 135 (11), 4450-4456 ("Ding II 2013").

Dresselhaus, M. S. et al., Raman Spectroscopy on Isolated Single Wall Carbon Nanotubes. *Carbon* 2002, 40, 2043-2061 ("Dresselhaus 2002").

Dunn, B.; Kamath, H. et al., Electrical Energy Storage for the Grid: A Battery of Choices. *Science (80).* 2011, 334 (6058), 928-935 ("Dunn 2011").

Ebbesen, T. W. et al., Electrical Conductivity of Individual Carbon Nanotubes. *Nature* 1996, 382, 54-56 ("Ebbesen 1996").

Evarts, E. C., Lithium Batteries: To the Limits of Lithium. *Nature* 2015, 526, S93-S95 ("Evarts 2015").

Goodenough, J. B. et al., The Li-Ion Rechargeable Battery: A Perspective. *J. Am. Chem. Soc.* 2013, 135 (4), 1167-1176 ("Goodenough 2013").

Girishkumar, G. et al., Lithium-Air Battery: Promise and Challenges. *J. Phys. Chem. Lett.* 2010, 1 (14), 2193-2203 ("Girishkumar 2010").

Hao, X. et al., Ultrastrong Polyoxyzole Nanofiber Membranes for Dendrite-Proof and Heat-Resistant Battery Separators. *Nano Lett.* 2016, 16, 2981-2987 ("Hao 2016").

Hirai, T. et al., Effect of Additives on Lithium Cycling Efficiency. *J. Electrochem. Soc.* 1994, 141, 2300-2305 ("Hirai 1994").

Jin, F. et al., Efficient Activation of High-Loading Sulfur by Small CNTs Confined Inside a Large CNT for High-Capacity and High-Rate Lithium-Sulfur Batteries. *Nano Lett.* 2015, acs.nanolett.5b04105 ("Jin 2015").

Jin, S. et al., Covalently Connected Carbon Nanostructures for Current Collectors in Both the Cathode and Anode of Li—S Batteries. *Adv. Mater.* 2016, 28, 9094-9102 ("Jin 2016").

Kim, J. S. et al., Controlled Lithium Dendrite Growth by a Synergistic Effect of Multilayered Graphene Coating and an Electrolyte Additive. *Chem. Mater.* 2015, 27 (8), 2780-2787 ("Kim 2015").

Kozen, A. C.; et al., Next-Generation Lithium Metal Anode Engineering via Atomic Layer Deposition. *ACS Nano* 2015, 9 (6), 5884-5892 ("Kozen 2015").

Landi, B. J. et al., Carbon Nanotubes for Lithium Ion Batteries. *Energy Environ. Sci.* 2009, 2, 638-654 ("Landi 2009").

Landi, B. J. et al., Lithium Ion Capacity of Single Wall Carbon Nanotube Paper Electrodes. *J. Phys. Chem. C* 2008, 112, 7509-7515 ("Landi 2008").

Lee, H.; et al., Simple Composite Protective Layer Coating That Enhances the Cycling Stability of Lithium Metal Batteries. *J. Power Sources* 2015, 284, 103-108 ("Lee 2015").

Li, F. et al., Identification of the Constituents of Double-Walled Carbon Nanotubes Using Raman Spectra Taken with Different Laser-Excitation Energies. *J. Mater. Res.* 2003, 18, 1251-1258 ("Li 2003").

Li, N. W. et al., An Artificial Solid Electrolyte Interphase Layer for Stable Lithium Metal Anodes. *Adv. Mater.* 2016, 28 (9), 1853-1858 ("Li 2016").

Li, W., The Synergetic Effect of Lithium Polysulfide and Lithium Nitrate to Prevent Lithium Dendrite Growth. *Nat. Commun.* 2015, 6 (May), 7436 ("Li 2015").

Liang, Z. et al., Composite Lithium Metal Anode by Melt Infusion of Lithium into a 3D Conducting Scaffold with Lithiophilic Coating. *Proc. Natl. Acad. Sci. U.S.A* 2016, 113, 2862-2867 ("Liang 2016").

Lin, D. et al., Reviving the Lithium Metal Anode for High-Energy Batteries. *Nat. Publ. Gr.* 2017, 12 (3), 194-206 ("Lin I 2017").

Lin, D. et al., Three-Dimensional Stable Lithium Metal Anode with Nanoscale Lithium Islands Embedded in Ionically Conductive Solid Matrix. *Proc. Natl. Acad. Sci. U.S.A* 2017, 114, 4613-4618 ("Lin II 2017").

Lin, D. et al., Layered Reduced Graphene Oxide with Nanoscale Interlayer Gaps as a Stable Host for Lithium Metal Anodes. *Nat. Nanotechnol.* 2016, 11, 626-632 ("Lin 2016").

Lin, J. et al., 3-Dimensional Graphene Carbon Nanotube Carpet-Based Microsupercapacitors with High Electrochemical Performance. *Nano Lett.* 2013, 13, 72-78 ("Lin 2015").

Liu, Y. et al., An Artificial Solid Electrolyte Interphase with High Li-Ion Conductivity, Mechanical Strength, and Flexibility for Stable Lithium Metal Anodes. *Adv. Mater.* 2017, 29, 1605531 ("Liu 2017").

Liu, Y. et al., Lithium-Coated Polymeric Matrix as a Minimum Volume-Change and Dendrite-Free Lithium Metal Anode. *Nat. Commun.* 2016, 7, 10992 ("Liu 2016").

Lu, Y. et al., Stable Lithium Electrodeposition in Liquid and Nanoporous Solid Electrolytes. *Nat. Mater.* 2014, 13, 961-969 ("Lu 2014").

Mahmood, N. et al., Nanostructured Anode Materials for Lithium Ion Batteries: Progress, Challenge and Perspective. *Adv. Energy Mater.* 2016, 6, 1600374 ("Mahmood 2016").

Manthiram, A. et al., Lithium-Sulfur Batteries: Progress and Prospects. *Adv. Mater.* 2015, 27 (12), 1980-2006 ("Manthiram 2015").

Noorden, R. Van, The Rechargeable Revolution: A Better Battery. *Nature* 2014, 507, 26-28 ("Noorden 2014").

Osaka, T., Surface Characterization of Electrodeposited Lithium Anode with Enhanced Cycleability Obtained by CO[sub 2] Addition. *J. Electrochem. Soc.* 1997, 144 (5), 1709 ("Osaka 1997").

Peigney, A. et al., Specific Surface Area of Carbon Nanotubes and Bundles of Carbon Nanotubes. *Carbon* 2001, 39, 507-514 ("Peigney 2001").

Qian, J. et al., High Rate and Stable Cycling of Lithium Metal Anode. *Nat. Commun.* 2015, 6, 6362 ("Qian 2015").

Ren, Z. F. et al., Synthesis of Large Arrays of Well-Aligned Carbon Nanotubes on Glass. *Science* 1998, 282, 1105-1107 ("Ren 1998").

Roy, P. et al., Nanostructured Anode Materials for Lithium Ion Batteries. *J. Mater. Chem. A* 2015, 3, 2454-2484 ("Roy 2015").

Salvatierra, R. V. et al., Graphene Carbon Nanotube Carpets Grown Using Binary Catalysts for High-Performance Lithium-Ion Capacitors. *ACS Nano* 2017, 11, 2724-2733 ("Salvatierra 2017").

Sun, Z. et al., Large-Area Bernal-Stacked Bi-, Tri-, and Tetralayer Graphene. *ACS Nano* 2012, 6, 9790-9796 ("Sun 2012").

Thess, A. et al., Crystalline Ropes of Metallic Carbon Nanotubes. *Science* 1996, 273, 483-487 ("Thess 1996").

Tung, S.-O. et al., A Dendrite-Suppressing Composite Ion Conductor from Aramid Nanofibres. *Nat. Commun.* 2015, 6, 6152 ("Tung 2015").

Wang, C. et al., Suppression of Lithium-Dendrite Formation by Using LAGP-PEO (LiTFSI) Composite Solid Electrolyte and Lithium Metal Anode Modified by PEO (LiTFSI) in All-Solid-State Lithium Batteries. *ACS Appl. Mater. Interfaces* 2017, acsami.7b00336 ("Wang 2017").

Wei, S. et al., Metal-Sulfur Battery Cathodes Based on Pan-Sulfur Composites. *J. Am. Chem. Soc.* 2015, 137, 12143-12152 ("Wei 2015").

Whittingham, M. S., History, Evolution, and Future Status of Energy Storage. *Proc. IEEE* 2012, 100 (Special Centennial Issue), 1518-1534 ("Whittingham 2012").

Xu, W. et al., Lithium Metal Anodes for Rechargeable Batteries. *Energy Environ. Sci.* 2014, 7 (2), 513-537 ("Xu 2014").

Yan, K. et al., Selective Deposition and Stable Encapsulation of Lithium through Heterogeneous Seeded Growth. *Nat. Energy* 2016, 1, 16010 ("Yan 2016").

Yang, C.-P. et al., Accommodating Lithium into 3D Current Collectors with a Submicron Skeleton Towards Long-Life Lithium Metal Anodes. *Nat. Commun.* 2015, 6, 8058 ("Yang 2015").

Yang, Y. et al., Nanostructured Sulfur Cathodes. *Chem. Soc. Rev.* 2013, 42, 3018-3032 ("Yang 2013").

Yazami, R. et al., A Reversible Graphite-Lithium Negative Electrode for Electrochemical Generators. *J. Power Sources* 1983, 9, 365-371 ("Yazami 1983").

Zhang, H. et al., Three-Dimensional Bicontinuous Ultrafast-Charge and -Discharge Bulk Battery Electrodes. *Nat. Nanotechnol.* 2011, 6, 277-281 ("Zhang 2011").

Zhang, J.-G. et al., *Lithium Metal Anodes and Rechargeable Lithium Metal Batteries*, 1st ed.; Hull, R. et al., Eds.; Springer International Publishing, 2017 ("J. Zhang 2017").

Zhang, R. et al., Conductive Nanostructured Scaffolds Render Low Local Current Density to Inhibit Lithium Dendrite Growth. *Adv. Mater.* 2016, 28, 2155-2162 ("Zhang 2016").

Zhang, S. S. et al., Charge and Discharge Characteristics of a Commercial $LiCoO_2$—Based 18650 Li-Ion Battery. *J. Power Sources* 2006, 160, 1403-1409 ("Zhang 2006").

Zhang, Y. et al., High-Capacity, Low-Tortuosity, and Channel-Guided Lithium Metal Anode. *Proc. Natl. Acad. Sci. U.S.A* 2017, 114, 3584-3589 ("Y. Zhang I 2017").

Zhang, Y. et al., A Carbon-Based 3d Current Collector with Surface Protection for Li Metal Anode. *Nano Res.* 2017, 10, 1356-1365 ("Y. Zhang II 2017").

Zheng, G. et al., Interconnected Hollow Carbon Nanospheres for Stable Lithium Metal Anodes. *Nat. Nanotechnol.* 2014, advance on (8), 618-623 ("Zheng 2014").

Zhou, W. et al., Plating a Dendrite-Free Lithium Anode with a Polymer/Ceramic/Polymer Sandwich Electrolyte. *J. Am. Chem. Soc.* 2016, 138 (30), 9385-9388 ("Zhou 2016").

Zhu, Y. et al., A Seamless Three-Dimensional Carbon Nanotube Graphene Hybrid Material. *Nat. Commun.* 2012, 3, 1225 ("Zhu 2012").

What is claimed is:

1. A sulfurized carbon cathode comprising:
   (a) sulfur;
   (b) carbon, wherein the carbon is part of a seamless hybrid of carbon nanotubes grown from a graphene layer; and
   (c) a thermally treated polymer, wherein
      (i) the cathode lacks elemental sulfur, and
      (ii) all of the sulfur in the sulfurized carbon cathode is directly or indirectly covalently bound to the carbon.

2. The sulfurized carbon cathode of claim 1, wherein the thermally treated polymer comprises thermally treated polyacrylonitrile.

3. The sulfurized carbon cathode of claim 1, wherein
   (a) the cathode comprises a carbon additive that is a conductive filler, and
   (b) the conductive filler is selected from the group consisting of carbon black, graphene nanoribbons, and combinations thereof.

4. The sulfurized carbon cathode of claim 1, wherein
   (a) the majority of the sulfur in the sulfurized carbon cathode is small sulfur chains directly covalently bound to $sp^2$ carbon lattices of the carbon, and
   (b) the small sulfur chains comprise no more than three sulfur atoms.

\* \* \* \* \*